United States Patent
Suzuki et al.

(10) Patent No.: US 8,936,840 B2
(45) Date of Patent: Jan. 20, 2015

(54) RETARDATION FILM, POLARIZING PLATE, LIQUID CRYSTAL DISPLAY DEVICE, AND COMPOUND

(75) Inventors: Takatsugu Suzuki, Tokyo (JP); Issei Nakahara, Tokyo (JP); Hiroyoshi Kiuchi, Tokyo (JP); Kiyoshi Fukusaka, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/003,565

(22) PCT Filed: Mar. 9, 2012

(86) PCT No.: PCT/JP2012/001641
§ 371 (c)(1),
(2), (4) Date: Sep. 6, 2013

(87) PCT Pub. No.: WO2012/120897
PCT Pub. Date: Sep. 13, 2012

(65) Prior Publication Data
US 2013/0335685 A1    Dec. 19, 2013

(30) Foreign Application Priority Data

Mar. 10, 2011  (JP) .................. 2011-052455

(51) Int. Cl.
| | |
|---|---|
| C09K 19/00 | (2006.01) |
| G02F 1/1335 | (2006.01) |
| G02B 1/04 | (2006.01) |
| G02B 5/30 | (2006.01) |
| C08B 3/06 | (2006.01) |
| C08B 3/16 | (2006.01) |
| C08L 1/10 | (2006.01) |
| C08L 1/12 | (2006.01) |
| C08L 1/14 | (2006.01) |
| C08K 5/3465 | (2006.01) |
| G02F 1/13363 | (2006.01) |

(52) U.S. Cl.
CPC ............ *G02F 1/133528* (2013.01); *G02B 1/04* (2013.01); *G02B 5/3083* (2013.01); *C08B 3/06* (2013.01); *C08B 3/16* (2013.01); *C08L 1/10* (2013.01); *C08L 1/12* (2013.01); *C08L 1/14* (2013.01); *C08K 5/3465* (2013.01); *G02F 1/13363* (2013.01)
USPC ........... 428/1.3; 428/1.1; 428/1.31; 428/1.33; 349/96; 349/117; 359/489.07; 359/489.11; 544/284; 544/293; 106/170.1

(58) Field of Classification Search
CPC .......... G02B 1/04; G02B 1/08; G02B 5/3083; C08L 1/08; C08L 1/10; C08L 1/12; C08L 1/14; C08B 3/04; C08B 3/16; C08K 5/3465; C08K 5/3467; G02F 1/133528; G02F 1/13363

USPC .............. 428/1.1, 1.3, 1.31, 1.33; 349/95, 96, 349/117; 359/489.07, 489.11; 106/170.1; 544/284, 293

See application file for complete search history.

(56) References Cited

U.S. PATENT DOCUMENTS

| | | | | |
|---|---|---|---|---|
| 3,772,274 | A * | 11/1973 | Kaplan et al. ............... | 544/283 |
| 2009/0239982 | A1 | 9/2009 | Amasaki et al. | |
| 2010/0039705 | A1 | 2/2010 | Doutova et al. | |
| 2010/0055355 | A1 | 3/2010 | Hayashi | |

FOREIGN PATENT DOCUMENTS

| | | |
|---|---|---|
| JP | 2000-111914 | 4/2000 |
| JP | 2002-187958 | 7/2002 |
| JP | 2006-096875 | 4/2006 |
| JP | 2008-274246 | 11/2008 |
| JP | 2009-523256 | 6/2009 |
| JP | 2010-079241 | 4/2010 |
| JP | 2010-170128 | 8/2010 |

* cited by examiner

Primary Examiner — Michele L Jacobson
Assistant Examiner — Ruiyun Zhang
(74) Attorney, Agent, or Firm — Lucas & Mercanti, LLP

(57) ABSTRACT

The purpose of the present invention is to provide a retardation film which has high retardation developability, good mechanical strength and good durability. This retardation film contains a cellulose derivative and at least one compound represented by general formula (1), wherein each of $R_1$ and $R_2$ independently represents an alkyl group, a cycloalkyl group, an aryl group or a heterocyclic group; X1 represents a single bond, —$NR_4$—, —O— or —S—; $X_2$ represents a single bond, —$NR_5$—, —$NR_5$—(C═O)—, —O— or —S—; each of $R_4$ and $R_5$ independently represents a hydrogen atom, an alkyl group, a cycloalkyl group, an aryl group or a heterocyclic group; $R_3$ represents a substituent; n represents an integer of 0-4; and when n is 2 or more, a plurality of $R_3$s may be the same or different and adjacent $R_3$s may be joined together to form a ring).

General Formula (1)

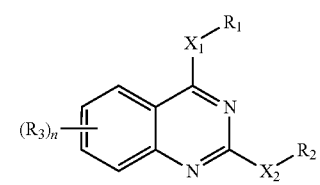

11 Claims, No Drawings

RETARDATION FILM, POLARIZING PLATE, LIQUID CRYSTAL DISPLAY DEVICE, AND COMPOUND

CROSS-REFERENCE TO RELATED APPLICATIONS

This application is a 371 of PCT/JP2012/001641 filed on Mar. 9, 2012, which claims the priority of JP Application Serial No. 2011-052455 filed on Mar. 10, 2011, the contents of each of which are incorporated herein by reference.

TECHNICAL FIELD

The present invention relates to a retardation film, a polarizing plate, a liquid crystal display device, and a compound.

BACKGROUND ART

Retardation films are used in liquid crystal display devices in order to enlarge the view angle and improve contrast. In recent years, thinning of liquid crystal panels and improvements of liquid crystals in liquid crystal cells have been made to realize for example high response speed, light weight, and reduced manufacturing costs of liquid crystal displays, requesting further thinning of the retardation films. In addition, demands for thinner retardation films are high as means to achieve cost reductions through high-speed production and elongation of the retardation film. As a result, much higher performance is required for retardation films; for example, they are required to exhibit, even if the film thickness is extremely small, high retardation performance and mechanical strength high enough to cause no problem in handling. Further, the distance between the backlight and polarizing plate decreases with decreasing thickness of the liquid crystal panel resulting in greater influence of heat generated from the backlight unit. Accordingly, retardation films are required to exhibit, even when they are made thin, superior durability compared to conventional ones.

Films containing cellulose derivatives have been widely used as retardation films because of their excellent moisture permeability, a property which is required when manufacturing a polarizing plate. In order to increase the retardation of such cellulose derivative-containing films, techniques have been proposed wherein cellulose esters having a low total degree of acyl substitution are used; compounds having a retardation development effect are added to films; and the films are stretched (see, e.g., PTL 1 to 3).

CITATION LIST

Patent Literature

PTL 1
Japanese Patent Application Laid-Open No. 2010-79241
PTL 2
Japanese Patent Application Laid-Open No. 2010-170128
PTL 3
Japanese Patent Application Laid-Open No. 2006-96875

SUMMARY OF INVENTION

Technical Problem

However, the inventor's intensive studies on the methods disclosed in PTL 1 to 3 revealed that thin retardation films manufactured using these methods exhibited insufficient retardation as well as posed problems in mechanical strength and durability.

Methods for ensuring desired retardation while maintaining reduced film thickness include employing cellulose esters having a lower total degree of acyl substitution; increasing the addition amount of compounds having a retardation development effect; stretching the retardation film to a high magnification at low temperatures; and so forth. However, an excessively low total degree of acyl substitution of the cellulose ester gives rise to such problems as large retardation changes in response to changes in ambient moisture, and significant elution to a saponification liquid upon lamination of the retardation film to a polarizer. Larger addition amounts of compounds having a retardation development effect gives rise to such problems as reduced compatibility with resin resulting in bleed-out in the resultant film. Stretching of the retardation film to a high magnification at low temperatures gives rise to such problems as reductions in optical properties such as increases in haze, and significant reductions in mechanical strength such as risks of fracture and deterioration of brittleness.

For the reasons outlined above, there has been demands in the art for films having mechanical strength high enough to cause no problem in handling as well as excellent durability while retaining reduced thickness and desired retardation.

The present invention has been made in view of the foregoing problems pertinent in the art. An object of the present invention is therefore to provide a compound which develops high retardation. Another object of the present invention is to provide a retardation film which has high retardation developability, good mechanical strength and good durability. A further object of the present invention is to provide a polarizing plate including the retardation film and a liquid crystal display device which includes the retardation film, has a wide view angle, and is excellent in durability.

Solution to Problem

The above objects of the present invention are achieved by the following configurations.

[1] A retardation film containing a cellulose derivative and at least one compound represented by general formula (1):

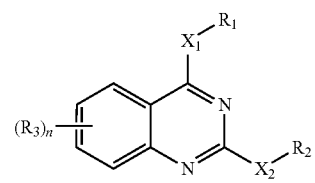

General formula (1)

wherein
$R_1$ and $R_2$ each independently represent an alkyl group, a cycloalkyl group, an aryl group or a heterocyclic group;
$X_1$ represents a single bond, —$NR_4$—, —O— or —S—;
$X_2$ represents a single bond, —$NR_5$—, —$NR_5$—(C=O)—, —O— or —S—;
$R_4$ and $R_5$ each independently represent a hydrogen atom, an alkyl group, a cycloalkyl group, an aryl group or a heterocyclic group;
$R_3$ represents a substituent; and
n represents an integer of 0 to 4; and when n is 2 or more, a plurality of $R_3$s may be the same or different and adjacent $R_3$s may be joined together to form a ring.

[2] The retardation film according to [1], wherein the compound represented by general formula (1) is a compound represented by general formula (2) or (3):

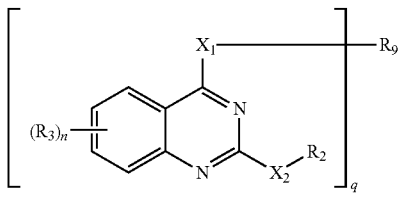

General formula (2)

wherein

R₂ represents an alkyl group, a cycloalkyl group, an aryl group or a heterocyclic group;

X₁ represents a single bond, —NR₄—, —O— or —S—;

X₂ represents a single bond, —NR₅—, —NR₅—(C=O)—, —O— or —S—;

R₄ and R₅ each independently represent a hydrogen atom, an alkyl group, a cycloalkyl group, an aryl group or a heterocyclic group;

R₃ represents a substituent;

n represents an integer of 0 to 4; and when n is 2 or more, a plurality of R₃s may be the same or different and adjacent R₃s may be joined together to form a ring;

R₉ represents a q-valent alkyl group, a q-valent cycloalkyl group, a q-valent aryl group or a q-valent heterocyclic group, or represents a q-valent linking group formed by combining two or more members selected from the group consisting of an alkyl group, a cycloalkyl group, an aryl group and a heterocyclic group, or a q-valent linking group formed by combining an alkyl group, a cycloalkyl group, an aryl group or a heterocyclic group with a divalent group represented by —NR₁₀—, —O—, —S—, —C(=O)—, —S(=O)₂—, —CH=CH— or —C≡C—;

R₁₀ represents a hydrogen atom, an alkyl group, a cycloalkyl group, an aryl group or a heterocyclic group; and q represents 2 or 3;

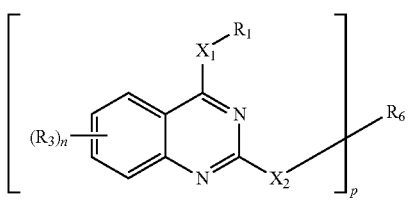

General formula (3)

wherein

R₁ represents an alkyl group, a cycloalkyl group, an aryl group or a heterocyclic group;

X₁ represents a single bond, —NR₄—, —O— or —S—;

X₂ represents a single bond, —NR₅—, —NR₅—(C=O)—, —O— or —S—;

R₄ and R₅ each independently represent a hydrogen atom, an alkyl group, a cycloalkyl group, an aryl group or a heterocyclic group;

R₃ represents a substituent;

n represents an integer of 0 to 4; and when n is 2 or more, a plurality of R₃s may be the same or different and adjacent R₃s may be joined together to form a ring;

R₆ represents a p-valent alkyl group, a p-valent cycloalkyl group, a p-valent aryl group or a p-valent heterocyclic group, or represents a p-valent linking group formed by combining two or more members selected from the group consisting of an alkyl group, a cycloalkyl group, an aryl group and a heterocyclic group, or a p-valent linking group formed by combining an alkyl group, a cycloalkyl group, an aryl group or a heterocyclic group with a divalent group represented by —NR₇—, —O—, —S—, —C(=O)—, —S(=O)₂—, —CH=CH— or —C≡C—;

R₇ represents a hydrogen atom, an alkyl group, a cycloalkyl group, an aryl group or a heterocyclic group; and p represents 2 or 3.

[3] The retardation film according to [2], wherein the compound represented by general formula (3) is a compound represented by general formula (4).

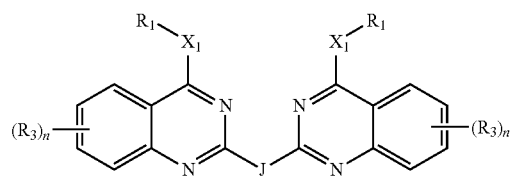

General formula (4)

wherein

R₁ represents an alkyl group, a cycloalkyl group, an aryl group or a heterocyclic group;

X₁ represents a single bond, —NR₄—, —O— or —S—;

R₄ represents a hydrogen atom, an alkyl group, a cycloalkyl group, an aryl group or a heterocyclic group;

R₃ represents a substituent;

n represents an integer of 0 to 4; and when n is 2 or more, a plurality of R₃s may be the same or different and adjacent R₃s may be joined together to form a ring; and J represents a divalent alkyl group, a divalent cycloalkyl group, a divalent aryl group or a divalent heterocyclic group, or represents a divalent linking group formed by combining two or more members selected from the group consisting of an alkyl group, a cycloalkyl group, an aryl group and a heterocyclic group).

[4] The retardation film according to any one of [1] to [3], wherein the cellulose derivative is a cellulose ester.

[5] The retardation film according to [4], wherein a total degree of acyl substitution of the cellulose ester is 1.5 or more and 2.5 or less.

[6] The retardation film according to any one of [1] to [4], an in-plane retardation Ro represented by the following expression is in the range of 40 to 100 nm, and a thickness direction retardation Rth represented by the following expression is in the range of 100 to 300 nm, with respect to light having a wavelength of 590 nm, in an environment of 23° C. and 55% RH:

$$Ro = (nx - ny) \times d \quad \text{Expression (I)}$$

$$Rth = \{(nx + ny)/2 - nz\} \times d \quad \text{Expression (II)}$$

wherein nx represents a refractive index in direction x in which a refractive index reaches a maximum in an in-plane direction of the film; ny represents a refractive index in direction y orthogonal to direction x in the in-plane direction of the film; nz represents a refractive index in thickness direction z of the film; and d (nm) represents a thickness of the retardation film.

[7] The retardation film according to any one of [1] to [6], wherein the retardation film has a thickness of 20 to 35 μm.

[8] A polarizing plate including a polarizer and the retardation film according to any one of [1] to [7] disposed on at least one surface of the polarizer.

[9] A liquid crystal display device including the retardation film according to any one of [1] to [7].

[10] A liquid crystal display device including a liquid crystal cell and the polarizing plate according to [8] disposed on at least one surface of the liquid crystal cell.

[11] The liquid crystal display device according to [10], wherein the liquid crystal cell is a VA-type liquid crystal cell.

[12] A retardation film containing a compound represented by general formula (1):

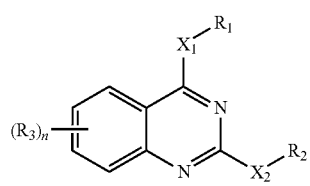

General formula (1)

wherein $R_1$ and $R_2$ each independently represent an alkyl group, a cycloalkyl group, an aryl group or a heterocyclic group;

$X_1$ represents a single bond, —$NR_4$—, —O— or —S—;

$X_2$ represents a single bond, —$NR_5$—, —$NR_5$—(C=O)—, —O— or —S—;

$R_4$ and $R_5$ each independently represent a hydrogen atom, an alkyl group, a cycloalkyl group, an aryl group or a heterocyclic group;

$R_3$ represents a substituent; and n represents an integer of 0 to 4; and when n is 2 or more, a plurality of $R_3$s may be the same or different and adjacent $R_3$s may be joined together to form a ring.

[13] A compound represented by general formula (4):

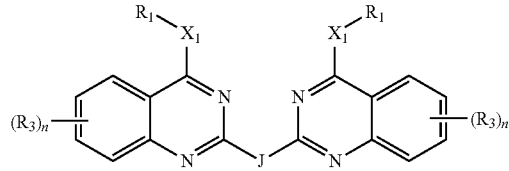

General formula (4)

wherein $R_1$ represents an alkyl group, a cycloalkyl group, an aryl group or a heterocyclic group;

$X_1$ represents a single bond, —$NR_4$—, —O— or —S—;

$R_4$ represents a hydrogen atom, an alkyl group, a cycloalkyl group, an aryl group or a heterocyclic group;

$R_3$ represents a substituent; and n represents an integer of 0 to 4; and when n is 2 or more, a plurality of $R_3$s may be the same or different and adjacent $R_3$s may be joined together to form a ring; and J represents a divalent alkyl group, a divalent cycloalkyl group, a divalent aryl group or a divalent heterocyclic group, or represents a divalent linking group formed by combining two or more members selected from the group consisting of an alkyl group, a cycloalkyl group, an aryl group and a heterocyclic group.

Advantageous Effects of Invention

The present invention can provide a compound which develops high retardation. The present invention can also provide a retardation film which has high retardation developability, good mechanical strength and good durability. The present invention can also provide a polarizing plate including the retardation film, and a liquid crystal display device including the retardation film, which has a wide view angle and is excellent in durability.

DESCRIPTION OF EMBODIMENTS

Hereinafter, embodiments of the present invention will be described in detail, but the present invention is not limited to these embodiments.

In order to solve the above-mentioned problems, the inventor intensively studied retardation films containing various low-molecular compounds and cellulose derivatives. As a result, although a detailed mechanism still remains elusive, it was found that a specific quinazoline compound exhibited extremely high retardation developability. It was also found that a retardation film having high retardation developability, good mechanical strength and good durability was obtained by using the quinazoline compound. It was also found that a liquid crystal display device having a wide view angle and excellent durability was obtained by using the retardation film.

Specifically, a quinazoline compound is an aromatic compound having a structure in which two 6-membered rings, a benzene ring and a pyrimidine ring are fused. It was found that the above-mentioned problems can be solved when using a specific quinazoline compound in which specific substituents are bonded at the 2-position and the 4-position. The present invention has been completed based on the foregoing findings.

<Compound Represented by General Formula (1)>

A compound represented by general formula (1) according to the present invention will be described.

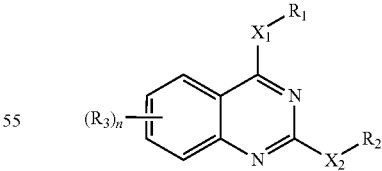

General formula (1)

In general formula (1), $R_1$ and $R_2$ each represent an alkyl group, a cycloalkyl group, an aryl group or a heterocyclic group.

The alkyl group represented by $R_1$ and $R_2$ preferably has 1 to 18 carbon atoms, more preferably 1 to 8 carbon atoms. Examples of the alkyl group include methyl group, ethyl group, propyl group, isopropyl group, t-butyl group, pentyl group, hexyl group, octyl group, dodecyl group, and trifluoromethyl group.

The cycloalkyl group represented by $R_1$ and $R_2$ preferably has 3 to 10 carbon atoms. Examples of the cycloalkyl group include cyclopropyl group, cyclopentyl group, cyclohexyl group, and adamanthyl group.

The aryl group represented by $R_1$ and $R_2$ preferably has 6 to 10 carbon atoms. Examples of the aryl group include phenyl group and naphthyl group.

Examples of the heterocyclic group represented by $R_1$ and $R_2$ include pyridyl group, thiazolyl group, oxazolyl group, pyrazolyl group, and imidazolyl group.

The alkyl group, cycloalkyl group, aryl group, or heterocyclic group represented by $R_1$ and $R_2$ may have a substituent. Examples of the substituent include, but are not particularly limited to, an alkyl group (such as methyl group, ethyl group, propyl group, isopropyl group, t-butyl group, pentyl group, hexyl group, octyl group, dodecyl group, and trifluoromethyl group), a cycloalkyl group (such as cyclopropyl group, cyclopentyl group, cyclohexyl group, and adamanthyl group), an aryl group (such as phenyl group and naphthyl group), an acylamino group (such as acetylamino group and benzoylamino group), an alkylthio group (such as methylthio group and ethylthio group), an arylthio group (such as phenylthio group and naphthylthio group), an alkenyl group (such as vinyl group, 2-propenyl group, 3-butenyl group, 1-methyl-3-propenyl group, 3-pentenyl group, 1-methyl-3-butenyl group, 4-hexenyl group, and cyclohexenyl group), a halogen atom (such as fluorine atom, chlorine atom, bromine atom, and iodine atom), an alkynyl group (such as propargyl group), a heterocyclic group (such as pyridyl group, thiazolyl group, oxazolyl group, pyrazolyl group, and imidazolyl group), an alkylsulfonyl group (such as methylsulfonyl group and ethylsulfonyl group), an arylsulfonyl group (such as phenylsulfonyl group and naphthylsulfonyl group), an alkylsulfinyl group (such as methylsulfinyl group), an arylsulfinyl group (such as phenylsulfinyl group), phosphono group, an acyl group (such as acetyl group, pivaloyl group, and benzoyl group), a carbamoyl group (such as aminocarbonyl group, methylaminocarbonyl group, dimethylaminocarbonyl group, butylaminocarbonyl group, cyclohexylaminocarbonyl group, phenylaminocarbonyl group, and 2-pyridylaminocarbonyl group), a sulfamoyl group (such as aminosulfonyl group, methylaminosulfonyl group, dimethylaminosulfonyl group, butylaminosulfonyl group, hexylaminosulfonyl group, cyclohexylaminosulfonyl group, octylaminosulfonyl group, dodecylaminosulfonyl group, phenylaminosulfonyl group, naphthylaminosulfonyl group, and 2-pyridylaminosulfonyl group), a sulfonamide group (such as methanesulfonamide group and benzenesulfonamide group), cyano group, an alkoxy group (such as methoxy group, ethoxy group, and propoxy group), an aryloxy group (such as phenoxy group and naphthyloxy group), a heterocyclicoxy group, siloxy group, an acyloxy group (such as acetyloxy group and benzoyloxy group), sulfonic acid group, a salt of sulfonic acid, an aminocarbonyloxy group, an amino group (such as amino group, ethylamino group, dimethylamino group, butylamino group, cyclopentylamino group, 2-ethylhexylamino group, and dodecylamino group), an anilino group (such as phenylamino group, chlorophenylamino group, toluidino group, anisidino group, naphthylamino group, and 2-pyridylamino group), imide group, an ureido group (such as methylureido group, ethylureido group, pentylureido group, cyclohexylureido group, octylureido group, dodecylureido group, phenylureido group, naphthylureido group, and 2-pyridylaminoureido group), an alkoxycarbonylamino group (such as methoxycarbonylamino group and phenoxycarbonylamino group), an alkoxycarbonyl group (such as methoxycarbonyl group, ethoxycarbonyl group, and phenoxycarbonyl group), an aryloxycarbonyl group (such as phenoxycarbonyl group), heterocyclicthio group, thioureido group, carboxyl group, a salt of carboxylic acid, hydroxyl group, mercapto group, and nitro group. Among them, a halogen atom, an alkyl group, an alkoxyl group and the like are preferred. These substituents may be further substituted with any of the same substituents.

In general formula (1), $R_1$ and $R_2$ are each preferably a cycloalkyl group, an aryl group or a heterocyclic group, more preferably an aryl group.

In general formula (1), $X_1$ represents a single bond, —$NR_4$—, —O— or —S—. $X_2$ represents a single bond, —$NR_5$—, —$NR_5$—(C—O)—, —O— or —S—. $R_4$ and $R_5$ each independently represent a hydrogen atom, an alkyl group, a cycloalkyl group, an aryl group or a heterocyclic group. Examples of the alkyl group, cycloalkyl group, aryl group or heterocyclic group represented by $R_4$ and $R_5$ include the same groups as those mentioned as examples of the alkyl group, cycloalkyl group, aryl group or heterocyclic group represented by $R_1$ and $R_2$ in general formula (1), respectively. These groups may further have a substituent, and examples of the substituent include the same groups as those which may be possessed by the alkyl group, cycloalkyl group, aryl group or heterocyclic group represented by $R_1$ and $R_2$ in general formula (1).

In general formula (1), $X_1$ is preferably —$NR_4$—, and $R_4$ in —$NR_4$— is more preferably a hydrogen atom.

In general formula (1), $X_2$ is preferably a single bond or —$NR_5$—, more preferably a single bond. $R_5$ in —$NR_5$— is preferably a hydrogen atom.

In general formula (1), $R_3$ represents a substituent. The substituent represented by $R_3$ is not particularly limited, and examples thereof include the same substituents as those which may be possessed by the alkyl group, cycloalkyl group, aryl group or heterocyclic group represented by $R_1$ and $R_2$ in general formula (1).

In general formula (1), n represents an integer of 0 to 4. When n is 2 or more, a plurality of $R_3$s may be the same or different and adjacent $R_3$s may be joined together to form a ring.

The compound represented by general formula (1) according to the present invention is preferably a compound represented by general formula (2) or (3).

<Compound Represented by General Formula (2)>

A compound represented by general formula (2) according to the present invention will be described.

General formula (2)

$$\left[ (R_3)_n \underset{N}{\overset{X_1}{\underset{\|}{\bigvee}}} \underset{X_2}{\overset{R_9}{\underset{R_2}{\bigvee}}} \right]_q$$

In general formula (2), $R_2$, $R_3$, n, $X_1$, and $X_2$ have the same meaning as $R_2$, $R_3$, n, $X_1$, and $X_2$ in general formula (1), respectively.

In general formula (2), $X_1$ is preferably —$NR_4$—, and $R_4$ is preferably a hydrogen atom.

In general formula (2), $R_9$ represents a q-valent alkyl group, a q-valent cycloalkyl group, a q-valent aryl group or a q-valent heterocyclic group; a q-valent linking group formed by combining two or more members selected from the group consisting of an alkyl group, a cycloalkyl group, an aryl group and a heterocyclic group; or a q-valent linking group formed by combining an alkyl group, a cycloalkyl group, an aryl group or a heterocyclic group with a divalent group represented by —$NR_{10}$—, —O—, —S—, —C(=O)—, —S(=O)$_2$—, —CH=CH— or —C≡C—. $R_{10}$ represents a hydrogen atom, an alkyl group, a cycloalkyl group, an aryl group or a heterocyclic group.

The q-valent alkyl group represented by $R_9$ preferably has 1 to 18 carbon atoms, more preferably 1 to 8 carbon atoms. Examples of the divalent alkyl group represented by $R_9$ include methylene group, 1,2-ethylene group, 1,2-propylene group, 1,3-propylene group, and 1,4-butylene group, and examples of the trivalent alkyl group include propane-1,2,3-triyl group and hexane-1,5,6-triyl group.

The q-valent cycloalkyl group represented by $R_9$ preferably has 3 to 10 carbon atoms. Examples of the divalent cycloalkyl group represented by $R_9$ include 1,2-cyclohexylene group and 1,4-cyclohexylene group, and examples of the trivalent cycloalkyl group include cyclohexane-1,3,5-triyl group and adamantane-1,3,5-triyl group.

The q-valent aryl group represented by $R_9$ preferably has 6 to 14 carbon atoms. Examples of the divalent aryl group represented by $R_9$ include 1,4-phenylene group, 1,3-phenylene group, 1,4-naphthylene group, 2,6-naphthylene group, and 9,10-anthracenylene group, and examples of the trivalent aryl group include benzene-1,3,5-triyl group.

Examples of the divalent heterocyclic group represented by $R_9$ include 2,5-pyridylene group, 1,3-imidazoline group, 3,5-thienylene group, 2,5-thienylene, and 2,5-furanylene, and examples of the trivalent heterocyclic group include pyridine-2,4,6-triyl group.

The q-valent alkyl group, q-valent cycloalkyl group, q-valent aryl group or q-valent heterocyclic group represented by $R_9$ may have a substituent. The substituent is not particularly limited, and examples thereof include the same substituents as those which may be possessed by the alkyl group, cycloalkyl group, aryl group or heterocyclic group represented by $R_1$ and $R_2$ in general formula (1). Examples of the alkyl group, cycloalkyl group, aryl group or heterocyclic group represented by $R_{10}$ include the same groups as those described as examples of the alkyl group, cycloalkyl group, aryl group or heterocyclic group represented by $R_1$ and $R_2$ in general formula (1), respectively. These groups may further have a substituent, and examples of the substituent include the same groups as those which may be possessed by the alkyl group, cycloalkyl group, aryl group or heterocyclic group represented by $R_1$ and $R_2$ in general formula (1).

In general formula (2), $R_9$ is preferably a divalent alkyl group, a divalent cycloalkyl group, a divalent aryl group or a divalent heterocyclic group.

In general formula (2), q represents an integer of 2 to 3, and q is preferably 2.

<Compound Represented by General Formula (3)>

A compound represented by general formula (3) according to the present invention will be described.

General formula (3)

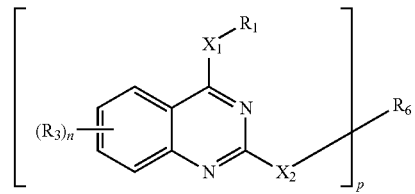

In general formula (3), $R_1$, $R_3$, n, $X_1$, and $X_2$ have the same meaning as $R_1$, $R_3$, n, $X_1$, and $X_2$ in general formula (1), respectively.

In general formula (3), $X_1$ is preferably —$NR_4$—, and, and $R_4$ is preferably a hydrogen atom.

In general formula (3), $R_6$ represents a p-valent alkyl group, a p-valent cycloalkyl group, a p-valent aryl group or a p-valent heterocyclic group; a p-valent linking group formed by combining two or more members selected from the group consisting of an alkyl group, a cycloalkyl group, an aryl group and a heterocyclic group; or a p-valent linking group formed by combining an alkyl group, a cycloalkyl group, an aryl group or a heterocyclic group with a divalent group represented by —$NR_7$—, —O—, —S—, —C(=O)—, —S(=O)$_2$—, —CH=CH— or —C≡C—. $R_7$ represents a hydrogen atom, an alkyl group, a cycloalkyl group, an aryl group or a heterocyclic group.

The p-valent alkyl group represented by $R_6$ preferably has 1 to 18 carbon atoms, more preferably 1 to 8 carbon atoms. Examples of the divalent alkyl group represented by $R_6$ include methylene group, 1,2-ethylene group, 1,2-propylene group, 1,3-propylene group, and 1,4-butylene group, and examples of the trivalent alkyl group include propane-1,2,3-triyl group and hexane-1,5,6-triyl group.

The p-valent cycloalkyl group preferably has 3 to 10 carbon atoms. Examples of the divalent cycloalkyl group represented by $R_6$ include 1,2-cyclohexylene group and 1,4-cyclohexylene group, and examples of the trivalent cycloalkyl group include cyclohexane-1,3,5-triyl group and adamantane-1,3,5-triyl group.

The p-valent aryl group preferably has 6 to 14 carbon atoms. Examples of the divalent aryl group represented by $R_6$ include 1,4-phenylene group, 1,3-phenylene group, 1,4-naphthylene group, 2,6-naphthylene group, and 9,10-anthracenylene group, and examples of the trivalent aryl group include benzene-1,3,5-triyl group.

Examples of the divalent heterocyclic group represented by $R_6$ include 2,5-pyridylene group, 1,3-imidazoline group, 3,5-thienylene group, 2,5-thienylene, and 2,5-furanylene, and examples of the trivalent heterocyclic group include pyridine-2,4,6-triyl group.

The p-valent alkyl group, p-valent cycloalkyl group, p-valent aryl group or p-valent heterocyclic group represented by $R_6$ may further have a substituent. The substituent is not particularly limited, and examples thereof include the same substituents as those which may be possessed by the alkyl group, cycloalkyl group, aryl group or heterocyclic group represented by $R_1$ and $R_2$ in general formula (1). Examples of the alkyl group, cycloalkyl group, aryl group or heterocyclic group represented by $R_7$ include the same groups as those described as examples of the alkyl group, cycloalkyl group, aryl group or heterocyclic group represented by $R_1$ and $R_2$ in general formula (1), respectively. These groups may further have a substituent, and examples of the substituent include the same groups as those which may be possessed by the alkyl group, cycloalkyl group, aryl group or heterocyclic group represented by $R_1$ and $R_2$ in general formula (1).

In general formula (3), $R_6$ is preferably a p-valent cycloalkyl group, a p-valent aryl group or a p-valent heterocyclic group, more preferably a divalent cycloalkyl group, a divalent aryl group or a divalent heterocyclic group, and most preferably a divalent aryl group.

In general formula (3), p represents an integer of 2 or 3, and p is preferably 2.

In the present invention, the compound represented by general formula (3) is particularly preferably a compound represented by general formula (4).

<Compound Represented by General Formula (4)>

A compound represented by general formula (4) according to the present invention will be described.

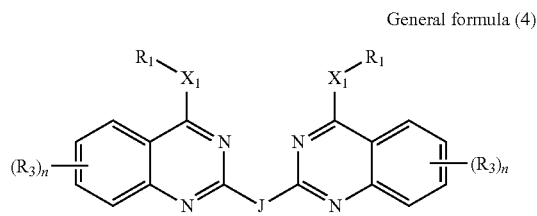

General formula (4)

In general formula (4), $R_1$, $R_3$, n, and $X_1$ have the same meaning as $R_1$, $R_3$, n, and $X_1$ in general formula (3), respectively.

In general formula (4), $X_1$ is preferably —$NR_4$—, and, $R_4$ is preferably a hydrogen atom.

In general formula (4), J represents a divalent alkyl group, a divalent cycloalkyl group, a divalent aryl group or a divalent heterocyclic group; or a divalent linking group formed by combining two or more members selected from the group consisting of an alkyl group, a cycloalkyl group, an aryl group and a heterocyclic group.

Examples of the divalent alkyl group, divalent cycloalkyl group, divalent aryl group or divalent heterocyclic group represented by J include the same groups as those mentioned as examples of the divalent alkyl group, divalent cycloalkyl group, divalent aryl group or divalent heterocyclic group represented by $R_6$ in general formula (3), respectively. These groups may further have a substituent, and examples of the substituent include the same groups as those which may be possessed by the alkyl group, cycloalkyl group, aryl group or heterocyclic group represented by $R_1$ and $R_2$ in general formula (1).

When J represents a divalent linking group formed by combining two or more members selected from the group consisting of an alkyl group, a cycloalkyl group, an aryl group and a heterocyclic group, the alkyl group, cycloalkyl group, aryl group or heterocyclic group may be combined through at least one internal divalent linking group selected from the group consisting of —$NR_{12}$—, —O—, —S—, —C(=O)—, —S(=O)$_2$—, —CH=CH— and —C≡C—, respectively. $R_{12}$ represents a hydrogen atom, an alkyl group, a cycloalkyl group, an aryl group or a heterocyclic group. Examples of the alkyl group, cycloalkyl group, aryl group or heterocyclic group represented by $R_{12}$ include the same groups as those described as examples of the alkyl group, cycloalkyl group, aryl group or heterocyclic group represented by $R_1$ and $R_2$ in general formula (1), respectively. These groups may further have a substituent, and examples of the substituent include the same groups as those which may be possessed by the alkyl group, cycloalkyl group, aryl group or heterocyclic group represented by $R_1$ and $R_2$ in general formula (1).

In general formula (4), J is preferably a divalent cycloalkyl group, a divalent aryl group, a divalent heterocyclic group, or a divalent linking group selected from a combination of these groups, more preferably a divalent aryl group or a combination of these groups.

Specific examples of the compound represented by general formulas (1) to (4) will be given below, but the present invention is not limited to the following specific examples at all.

First, specific examples of the compound represented by general formula (1) will be given below.

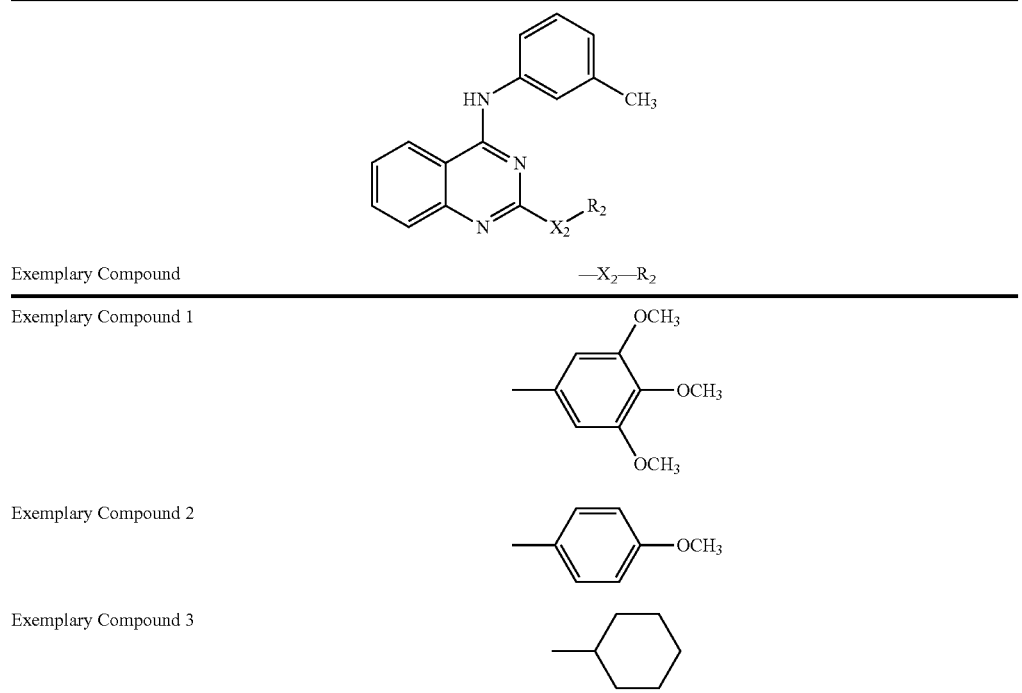

-continued
Exemplary Compound 4 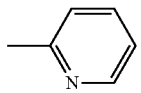
Exemplary Compound 5 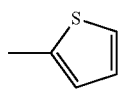
Exemplary Compound 6 —CH$_3$
Exemplary Compound 7 —C$_3$H$_7$(i)
Exemplary Compound 8 —C$_4$H$_9$(t)
Exemplary Compound 9 —C$_7$H$_{15}$(t)
Exemplary Compound 10 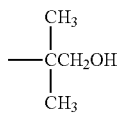
Exemplary compound 11 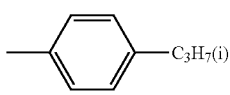
Exemplary compound 12 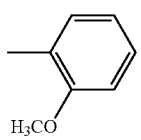
Exemplary compound 13 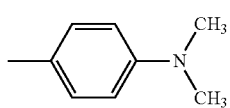
Exemplary compound 14 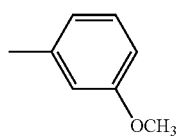
Exemplary compound 15 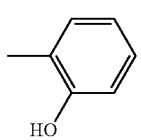
Exemplary compound 16 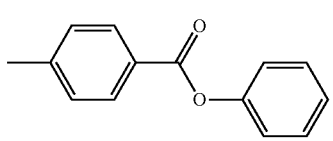
Exemplary Compound 17 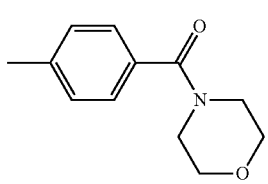
Exemplary Compound 18 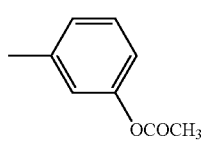

-continued
Exemplary Compound 19
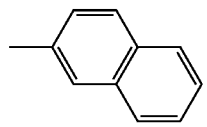
Exemplary Compound 20
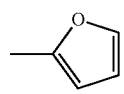
Exemplary Compound 21
—CH$_2$CH$_2$COOCH$_3$
Exemplary compound 22
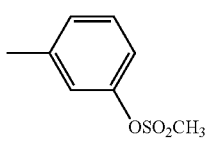
Exemplary compound 23
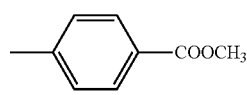
Exemplary compound 24
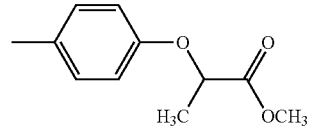
Exemplary compound 25
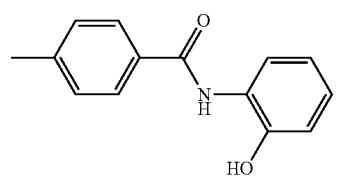 [SMILES: Cc1ccc(C(=O)Nc2ccccc2O)cc1]
Exemplary compound 26
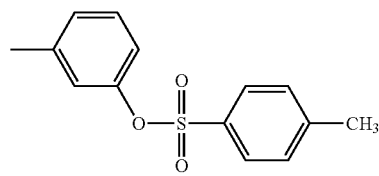
Exemplary compound 27
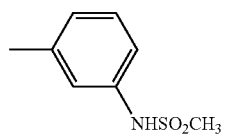
Exemplary compound 28
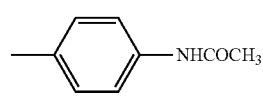
Exemplary compound 29
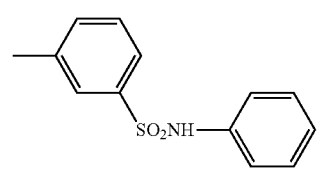
Exemplary compound 30
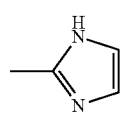

-continued
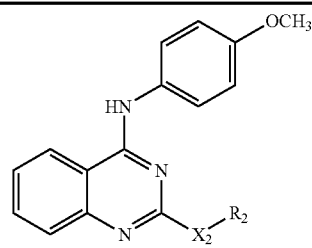
| Exemplary compound | —X₂—R₂ |
|---|---|
| Exemplary compound 31 | 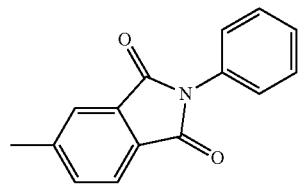 |
| Exemplary compound 32 | 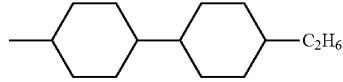 |
| Exemplary compound 33 | 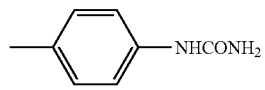 |
| Exemplary compound 34 | 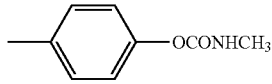 |
| Exemplary compound 35 | 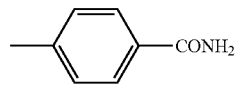 |
| Exemplary compound 36 | 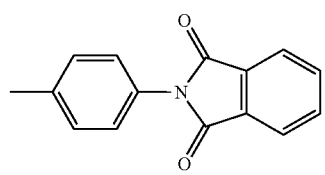 |
| Exemplary compound 37 | 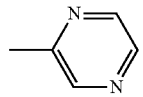 |
| Exemplary compound 38 | 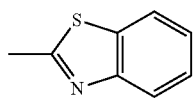 |
| Exemplary compound 39 | 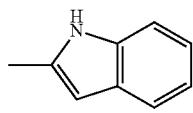 |
| Exemplary compound 40 | 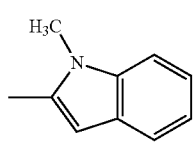 |
| Exemplary compound 41 | 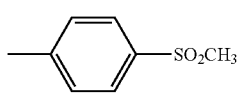 |

| | |
|---|---|
| Exemplary compound 42 | 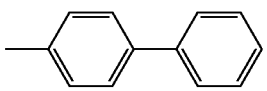 |
| Exemplary compound 43 | 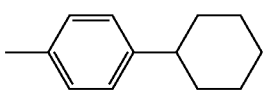 |
| Exemplary compound 44 | 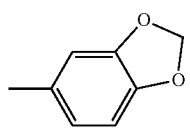 |
| Exemplary compound 45 | 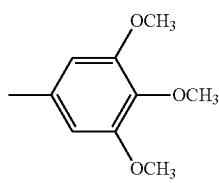 |
| Exemplary compound 46 | 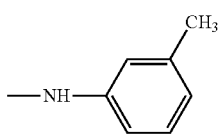 |
| Exemplary compound 47 | 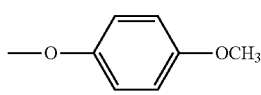 |
| Exemplary compound 48 |  |
| Exemplary compound 49 | 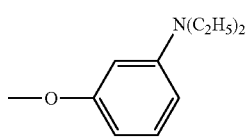 |
| Exemplary compound 50 | 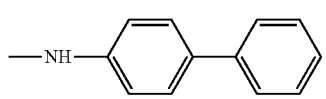 |
| Exemplary compound 51 | 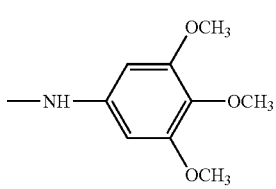 |
| Exemplary compound 52 | 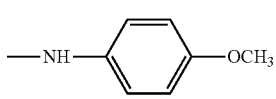 |
| Exemplary compound 53 | —NHC$_4$H$_9$(n) |
| Exemplary compound 54 | 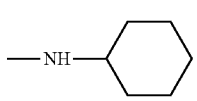 |

-continued
| | |
|---|---|
| Exemplary compound 55 | 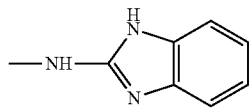 |
| Exemplary compound 56 | 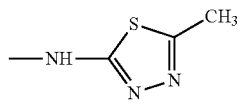 |
| Exemplary compound 57 | 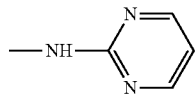 |
| Exemplary compound 58 | 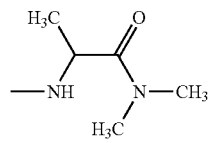 |
| Exemplary compound 59 | —SC$_8$H$_{17}$(n) |
| Exemplary compound 60 | —OCH$_2$CH$_2$OH |
| Exemplary compound 61 | 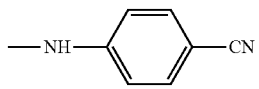 |
| Exemplary compound 62 | 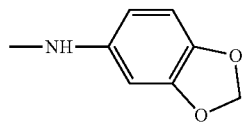 |
| Exemplary compound 63 | 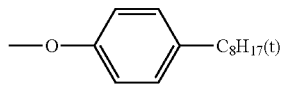 |
| Exemplary compound 64 | 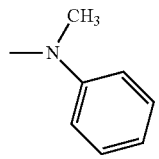 |
| Exemplary compound 65 | 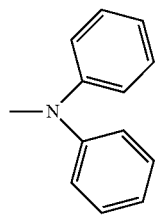 |
| Exemplary compound 66 | 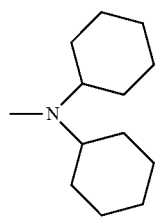 |
| Exemplary compound 67 | —N(C$_8$H$_{17}$(i))$_2$ |

-continued
| | |
|---|---|
| Exemplary compound 68 | 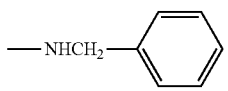 —NHCH₂—C₆H₅ |
| Exemplary compound 69 | 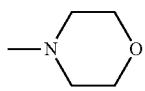 |
| Exemplary compound 70 | —NHCH₂CH₂OCH₃ |
| Exemplary compound 71 | 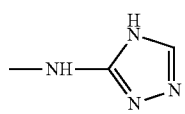 |
| Exemplary compound 72 | 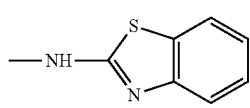 |
| Exemplary compound 73 | 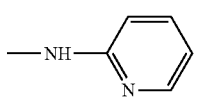 |
| Exemplary compound 74 | 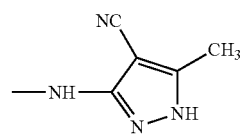 |
| Exemplary compound 75 | 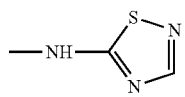 |
| Exemplary compound | —X₁—R₁ |
|---|---|
| Exemplary compound 76 | 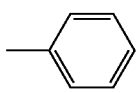 |
| Exemplary compound 77 | —CH₃ |
| Exemplary compound 78 | —C₃H₇(i) |
| Exemplary compound 79 | 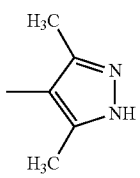 |
| Exemplary compound 80 | 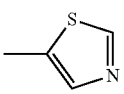 |

| | |
|---|---|
| Exemplary compound 81 | 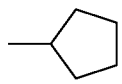 |
| Exemplary compound 82 | 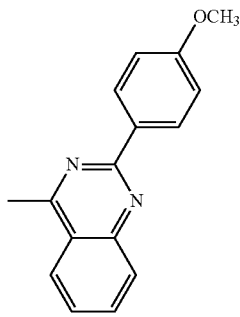 |
| Exemplary compound 83 | 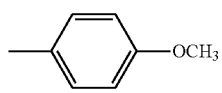 |
| Exemplary compound 84 | 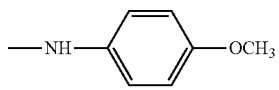 |
| Exemplary compound 85 | 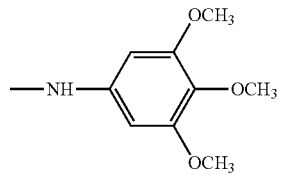 |
| Exemplary compound 86 | 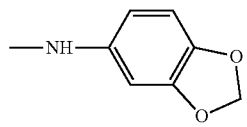 |
| Exemplary compound 87 | —NHC$_3$H$_7$(n) |
| Exemplary compound 88 | 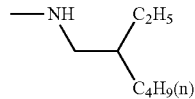 |
| Exemplary compound 89 | —N(C$_8$H$_{17}$(i))$_2$ |
| Exemplary compound 90 |  |
| Exemplary compound 91 | 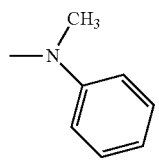 |
| Exemplary compound 92 | 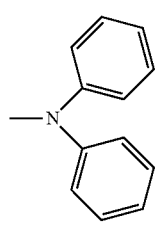 |

-continued
| | |
|---|---|
| Exemplary compound 93 | 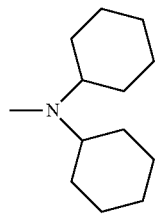 |
| Exemplary compound 94 | 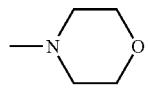 |
| Exemplary compound 95 | 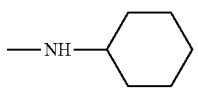 |
| Exemplary compound 96 | 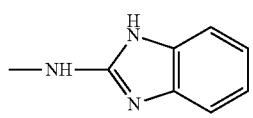 |
| Exemplary compound 97 | 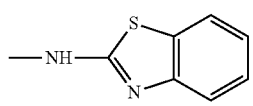 |
| Exemplary compound 98 | 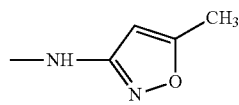 |
| Exemplary compound 99 | 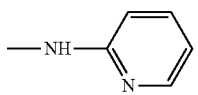 |
| Exemplary compound 100 | 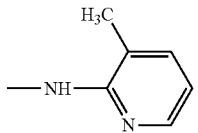 |
| Exemplary compound 101 | 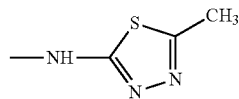 |
| Exemplary compound 102 | 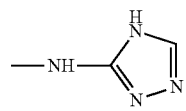 |
| Exemplary compound 103 | 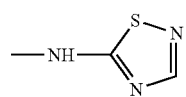 |
| Exemplary compound 104 | 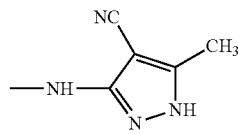 |
| Exemplary compound 105 | 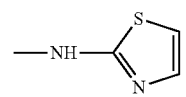 |

-continued
Exemplary compound 106
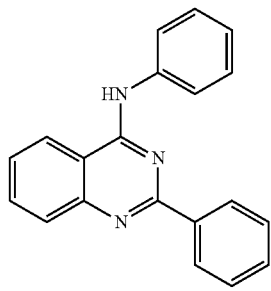 [SMILES: c1ccc(Nc2nc(-c3ccccc3)nc3ccccc23)cc1]
Exemplary compound 107
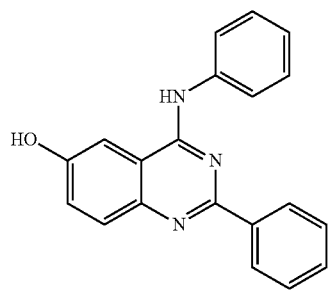 [SMILES: Oc1ccc2nc(-c3ccccc3)nc(Nc3ccccc3)c2c1]
Exemplary compound 108
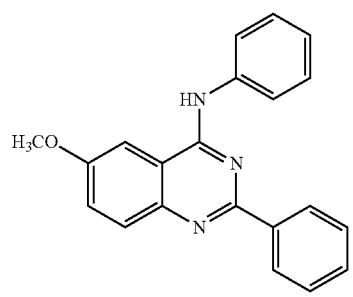 [SMILES: COc1ccc2nc(-c3ccccc3)nc(Nc3ccccc3)c2c1]
Exemplary compound 109
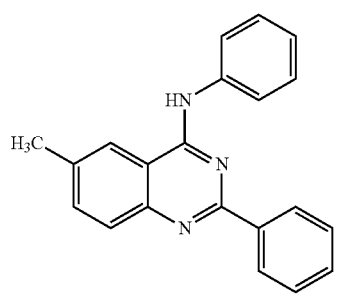 [SMILES: Cc1ccc2nc(-c3ccccc3)nc(Nc3ccccc3)c2c1]
Exemplary compound 110
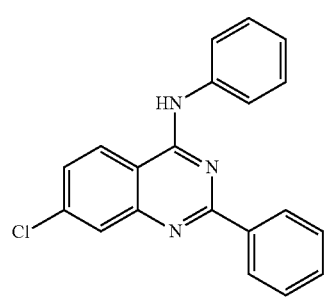 [SMILES: Clc1ccc2c(Nc3ccccc3)nc(-c3ccccc3)nc2c1]

Exemplary compound 111
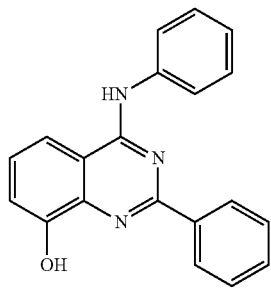 [SMILES: Oc1cccc2c(Nc3ccccc3)nc(-c3ccccc3)nc12]
Exemplary compound 112
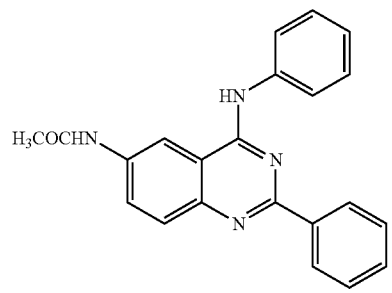
Exemplary compound 113
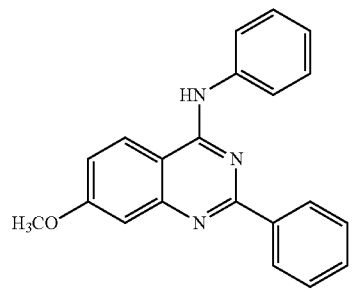 [SMILES: COc1ccc2c(Nc3ccccc3)nc(-c3ccccc3)nc2c1]
Exemplary compound 114
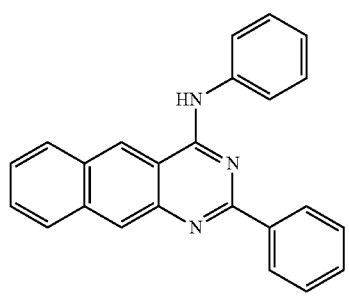 [SMILES: c1ccc(Nc2nc(-c3ccccc3)nc3cc4ccccc4cc23)cc1]
Exemplary compound 115
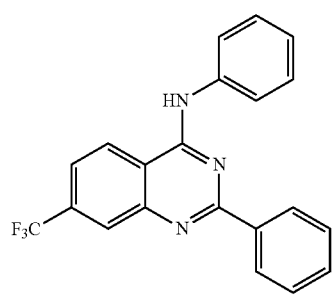 [SMILES: FC(F)(F)c1ccc2c(Nc3ccccc3)nc(-c3ccccc3)nc2c1]

-continued
Exemplary compound 116
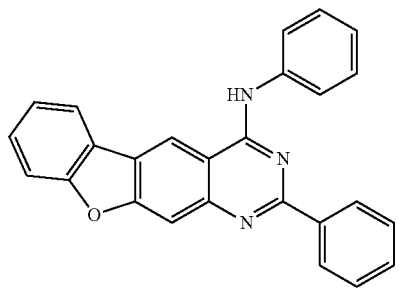 [SMILES: c1ccc(Nc2nc(-c3ccccc3)nc3cc4oc5ccccc5c4cc23)cc1]
Exemplary compound 117
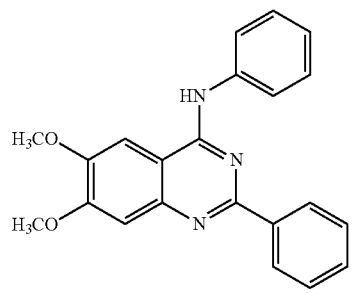 [SMILES: COc1cc2nc(-c3ccccc3)nc(Nc3ccccc3)c2cc1OC]
Exemplary compound 118
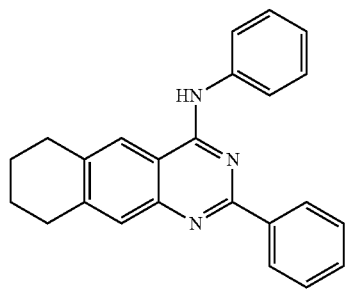 [SMILES: c1ccc(Nc2nc(-c3ccccc3)nc3cc4c(cc23)CCCC4)cc1]
Exemplary compound 119
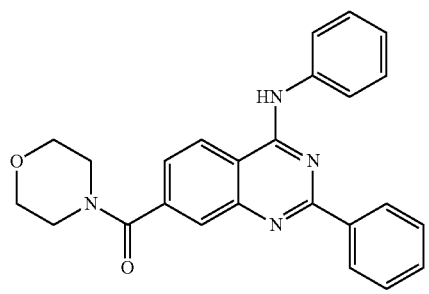 [SMILES: O=C(c1ccc2c(Nc3ccccc3)nc(-c3ccccc3)nc2c1)N1CCOCC1]
Exemplary compound 120
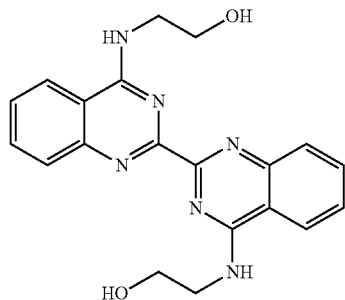 [SMILES: OCCNc1nc(-c2nc(NCCO)c3ccccc3n2)nc2ccccc12]

-continued
Exemplary compound 121
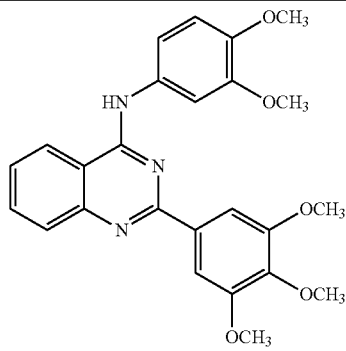
Exemplary compound 122
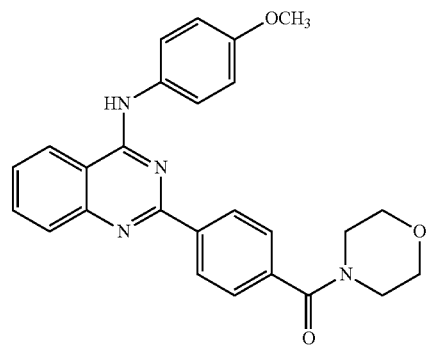 [SMILES: COc1ccc(Nc2nc(-c3ccc(C(=O)N4CCOCC4)cc3)nc3ccccc23)cc1]
Exemplary compound 123
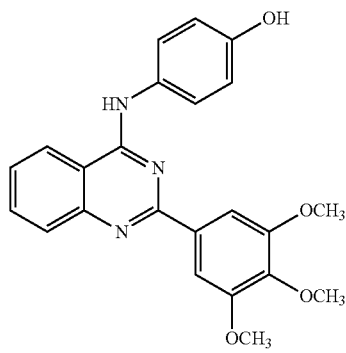 [SMILES: COc1cc(-c2nc(Nc3ccc(O)cc3)c3ccccc3n2)cc(OC)c1OC]
Exemplary compound 124
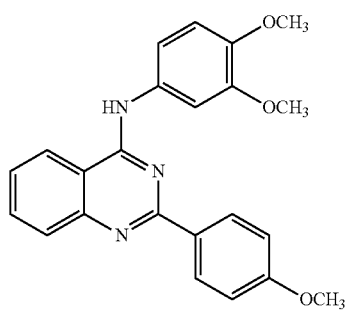 [SMILES: COc1ccc(-c2nc(Nc3ccc(OC)c(OC)c3)c3ccccc3n2)cc1]
Exemplary compound 125
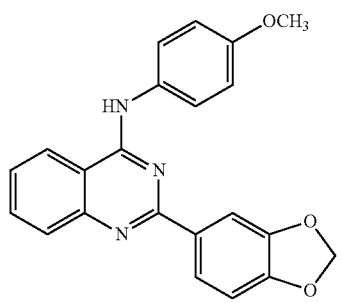 [SMILES: COc1ccc(Nc2nc(-c3ccc4c(c3)OCO4)nc3ccccc23)cc1]

Exemplary compound 126
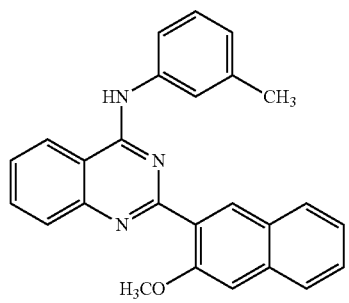 [SMILES: COc1cc2ccccc2cc1-c1nc(Nc2cccc(C)c2)c2ccccc2n1]
Exemplary compound 127
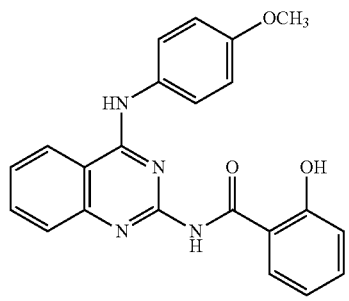 [SMILES: COc1ccc(Nc2nc(NC(=O)c3ccccc3O)nc3ccccc23)cc1]
Exemplary compound 128
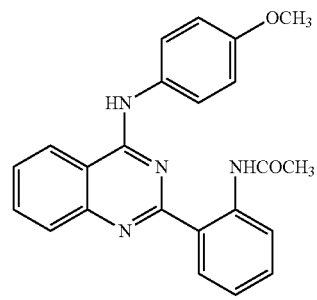
Exemplary compound 129
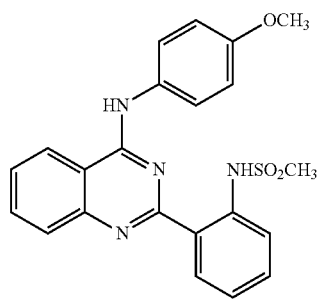
Exemplary compound 130
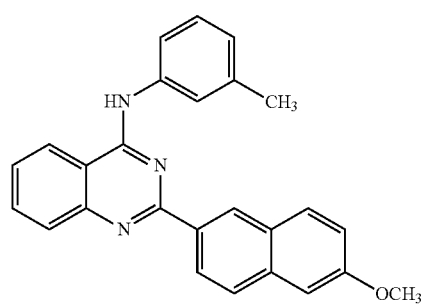 [SMILES: COc1ccc2cc(-c3nc(Nc4cccc(C)c4)c4ccccc4n3)ccc2c1]

Exemplary compound 131
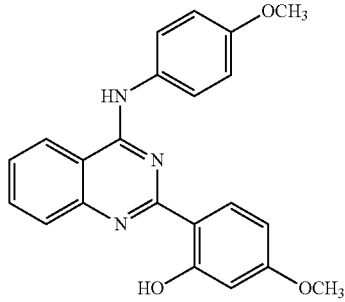 [SMILES: COc1ccc(Nc2nc(-c3ccc(OC)cc3O)nc3ccccc23)cc1]
Exemplary compound 132
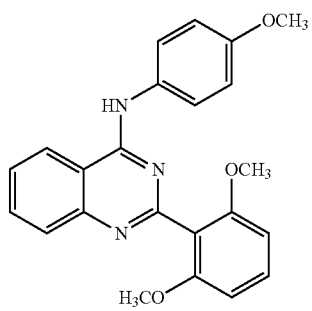 [SMILES: COc1ccc(Nc2nc(-c3c(OC)cccc3OC)nc3ccccc23)cc1]
Exemplary compound 133
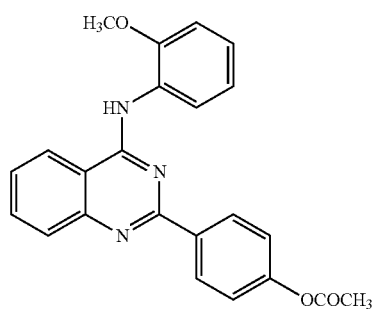
Exemplary compound 134
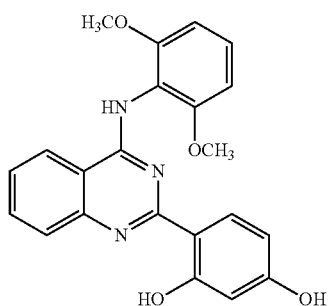 [SMILES: COc1cccc(OC)c1Nc1nc(-c2ccc(O)cc2O)nc2ccccc12]
Exemplary compound 135
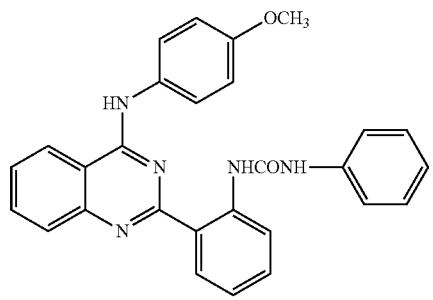

-continued
Exemplary compound 136
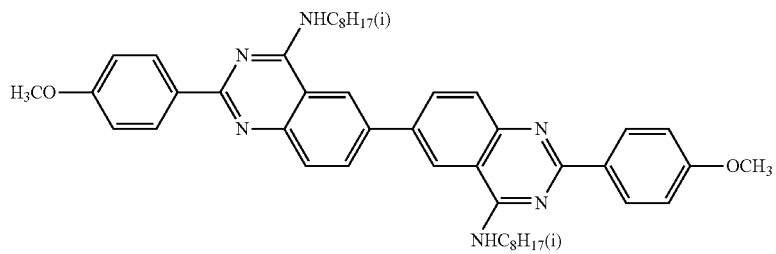
Exemplary compound 137
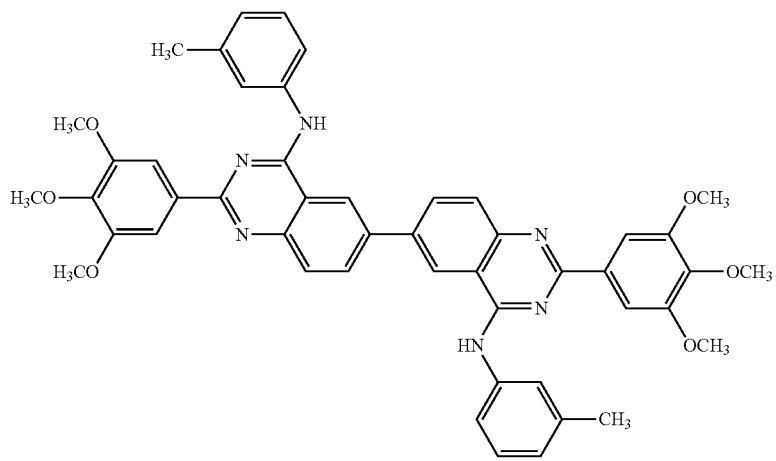 [SMILES: COc1cc(-c2nc(Nc3cccc(C)c3)c3cc(-c4ccc5nc(-c6cc(OC)c(OC)c(OC)c6)nc(Nc6cccc(C)c6)c5c4)ccc3n2)cc(OC)c1OC]
Exemplary compound 138
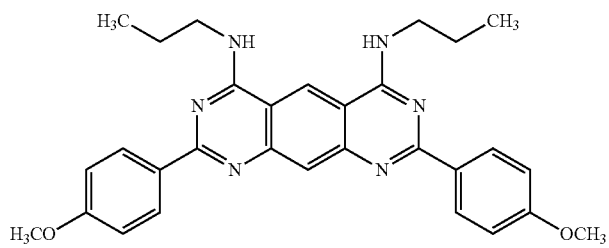 [SMILES: CCCNc1nc(-c2ccc(OC)cc2)nc2cc3nc(-c4ccc(OC)cc4)nc(NCCC)c3cc12]
Exemplary compound 139
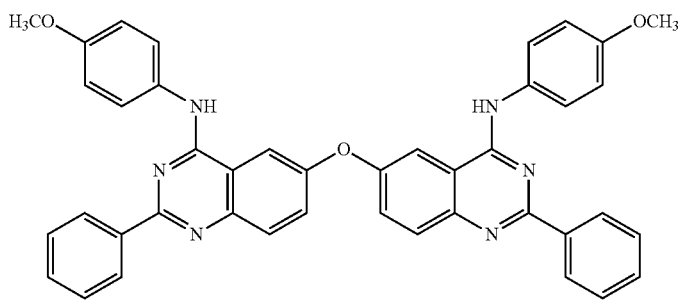 [SMILES: COc1ccc(Nc2nc(-c3ccccc3)nc3ccc(Oc4ccc5nc(-c6ccccc6)nc(Nc6ccc(OC)cc6)c5c4)cc23)cc1]
Exemplary compound 140
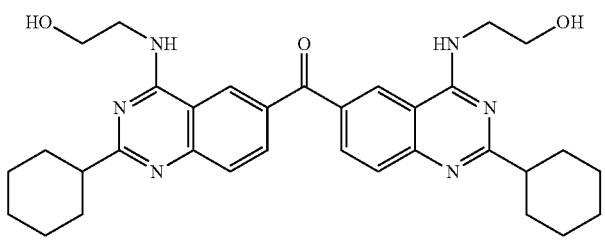 [SMILES: O=C(c1ccc2nc(C3CCCCC3)nc(NCCO)c2c1)c1ccc2nc(C3CCCCC3)nc(NCCO)c2c1]

Exemplary compound 141

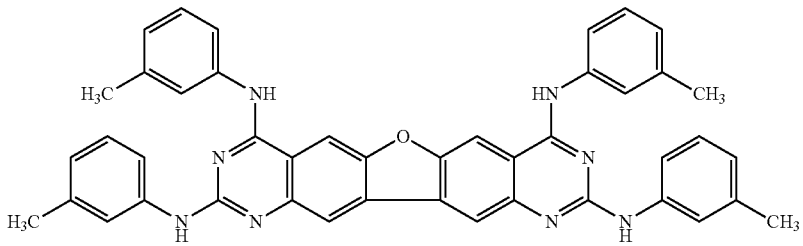

Next, specific examples of the compound represented by general formula (2) will be given.

| Exemplary compound | —L— |
|---|---|
| Exemplary compound 142 | 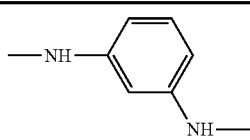 |
| Exemplary compound 143 | —O—C₆H₄—O— (meta) |
| Exemplary compound 144 | 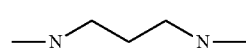 |
| Exemplary compound 145 | 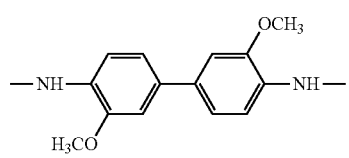 |
| Exemplary compound 146 | 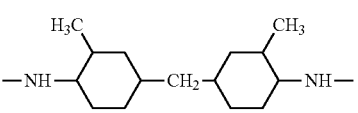 |
| Exemplary compound 147 | 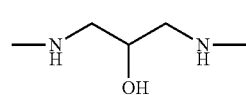 |
| Exemplary compound 148 | 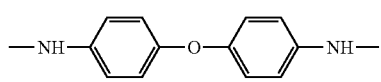 |
| Exemplary compound 149 | 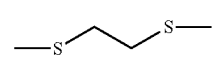 |
| Exemplary compound 150 | 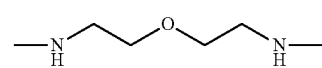 |
| Exemplary compound 151 | 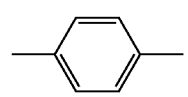 |
| Exemplary compound 152 | 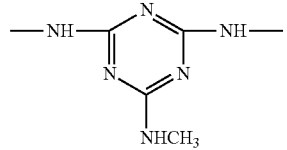 |
| Exemplary compound 153 | 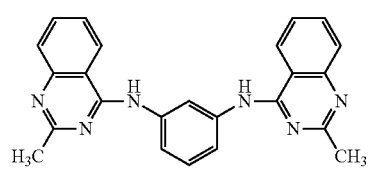 |
| Exemplary compound 154 | 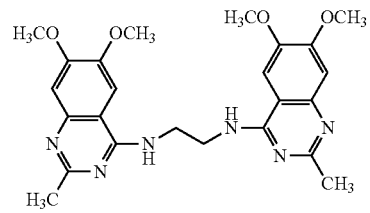 |

Next, specific examples of the compound represented by general formula (3) will be given.

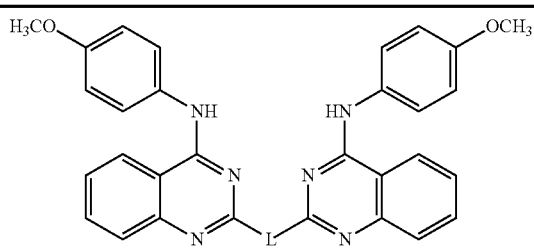
| Exemplary compound | —L— |
|---|---|
| Exemplary compound 155 5 | 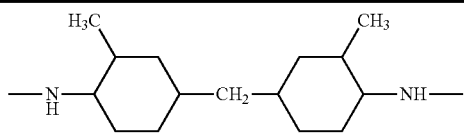 |
| Exemplary compound 156 6 | 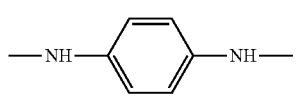 |
| Exemplary compound 157 7 |  |
| Exemplary compound 158 8 | 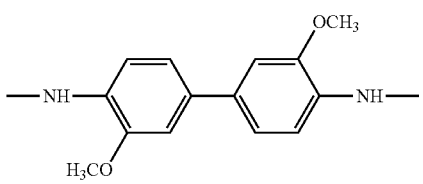 |
| Exemplary compound 159 9 | 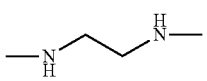 |
| Exemplary compound 160 0 | 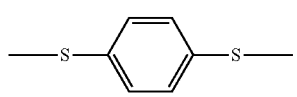 |
| Exemplary compound 161 1 | 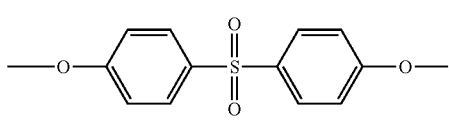 |
| Exemplary compound 162 2 | 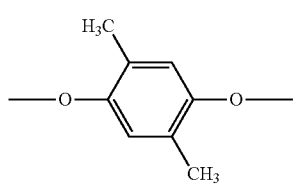 |
| Exemplary compound 163 3 | 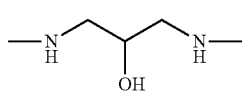 |
| Exemplary compound 164 4 | 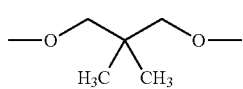 |
| Exemplary compound 165 | 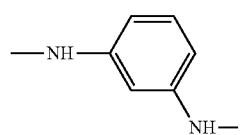 |

| | |
|---|---|
| Exemplary compound 166 | 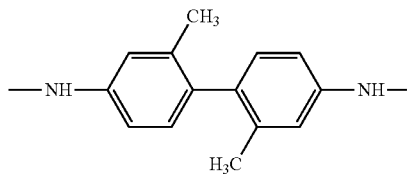 |
| Exemplary compound 167 | 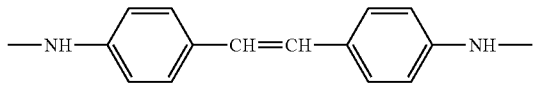 |
| Exemplary compound 168 | 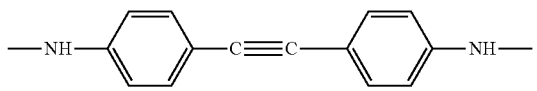 |
| Exemplary compound 169 | 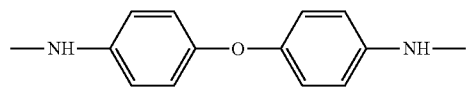 |
| Exemplary compound 170 | 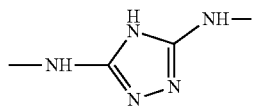 |
| Exemplary compound 171 | 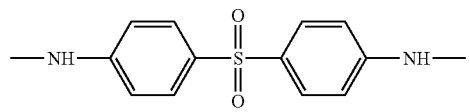 |
| Exemplary compound 172 | 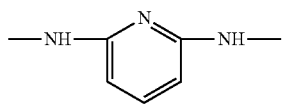 |
| Exemplary compound 173 | 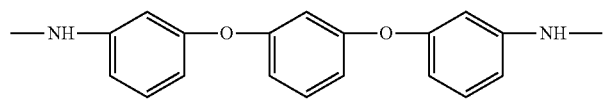 |
| Exemplary compound 174 | 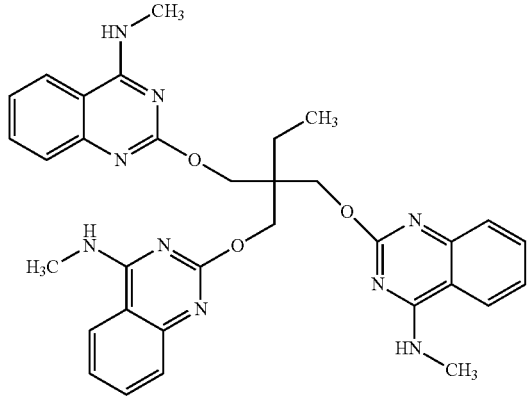 |
| Exemplary compound 175 | 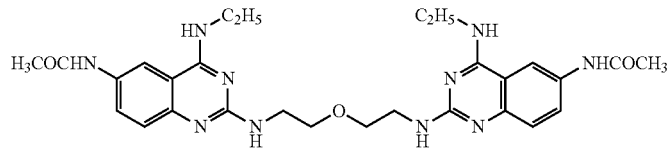 |

Exemplary compound 176
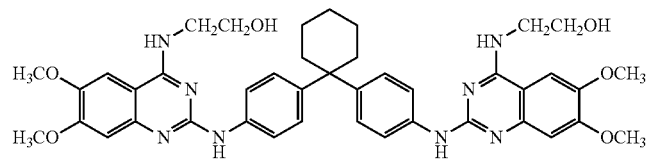
Exemplary compound 177
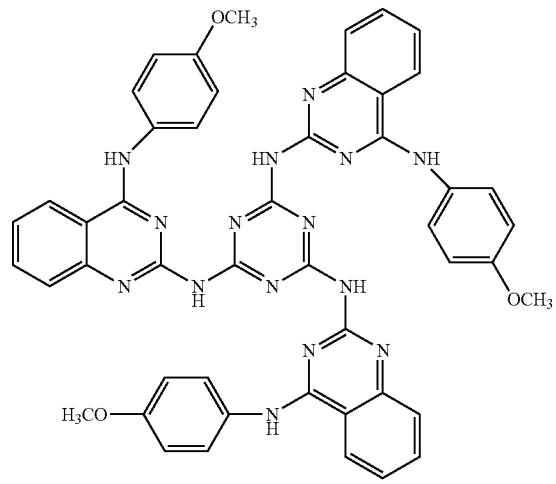 [SMILES: COc1ccc(Nc2nc(Nc3nc(Nc4nc(Nc5ccc(OC)cc5)c5ccccc5n4)nc(Nc4nc(Nc5ccc(OC)cc5)c5ccccc5n4)n3)nc3ccccc23)cc1]
Exemplary compound 178
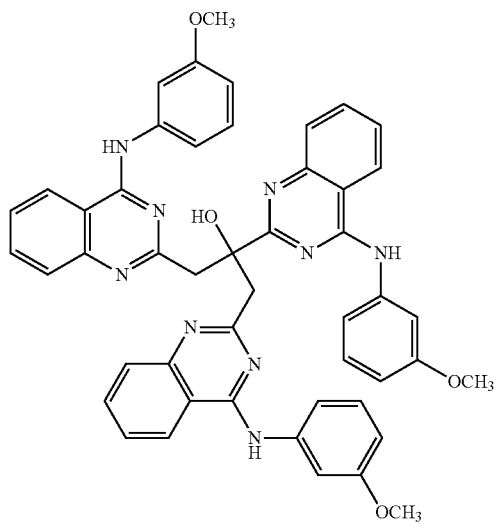 [SMILES: COc1cccc(Nc2nc(CC(O)(Cc3nc(Nc4cccc(OC)c4)c4ccccc4n3)c3nc(Nc4cccc(OC)c4)c4ccccc4n3)nc3ccccc23)c1]
Exemplary compound 179
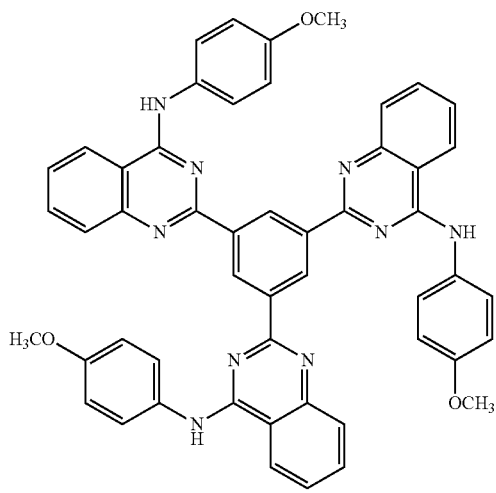 [SMILES: COc1ccc(Nc2nc(-c3cc(-c4nc(Nc5ccc(OC)cc5)c5ccccc5n4)cc(-c4nc(Nc5ccc(OC)cc5)c5ccccc5n4)c3)nc3ccccc23)cc1]

Exemplary compound 180
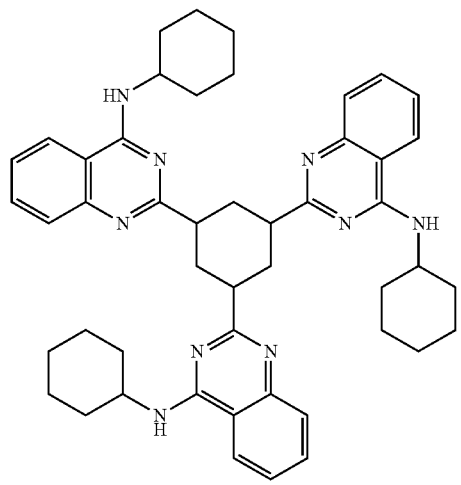 [SMILES: c1ccc2c(NC3CCCCC3)nc(C3CC(c4nc(NC5CCCCC5)c5ccccc5n4)CC(c4nc(NC5CCCCC5)c5ccccc5n4)C3)nc2c1]
Exemplary compound 181
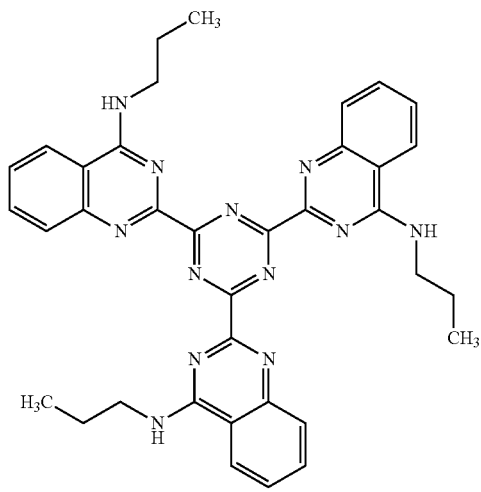 [SMILES: CCCNc1nc(-c2nc(-c3nc(NCCC)c4ccccc4n3)nc(-c3nc(NCCC)c4ccccc4n3)n2)nc2ccccc12]
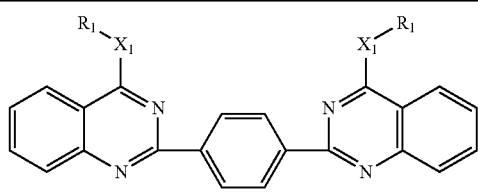
| Exemplary compound | —X$_1$—R$_1$ |
|---|---|
| Exemplary compound 182 |  |
| Exemplary compound 183 | —C$_2$H$_5$ |
| Exemplary compound 184 |  |
| Exemplary compound 185 | 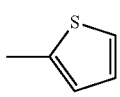 |

-continued
| Exemplary compound | —L— |
|---|---|
| Exemplary compound 186 |  |
| Exemplary compound 187 | 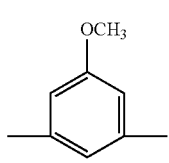 |
| Exemplary compound 188 |  |
| Exemplary compound 189 | —CH$_2$CH$_2$— |
| Exemplary compound 190 | 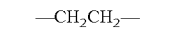 |
| Exemplary compound 191 | 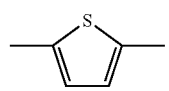 |
| Exemplary compound 192 | 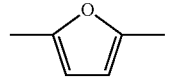 |
| Exemplary compound 193 | 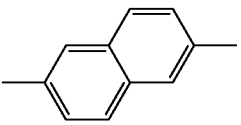 |
| Exemplary compound 194 | 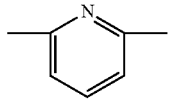 |
| Exemplary compound 195 | 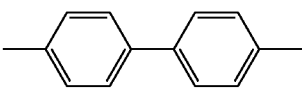 |
| Exemplary compound 196 | 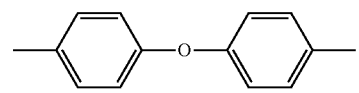 |
| Exemplary compound 197 | 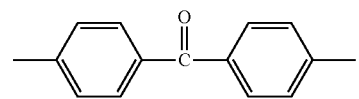 |
| Exempbry compound 198 | 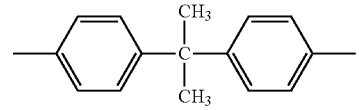 |
| Exemplary compound 199 | 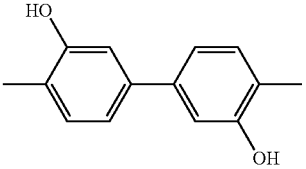 |

-continued

| Exemplary compound | —X$_1$—R$_1$ |
|---|---|
| Exemplary compound 200 | —NHC$_3$H$_7$(n) |
| Exemplary compound 201 | —NH—CH(C$_2$H$_5$)CH$_2$C$_4$H$_9$(n) |
| Exemplary compound 202 | —NH—cyclohexyl |
| Exemplary compound 203 | —NH—(3,4,5-trimethoxyphenyl) (OCH$_3$, OCH$_3$, OCH$_3$) |
| Exemplary compound 204 | —NH—(3-methylphenyl) |
| Exemplary compound 205 | —N(CH$_3$)$_2$ |
| Exemplary compound 206 | —NHCH$_2$—phenyl |
| Exemplary compound 207 | —NH—(2-pyridyl) |
| Exemplary compound 208 | —NH—(4-biphenyl) |
| Exemplary compound 209 | —NHCH$_2$CH$_2$OH |
| Exemplary compound 210 | —O—(4-isopropylphenyl)—C$_3$H$_7$(i) |
| Exemplary compound 211 | —OCH$_2$CH$_2$OCH$_3$ |
| Exemplary compound 212 | —S—(4-chlorophenyl)—Cl |
| Exemplary compound 213 | [Structure: bis-quinazoline compound with H$_3$CO, H$_3$CO substituents at 6,7-positions, NH-phenyl groups, connected via a central phenylene linker to another quinazoline with OCH$_3$, OCH$_3$ and NH-phenyl] |

The compounds represented by general formulas (1) to (4) according to the present invention can be produced according to a method known in the art. For example, these compounds can be synthesized according to the procedure described in Synthesis 1981 (1), 35-36, Journal of the American Chemical Society, 1931, 53 (10) 3867-3875, and the like.

Specific synthetic methods of the compounds represented by general formulas (1) to (4) according to the present invention will be described in Examples to be described below, but the present invention is not limited to these synthetic methods.

The compound represented by general formula (1) of the present invention can be preferably used as a retardation enhancer.

The retardation enhancer refers to a compound which increases the retardation of a film by 10 nm or more, preferably 40 nm or more, when it is added to a cellulose derivative in an amount of 1 to 15 wt %, preferably 2 to 10 wt %, as compared with the retardation when the retardation enhancer is not added.

2. Retardation Film

A retardation film of the present invention contains the compound represented by general formula (1) as described above. The retardation film of the present invention preferably contains a resin and a compound represented by general formula (1). The compound represented by general formula (1) may be a compound represented by any of general formulas (2) to (4). Either one type or different types of the compound represented by general formula (1) may be used.

The resin used as the main component of the retardation film according to the present invention preferably contains a cellulose derivative.

Cellulose Derivative

The cellulose derivative used in the present invention refers to a compound in which cellulose is used as the base structure, for example, a cellulose skeleton-containing compound prepared by biologically or chemically introducing a functional group to cellulose as the raw material.

Examples of the cellulose derivative used in the present invention include cellulose ethers (e.g., methylcellulose, ethylcellulose, hydroxyethylcellulose, hydroxypropylcellulose, and cyanoethylcellulose), cellulose esters (e.g., triacetyl cellulose, diacetyl cellulose, cellulose acetate propionate, cellulose acetate butyrate, cellulose acetate phthalate, cellulose acetate trimellitate, and cellulose nitrate), cellulose ether esters (e.g., acetyl methylcellulose, acetyl ethylcellulose, acetyl hydroxyethylcellulose, and benzoyl hydroxypropylcellulose), cellulose carbonates (e.g., cellulose ethyl carbonate), and cellulose carbamates (e.g., cellulose phenyl carbamate), with cellulose esters being preferred. Note that in the present invention, two or more different types of cellulose derivatives may be mixed.

Cellulose Ester

Although the type of esters for the cellulose derivative in the present invention is not limited, the ester is preferably a $C_{2-22}$ linear or branched carboxylate, and the carboxylic acid for the ester may form a ring or may be an ester of a $C_{7-11}$ aromatic carboxylic acid. The carboxylic acids may have a substituent. In particular, cellulose ester is preferably a lower fatty acid having 6 or less carbon atoms.

Specific examples of the type of further preferred cellulose ester other than cellulose acetate include a mixed fatty acid ester of cellulose in which a propionate group or a butyrate group is bonded in addition to an acetyl group, such as cellulose acetate propionate, cellulose acetate butyrate, and cellulose acetate propionate butyrate.

The total degree of acyl substitution of the cellulose ester used in the present invention is preferably 1.5 or more and 3.0 or less, more preferably 1.5 or more and 2.6 or less.

The cellulose ester used in the present invention particularly preferably satisfies the following expressions (a) and (b) simultaneously.

$$1.5 \leq X+Y \leq 2.6 \qquad \text{Expression (a)}$$

$$0 < X \leq 2.6 \qquad \text{Expression (b)}$$

(In the expressions, X is the degree of acetyl substitution, and Y is the degree of propionyl or butyryl substitution or the degree of substitution of a mixture thereof.)

Especially, cellulose acetate (Y=0) and cellulose acetate propionate (Y; propionyl group, Y>0) are most advantageously used. For cellulose acetate, X is preferably in the range of $2.0 \leq X \leq 2.6$; and for cellulose acetate propionate, X, Y, Z are preferably in the range of $0 \leq X \leq 2.0$, $0.5 \leq Y \leq 2.0$, and $1.5 \leq X+Y \leq 2.6$, respectively. The degree of acyl substitution can be measured according to ASTM-D 817-96. The part which is not substituted with an acyl group is generally present as a hydroxyl group.

In order to obtain optical characteristics for desired purposes, resins having different degrees of substitution may be mixed. The mixing ratio is preferably 10:90 to 90:10 (mass ratio).

The number-average molecular weight (Mn) of the cellulose derivative, preferably a cellulose ester, used in the present invention is preferably in the range of 30,000 to 200,000 because the mechanical strength of the resulting film is high. Further, the cellulose derivative having a number-average molecular weight (Mn) of 40,000 to 100,000 is advantageously used.

The weight-average molecular weight (Mw) and the number-average molecular weight (Mn) of the cellulose derivative, preferably cellulose ester, used in the present invention can be preferably measured by gel permeation chromatography (GPC).

Exemplary measurement conditions are as follows, but measurement conditions are not limited to those described below. It is also possible to employ an equivalent measuring method.
Solvent: Methylene chloride
Column: Shodex K806, K805, K803G (manufactured by Showa Denko K.K.; the three columns are connected together for use)
Column temperature: 25° C.
Sample concentration: 0.1 wt %
Detector: RI Model 504 (manufactured by GL Sciences Inc.)
Pump: L6000 (manufactured by Hitachi, Ltd.)
Flow rate: 1.0 ml/min
Calibration curve: 13 samples of standard polystyrene STK standard polystyrene (manufactured by Tosoh Corp.) with molecular weights ranging equally spaced from 500 to 1,000,000 are used.

The cellulose derivative, preferably cellulose ester, used in the present invention preferably has a value of weight-average molecular weight (Mw)/number average molecular weight (Mn) of 1.0 to 3.0.

Examples of cellulose as a raw material of the cellulose derivative used in the present invention include, but are not particularly limited to, cotton linters, wood pulp, and kenaf. The cellulose derivatives obtained from these materials can be mixed with each other at any ratio for use.

The cellulose derivative used in the present invention, preferably a cellulose ester such as cellulose acetate or cellulose acetate propionate, can be produced by any of the methods known in the art. Specifically, the cellulose derivative can be synthesized according to the procedure described in Japanese Patent Application Laid-Open No. 10-45804.

The resin used as the main component of the retardation film according to the present invention may also contain other resins than the cellulose derivative. Examples of other resins include polycarbonate resins, polystyrene resins, polysulfone resins, polyester resins, polyarylate resins, acrylic resins (including copolymers), olefin resins (such as norbornene resins, cyclic olefin resins, cyclic conjugated diene resins, and vinyl alicyclic hydrocarbon resins), and vinyl resins (including polyvinyl acetate resins and polyvinyl alcohol resins). Among these resins, acrylic resin is preferred as the resin that can be used in combination.

When the retardation film of the present invention contains other resins than the cellulose derivative, the content of other resins is preferably 5 to 70 wt % relative to the total resin.

Compound Represented by General Formula (1)

The compound represented by general formula (1) of the present invention can be added in an amount appropriate to confer desired retardation to a film. The addition amount of the compound represented by general formula (1) is preferably 1 to 15 wt %, most preferably 2 to 10 wt % relative to the cellulose derivative. When the addition amount is in this range, sufficient retardation can be imparted to the film containing the cellulose derivative.

The retardation film of the present invention can further contain a plasticizer which imparts processability, flexibility, and moisture resistance to the film, an ultraviolet absorber which imparts ultraviolet absorption function, an antioxidant which prevents degradation of the film, and fine particles (matting agent) which impart slip property to the film, which are to be described below, in addition to the cellulose derivative and the compound represented by general formulas (1) to (4).

Plasticizer

The retardation film of the present invention can contain a plasticizer. The plasticizer is not particularly limited, but is preferably selected from saccharide ester plasticizers, polyhydric alcohol ester plasticizers, glycolate plasticizers, phthalate ester plasticizers, fatty acid ester plasticizers, phosphate ester plasticizers, polycarboxylate plasticizers, polyester plasticizers, vinyl polymer plasticizers, and the like. These plasticizers may also be used in combination.

Examples of the saccharide ester compounds include ester compounds which have 1 to 12 units of at least one of a pyranose structure and a furanose structure and in which all or some of the OH groups in the structure are esterified.

The degree of esterification is preferably 50% or higher of the OH groups present in the pyranose structure or furanose structure.

Examples of saccharide ester compound to be used in the present invention include, but not limited to, the following compounds.

Examples thereof include glucose, galactose, mannose, fructose, xylose, arabinose, lactose, sucrose, nystose, 1F-fructosylnystose, stachyose, maltitol, lactitol, lactulose, cellobiose, maltose, cellotriose, maltotriose, raffinose and kestose.

Additional examples thereof include genthiobiose, genthiotriose, genethiotetraosc, xylotriose and galactosylsucrose.

Among the above-mentioned compounds, especially compounds having both a pyranose structure and a furanose structure are preferable.

Examples of the compounds are preferably sucrose, kestose, nystose, 1F-fructosylnystose and stachyose, and more preferably sucrose.

Monocarboxylic acids to be used for esterification of all or some of the OH groups in the pyranose structure or the furanose structure are not especially limited, and usable are well-known aliphatic monocarboxylic acids, alicyclic monocarboxylic acids, aromatic monocarboxylic acids and the like. Carboxylic acids to be used may be one type or a mixture of two or more.

Preferable aliphatic monocarboxylic acids include saturated fatty acids such as acetic acid, propionic acid, butyric acid, isobutyric acid, valeric acid, caproic acid, enanthic acid, caprylic acid, pelargonic acid, capric acid, 2-ethyl-hexanecarboxylic acid, undecylic acid, lauric acid, tridecyl acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and unsaturated fatty acids such as undecylenic acid, oleic acid, sorbic acid, linolic acid, linolenic acid, arachidonic acid and octenoic acid.

Examples of preferable alicyclic monocarboxylic acids include acetic acid, cyclopentanecarboxylic acid, cyclohexanecarboxylic acid, cyclooctanecarboxylic acid and derivatives thereof.

Examples of preferable aromatic monocarboxylic acids include benzoic acid, aromatic monocarboxylic acids in which an alkyl group or an alkoxy group is incorporated to a benzene ring of benzoic acid such as toluic acid, and aromatic monocarboxylic acids having two or more benzene rings such as cinnamic acid, benzilic acid, biphenylcarboxylic acid, naphthalenecarboxylic acid and tetralincarboxylic acid, and derivatives thereof, and more specifically include xylic acid, hemellitic acid, mesitylene acid, prehnitic acid, γ-isodurylic acid, durylic acid, mesitoic acid, α-isodurylic acid, cuminic acid, α-toluic acid, hydratropic acid, atropic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, homovanillic acid, homoveratric acid, o-homoveratric acid, phthalonic acid and p-coumaric acid, but especially benzoic acid is preferable.

As compounds having 1 to 12 units of at least one of a pyranose structural or a furanose structural, ester compounds of oligosaccharides can be applied.

The oligosaccharides are produced by making an enzyme such as amylase act on starch, cane sugar or the like, and examples to be applied in the present invention include maltooligosaccharides, isomaltooligosaccharide, fractooligosaccharides, galactooligosaccharides and xylooligosaccharides.

Hereinafter, one example of saccharide ester compounds is cited, but the present invention is not limited thereto.

Monopet SB: made by Dai-ichi Kogyo Seiyaku Co., Ltd.
Monopet SOA: made by Dai-ichi Kogyo Seiyaku Co., Ltd.

The polyhydric alcohol esteric plasticizer is a plasticizer composed of an ester of a di- or more hydric aliphatic alcohol and a monocarboxylic acid, and preferably has an aromatic ring or a cycloalkyl ring in its molecule. The ester is preferably a di- to 20-hydric aliphatic alcohol ester.

The polyhydric alcohol to be preferably used in the present invention is represented by the following general formula (a).

$$Ra-(OH)r \qquad \text{General formula (a)}$$

where Ra represents an r-valent organic group; r represents a positive integer of 2 or more; and the OH group represents an alcoholic or phenolic hydroxyl group.

Examples of preferable polyhydric alcohols include the following, but the present invention is not limited thereto. Examples thereof include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, pentaerythritol, dipentaerythritol, xylitol and inositol. Especially preferable are trimethylolpropane and pentaerythritol.

Monocarboxylic acids to be used for polyhydric alcohol esters are not especially limited, and usable are well-known aliphatic monocarboxylic acids, alicyclic monocarboxylic acids, aromatic monocarboxylic acids and the like. Use of the alicyclic monocarboxylic acids and aromatic monocarboxylic acids is preferable from the viewpoint of improvement of the moisture permeability and the retainability.

Examples of preferable monocarboxylic acids include the following, but the present invention is not limited thereto.

Preferable aliphatic monocarboxylic acids are fatty acids having a $C_{1-32}$ straight chain or side chain. The number of carbon atoms is more preferably 1 to 20, and especially preferably 1 to 10. The addition of acetic acid is preferable because the compatibility with the cellulose derivative is enhanced, and mixing acetic acid and other monocarboxylic acids and using the mixture is also preferable.

Preferable aliphatic monocarboxylic acids include saturated fatty acids such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecyl acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and unsaturated fatty acids such as undecylenic acid, oleic acid, sorbic acid, linolic acid, linolenic acid and arachidonic acid.

Examples of preferable alicyclic monocarboxylic acids include cyclopentanecarboxylic acid, cyclohexanecarboxylic acid, cyclooctanecarboxylic acid and derivatives thereof.

Examples of preferable aromatic monocarboxylic acids include benzoic acid, aromatic monocarboxylic acids in which one to three alkyl groups or alkoxy groups such as a methoxy group and an ethoxy group are incorporated to a benzene ring of benzoic acid such as toluic acid, and aromatic monocarboxylic acids having two or more benzene rings such as biphenylcarboxylic acid, naphthalenecarboxylic acid and tetralincarboxylic acid, and derivatives thereof. Especially benzoic acid is preferable.

The molecular weight of the polyhydric alcohol esters is not especially limited, but is preferably 300 to 1,500, and more preferably 350 to 750. A higher molecular weight is preferable because the polyhydric alcohol esters hardly volatilize; and a lower molecular weight is preferable from the viewpoint of the moisture permeability and the compatibility with the cellulose derivative.

Carboxylic acids to be used for the polyhydric alcohol esters may be one type or a mixture of two or more. All OH groups in the polyhydric alcohol may be esterified, or some of the OH groups may remain intact.

Glycolate plasticizers are not especially limited, and preferable are alkylphthalyl alkyl glycolates. Examples of the alkylphthalyl alkyl glycolates include methylphthalyl methyl glycolate, ethylphthalyl ethyl glycolate, propylphthalyl propyl glycolate, butylphthalyl butyl glycolate, octylphthalyl octyl glycolate, methylphthalyl ethyl glycolate, ethylphthalyl methyl glycolate, ethylphthalyl propyl glycolate, methylphthalyl butyl glycolate, ethylphthalyl butyl glycolate, butylphthalyl methyl glycolate, butylphthalyl ethyl glycolate, propylphthalyl butyl glycolate, butylphthalyl propyl glycolate, methylphthalyl octyl glycolate, ethylphthalyl octyl glycolate, octylphthalyl methyl glycolate, and octylphthalyl ethyl glycolate.

Examples of phthalate esteric plasticizers include diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, and dicyclohexyl terephthalate.

Examples of fatty acid esteric plasticizers include butyl oleate, methyl acetyl ricinoleate, and dibutyl sebacate.

Examples of phosphate esteric plasticizers include triphenyl phosphate, tricresyl phosphate, cresyl diphenyl phosphate, octyl diphenyl phosphate, diphenyl biphenyl phosphate, trioctyl phosphate, and tributyl phosphate.

Polycarboxylate compounds are composed of an ester of a di- or more valent, preferably di- to 20-valent carboxylic acid and an alcohol. Aliphatic polycarboxylic acids preferably have di- to 20-valence, and aromatic polycarboxylic acids, and alicyclic polycarboxylic acids preferably have tri- to 20-valence.

Polycarboxylic acids are represented by the following general formula (b).

Rb(COOH)$m$(OH)$r$          General formula (b)

where Rb represents a (m+r)-valent organic group; m represents a positive integer of 2 or more; r represents an integer of 0 or more; the COOH group represents a carboxyl group; and the OH group represents an alcoholic or phenolic hydroxyl group.

Examples of preferable polycarboxylic acids include the following, but the present invention is not limited thereto. Examples thereof preferably used are tri- or more valent aromatic carboxylic acids such as trimellitic acid, trimesic acid and pyromellitic acid, and derivatives thereof, aliphatic polycarboxylic acids such as succinic acid, adipic acid, azelaic acid, sebacic acid, oxalic acid, fumaric acid, maleic acid and tetrahydrophthalic acid, and hydroxyl polycarboxylic acids such as tartaric acid, tartronic acid, malic acid and citric acid. Particularly, hydroxyl polycarboxylic acids are preferable from the viewpoint of improvement of retainability and the like.

Alcohols to be used for the polycarboxylate compounds are not especially limited, and usable are well-known alcohols and phenols. Preferable alcohols are, for example, aliphatic saturated alcohols or aliphatic unsaturated alcohols having a $C_{1-32}$ straight chain or side chain. Having 1 to 20 carbon atoms is more preferable, and having 1 to 10 carbon atoms is especially preferable. Also preferable are alicyclic alcohols such as cyclopentanol and cyclohexanol, and derivatives thereof, and aromatic alcohols such as benzyl alcohol and cinnamyl alcohol, and derivatives thereof.

In the case of using hydroxyl polycarboxylic acids as a polycarboxylic acid, alcoholic or phenolic hydroxyl groups of the hydroxyl polycarboxylic acids may be esterified using monocarboxylic acids. Examples of preferable monocarboxylic acids include the following, but the present invention is not limited thereto.

As an aliphatic monocarboxylic acid, fatty acids having a $C_{1-32}$ straight chain or side chain are preferably used. Fatty acids having 1 to 20 carbon atoms are more preferable, and those having 1 to 10 carbon atoms are especially preferable.

Examples of preferable aliphatic monocarboxylic acids include saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecyl acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and unsaturated fatty acids such as undecylenic acid, oleic acid, sorbic acid, linolic acid, linolenic acid, and arachidonic acid.

Examples of preferable alicyclic monocarboxylic acids include cyclopentanecarboxylic acid, cyclohexanecarboxylic acid, cyclooctanecarboxylic acid, and derivatives thereof.

Examples of preferable aromatic monocarboxylic acids include benzoic acid, aromatic monocarboxylic acids in which an alkyl group is incorporated to a benzene ring of benzoic acid such as toluic acid, and aromatic monocarboxylic acids having two or more benzene rings such as biphenylcarboxylic acid, naphthalenecarboxylic acid and tetralincarboxylic acid, and derivatives thereof. Especially acetic acid, propionic acid and benzoic acid are preferable.

The molecular weight of the polycarboxylate compounds is not especially limited, but is preferably in the range of 300 to 1,000, and more preferably 350 to 750. A higher molecular weight is preferable from the viewpoint of improvement of the retainability, and a lower molecular weight is preferable from the viewpoint of moisture permeability and compatibility with the cellulose derivative.

Alcohols to be used for the polycarboxylates may be one type or a mixture of two or more.

The acid value of the polycarboxylate compounds to be used in the present invention is preferably 1 mgKOH/g or lower, and more preferably 0.2 mgKOH/g or lower. Making the acid value in the above range limits the environmental fluctuations of retardation, which is preferable.

Acid Value

The acid value refers to a milligram number of potassium hydroxide necessary for neutralizing an acid (carboxyl group present in a sample) contained in 1 g of the sample. The acid value is measured according to JIS K0070.

Examples of especially preferable polycarboxylate compounds are cited below, but the present invention is not limited thereto. Examples thereof include triethyl citrate, monoisopropyl citrate, diisopropyl citrate, triisopropyl citrate, tributyl citrate, acetyl triethyl citrate (ATEC), acetyl tributyl citrate (ATBC), benzoyl tributyl citrate, acetyl triphenyl citrate, acetyl tribenzyl citrate, dibutyl tartrate, diacetyl dibutyl tartrate, tributyl trimellitate and tetrabutyl pyromellitate.

Polyester plasticizers are not especially limited, but usable are polyester plasticizers having an aromatic ring or a cycloalkyl ring in their molecule. Polyester plasticizers are not especially limited, but usable are, for example, compounds represented by the following general formula (c).

B-(G-A)s-G-B  General formula (c)

(where B represents a hydrogen atom, a $C_{2-12}$ aliphatic monocarboxylic acid residue or a $C_{7-15}$ aromatic monocarboxylic acid residue; G represents a $C_{2-12}$ alkylene glycol residue, a $C_{6-15}$ cycloalkylene glycol residue or a $C_{4-12}$ oxyalkylene glycol residue; A represents a $C_{4-12}$ alkylene dicarboxylic acid residue, a $C_{8-12}$ cycloalkylene dicarboxylic acid residue or a $C_{8-12}$ arylene dicarboxylic acid residue; and s represents an integer of 1 or more).

The polyester plasticizer represented by general formula (c) is constituted of a $C_{2-12}$ aliphatic monocarboxylic acid residue or a $C_{7-15}$ aromatic monocarboxylic acid residue represented by B; a $C_{2-12}$ alkylene glycol residue, a $C_{6-15}$ cycloalkylene glycol residue or a $C_{4-12}$ oxyalkylene glycol residue represented by G; and a $C_{4-12}$ alkylene dicarboxylic acid residue, a $C_{8-12}$ cycloalkylene dicarboxylic acid residue or a $C_{8-12}$ arylene dicarboxylic acid residue represented by A, and is obtained by the same reaction as those for conventional polyester compounds.

Examples of the $C_{2-12}$ aliphatic monocarboxylic acid residue or $C_{7-15}$ aromatic monocarboxylic acid residue of the polyester plasticizer used in the present invention include acetic acid, propionic acid, cyclohexane carboxylic acid, benzoic acid, para-tertiarybutyl benzoic acid, ortho-toluic acid, meta-toluic acid, para-toluic acid, dimethylbenzoic acid, ethylbenzoic acid, normal-propylbenzoic acid, aminobenzoic acid, and acetoxybenzoic acid, and these may be used singly or as a mixture of two or more.

Examples of the $C_{2-12}$ alkylene glycol component of the polyester plasticizer to be used in the present invention include ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol(3,3-dimethylolpentane), 2-n-butyl-2-ethyl-1,3-propanediol(3,3-dimethylolheptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol, and these glycols are used singly or as a mixture of two or more.

Examples of the $C_{6-12}$ cycloalkylene glycol component include 1,2-cyclohexanediol, 1,4-cyclohexanediol, 1,4-cyclohexanedimethanol, and hydrogenated bisphenol A, and these glycols are used singly or as a mixture of two or more.

Examples of the $C_{4-12}$ oxyalkylene glycol component include diethylene glycol, triethylene glycol, tetraethylene glycol, dipropylene glycol, and tripropylene glycol, and these glycols can be used singly or as a mixture of two or more.

In the present invention, a $C_{2-12}$ alkylene glycol is preferred as G because it is excellent in compatibility with the cellulose derivative.

Further, examples of the $C_{4-12}$ alkylenedicarboxylic acid component include succinic acid, maleic acid, fumaric acid, glutaric acid, adipic acid, azelaic acid, sebacic acid, and dodecanedicarboxylic acid, and these dicarboxylic acids are used singly or as a mixture.

Examples of the $C_{8-12}$ cycloalkylene dicarboxylic acid component include 1,4-cyclohexanedicarboxylic acid and 2,6-decalindicarboxylic acid, and these dicarboxylic acids are used singly or as a mixture.

Examples of the $C_{8-12}$ arylenedicarboxylic acid component include phthalic acid, terephthalic acid, isophthalic acid, 2,6-naphthalenedicarboxylic acid, 2,3-naphthalenedicarboxylic acid, and 1,4-naphthalenedicarboxylic acid, and these dicarboxylic acids are used singly or as a mixture of two or more.

The number-average molecular weight of the polyester plasticizers to be used in the present invention is preferably in the range of 300 to 2,000, and more preferably 400 to 1,500. The acid value is 0.5 mgKOH/g or lower, and the hydroxyl value is 300 mgKOH/g or lower; and more preferably, the acid value is 0.3 mgKOH/g or lower, and the hydroxyl value is 250 mgKOH/g or lower.

Hereinafter, examples of synthesis of aromatic-terminated polyester plasticizers that can be used in the present invention will be described.
<Sample No. 1>
To a reaction vessel equipped with a reflux condenser were collectively added 410 parts of phthalic acid, 610 parts of benzoic acid, 737 parts of dipropylene glycol, and as a catalyst 0.40 parts of tetraisopropyl titanate under a nitrogen atmosphere. The mixture was continuously heated at 130 to 250° C. with stirring until the acid value reached 2 or less, followed by continuously removing water formed. Then, a distillate was removed under a reduced pressure of $1.33 \times 10^4$ Pa to finally $4 \times 10^2$ Pa or less at 200 to 230° C., and then the resulting mixture was filtered to afford a polyester plasticizer having the following properties.
Viscosity (25° C., mPa·s); 43,400
Acid value; 0.2
<Sample No. 2>
A polyester plasticizer having the following properties was obtained in completely the same manner as in Sample No. 1 except that to a reaction vessel was added 410 parts of phthalic acid, 610 parts of benzoic acid, 341 parts of diethylene glycol, and as a catalyst 0.35 parts of tetraisopropyl titanate were added under a nitrogen atmosphere.
Viscosity (25° C., mPa·s); 31,000
Acid value; 0.1
<Sample No. 3>
A polyester plasticizer having the following properties was obtained in exactly the same manner as in Sample No. 1 except that to a reaction vessel was added 410 parts of phthalic acid, 610 parts of benzoic acid, 418 parts of 1,2-propanediol, and as a catalyst 0.35 parts of tetraisopropyl titanate under a nitrogen atmosphere.
Viscosity (25° C., mPa·s); 38,000
Acid value; 0.05
<Sample No. 4>
A polyester plasticizer having the following properties was obtained in exactly the same manner as in Sample No. 1 except that to a reaction vessel was added 410 parts of phthalic acid, 610 parts of benzoic acid, 418 parts of 1,3-propanediol, and as a catalyst 0.35 parts of tetraisopropyl titanate under a nitrogen atmosphere.
Viscosity (25° C., mPa·s); 37,000
Acid value; 0.05
<Sample No. 5>
In a reaction vessel were mixed 19.2 parts of 2,6-dimethyl naphthalene dicarboxylate, 17.9 parts of 1,2-propylene glycol, and 0.02 parts of tetraisopropyl titanate under a nitrogen atmosphere. The mixture was stirred at 165° C. for 1 hour while distilling off methanol formed. The resulting mixture was further stirred at 185° C. for 1 hour, and then heated to 195° C. and stirred for 18 hours. Next, the resulting mixture was cooled to 170° C., and 1,2-propylene glycol as an unreacted to material was distilled off under reduced pressure to thereby obtain a polyester plasticizer having the following properties.
Number-average molecular weight: 873
Acid value: 0.2
Hydroxyl value: 128
<Sample No. 6>
In a reaction vessel were mixed 20.0 parts of dimethyl terephthalate, 18.8 parts of 1,2-propylene glycol, and 0.02 parts of tetraisopropyl titanate under a nitrogen atmosphere. The mixture was stirred at 165° C. for 1 hour while distilling off methanol formed. The resulting mixture was further stirred at 185° C. for 1 hour, and then heated to 195° C. and stirred for 18 hours. Next, the resulting mixture was cooled to 165° C., and 1,2-propylene glycol as an unreacted material was distilled off under reduced pressure to thereby obtain a polyester plasticizer having the following properties.
Number-average molecular weight: 1,150
Acid value: 0.1
Hydroxyl value: 97

Examples of the vinyl polymer plasticizer include, but are not particularly limited to, an aliphatic hydrocarbon polymer, an alicyclic hydrocarbon polymer, an acrylic polymer such as poly(ethyl acrylate), poly(methyl methacrylate), a copolymer of methyl methacrylate and 2-hydroxyethyl methacrylate, and a copolymer of methyl methacrylate and N-acryloyl morpholine, a vinyl ether polymer such as polyvinyl isobutyl ether, an amide polymer such as poly(N-vinyl pyrrolidone) and a copolymer of methyl methacrylate and N-vinyl pyrrolidone, and a styrenic polymer such as polystyrene and poly(4-hydroxystyrene). The number-average molecular weight is preferably about 500 to about 20000, most preferably 1,000 to 10,000. The above polymers may be used in combination of two or more.

The amount of these plasticizers added is preferably 0.5 to 30 wt %, most preferably 3 to 20 wt %, relative to the cellulose derivative.

Ultraviolet Absorber

The ultraviolet absorber is preferably one that is excellent in the absorption of ultraviolet light having a wavelength of 370 nm or less from the viewpoint of prevention of degradation of the polarizer or display device by ultraviolet light, and that absorbs less visible light having a wavelength of 400 nm or more from the viewpoint of liquid crystal display properties. Examples of the ultraviolet absorber used in the present invention include benzotriazole compounds, triazine compounds, benzophenone compounds, cyanoacrylate compounds, salicylate ester compounds, and nickel complex salt compounds, with benzotriazole compounds, triazine compounds, and benzophenone compounds being preferred. Ultraviolet absorbers described in Japanese Patent Application Laid-Open Nos. 10-182621 and 8-337574 and polymer ultraviolet absorbers described in Japanese Patent Application Laid-Open Nos. 6-148430 and 2003-113317 may also be used.

Specific examples of the benzotriazole ultraviolet absorber include, but are not limited to, 2-(2'-hydroxy-5'-methylphenyl)benzotriazole, 2-(2'-hydroxy-3',5'-di-tert-buthylphenyl) benzotriazole, 2-(2'-hydroxy-3'-tert-butyl-5'-methylphenyl) benzotriazole, 2-(2'-hydroxy-3',5'-di-tert-buthylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2-(2'-hydroxy-3'-tert-butyl-5'-(2-octyloxycarbonylethyl)-phenyl)-5-chlorobenzotriazole, 2-(2'-hydroxy-3'-(1-methyl-1-phenylethyl)-5'-(1,1,3,3-tetramethylbutyl)-phenyl)benzotriazole, 2-(2H-benzotriazol-2-yl)-6-(linear and branched dodecyl)-4-methylphenol, and a mixture of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate.

Examples of commercially available products include TINUVIN 171, TINUVIN 900, TINUVIN 928, TINUVIN 360 (all are manufactured by BASF Japan Ltd.), LA31 (manufactured by ADEKA Corporation), and RUVA-100 (manufactured by Otsuka Chemical Co., Ltd.).

Specific examples of the triazine ultraviolet absorber include, but are not limited to, a reaction product of 2-(4,6- bis(2,4-dimethylphenyl)-1,3,5-triazin-2-yl)-5-hydroxyphenyl and oxirane, for example, [($C_{10}$-$C_{16}$, mainly $C_{12}$-$C_{13}$, alkyloxy)methyl]oxirane, a reaction product of 2-(2,4-dihydroxyphenyl)-4,6-bis-(2,4-dimethylphenyl)-1,3,5-triazine and (2-ethylhexyl)-glycidic ester, and 2,4-bis[2-hydroxy-4-butoxyphenyl]-6-(2,4-dibutoxyphenyl)-1,3,5-triazine.

Examples of commercially available products include TINUVIN 400, TINUVIN 405, TINUVIN 460, and TINUVIN 479 (all manufactured by BASF Japan Ltd.).

Specific examples of the benzophenone ultraviolet absorber include, but are not limited to, 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

In the present invention, the ultraviolet absorber is preferably added in an amount of 0.1 to 5 wt %, further preferably 0.2 to 3 wt %, further preferably 0.5 to 2 wt %, relative to a resin. These may be used in combination of two or more.

The benzotriazole structure, triazine structure or benzophenone structure may be a part of the polymer, may be regularly pendant from the polymer, or may be introduced into a part of the molecular structure of other additives such as plasticizers, antioxidants and acid scavengers.

Examples of conventionally known ultraviolet absorbing polymers include, but are not particularly limited to, a polymer obtained by homopolymerization of RUVA-93 (manufactured by Otsuka Chemical Co., Ltd.) and a polymer obtained by copolymerization of RUVA-93 and other monomers. Specific examples include PUVA-30M obtained by copolymerization of RUVA-93 and methyl methacrylate in a ratio of 3:7 (mass ratio) and PUVA-50M obtained by copolymerization of RUVA-93 and methyl methacrylate in a ratio of 5:5 (mass ratio). Further examples include a polymer described in Japanese Patent Application Laid-Open No. 2003-113317.

Antioxidant

The antioxidant is called also a deterioration preventive agent. In the case where liquid crystal image displays or the like are placed in a high-humidity high temperature condition, retardation films are caused to deteriorate in some cases.

Since antioxidants have functions of, for example, retarding and preventing the decomposition of retardation films due to halogens in a residual solvent, phosphorus of a phosphoric acid-based plasticizer, and the like in the retardation films, the antioxidants are preferably contained in the retardation films.

As such an antioxidant, hindered phenol-based compounds are preferably used, and examples include 2,6-di-t-butyl-p-cresol, pentaerythrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene and tris-(3,5-di-t-butyl-4-hydroxybenzyl)-isocyanurate.

Especially preferable are 2,6-di-t-butyl-p-cresol, pentaerythrityl-tetrakis[3-(3,5-di-t-butyl-4-hydroxyphenyl)propionate] and triethylene glycol-bis[3-(3-t-butyl-5-methyl-4-hydroxyphenyl)propionate]. A hydrazine-based metal deactivator such as N,N'-bis[3-(3,5-di-t-butyl-4-hydroxyphenyl)propionyl]hydrazine and a phosphorus-based processing stabilizer such as tris(2,4-di-t-butylphenyl)phosphite may be used concurrently.

The amount of these compounds to be added is preferably 0.01 to 1.0%, and more preferably 0.05 to 0.5% in weight proportion, based on the cellulose derivative.

Fine Particles

The retardation film according to the present invention preferably contains fine particles.

Examples of inorganic compounds as the fine particles to be used in the present invention include silicon dioxide, titanium dioxide, aluminum oxide, zirconium oxide, calcium carbonate, calcium carbonate, talc, clay, calcined kaolin, calcined calcium silicate, calcium silicate hydrate, aluminum silicate, magnesium silicate and calcium phosphate. Fine particles of organic compounds can also be preferably used. Examples of organic compounds include polytetrafluoroethylene, cellulose acetate, polystyrene, polymethyl methacrylate, polypropyl methacrylate, polymethyl acrylate, polyethylene carbonate, acrylic styrenic resins, silicone-based resins, polycarbonate resins, benzoguanamine-based resins, melamine-based resins, polyolefinic powders, polyester resins, polyamide-based resins and polyimide-based resins, and also include crushed and classified substances of organic polymer compounds such as polyethylene fluoride-based resins and starch. Also usable are polymer compounds synthesized by the suspension polymerization method, polymer compounds made into a spherical shape by the spray dry method, the dispersion method or the like, and inorganic compounds.

The fine particle is preferably one containing silicon from the viewpoint of the turbidity being lowered, and especially silicon dioxide is preferable.

Fine particles of silicon dioxide are commercially available for example under the trade names Aerosil R972, R972V, R974, R812, 200, 200V, 300, R202, OX50 and TT600 (which are all made by Nippon Aerosil Co., Ltd.), and are usable.

Fine particles of zirconium oxide are commercially available for example under the trade names Aerosil R976 and R811 (which are all made by Nippon Aerosil Co., Ltd.), and are usable.

Examples of the polymer include silicone resins, fluororesins, and acrylic resins. Silicone resins are preferable, and especially those having three-dimensional network structure are preferable, which are commercially available for example under the trade names Tospearl 103, 105, 108, 120, 145, 3120 and 240 (all made by GE Toshiba Silicones Co., Ltd.), and are usable.

Among these, Aerosil 200V and Aerosil R972V are particularly preferably used because they keep the turbidity of a retardation film at a low level and also has a large effect in reducing the friction coefficient. In the retardation film according to the present invention, the coefficient of dynamic friction of at least one surface of the film is preferably 0.2 to 1.0.

The average particle diameter of the primary particles of the fine particles is preferably 5 to 400 nm, and more preferably 10 to 300 nm. The fine particles may be present mainly as secondary aggregates having a particle diameter of 0.05 to 0.3 μm, and if the fine particles are particles having an average particle diameter of 100 to 400 nm, the fine particles may be present as non-aggregated primary particles.

The content of these fine particles in the retardation film is preferably 0.01 to 1 wt %, particularly preferably 0.05 to 0.5 wt %. In the case of a retardation film having a multilayer configuration obtained by co-casting method, it is preferred to contain this addition amount of fine particles in the surface thereof.

Various types of additives may be batchwise added to a dope or cellulose derivative-containing solution before film formation, or an additive-dissolved liquid is separately prepared, and may be in-line-wise added. Especially in order to reduce the burden to a filter material by the fine particle, part or the whole of the amount of the fine particle is preferably in-line-wise added.

In the case where an additive-dissolved liquid is in-line-wise added, in order to make good the miscibility with a dope, a small amount of a cellulose derivative is preferably dissolved. The amount of the cellulose derivative is preferably 1 to 10 parts by weight, and more preferably 3 to 5 parts by weight, based on 100 parts by weight of a solvent.

In the present invention, in order to carry out in-line addition and mixing, an in-line mixer such as a static mixer (made by Toray Engineering Co., Ltd.) or SWJ (Toray static in-tube mixer Hi-Mixer), or the like is preferably used.

The thickness of the retardation film according to the present invention is, but not particularly limited to, 10 to 80 μm, and preferably 15 to 40 μm, further preferably 20 to 35 μm from the viewpoint of reduction in thickness. The film thickness in this range is preferred because it achieves both the developability of retardation by the compounds represented by the above general formulas (1) to (4) according to the present invention and the mechanical strength and durability of the film.

A retardation film refers to a film having a specific retardation in the in-plane direction and/or in the thickness direction of the film, preferably having a specific retardation of 10 nm or more, further preferably 40 nm or more. The retardation film according to the present invention can be used as an optical compensation film to be described below.

Liquid crystal displays have a problem of viewing angle, i.e., good display is obtained when viewed from the perpendicular to the display, but display performance decreases when obliquely viewed because of the usage of anisotropic liquid crystal materials and polarizing plates, and thus a view angle compensation plate is necessary also for improving performance. An average refractive index distribution is large in the cell thickness direction and small in the in-plane direction. For that reason, a compensation plate having a so-called negative uniaxial structure is effective. In such a compensation plate, the refractive index in the thickness direction is smaller than that in the in-plane direction and can cancel the above anisotropy. The retardation film according to the present invention can be used also as an optical compensation film having such a function.

When the retardation film according to the present invention is used for VA mode, the film may be used in any one of the following modes: mode in which the retardation film is used for both sides of the cell, i.e., two films in total (dual-film type); and a mode in which the retardation film is used only for one side of the cell (single-film type).

In the retardation film according to the present invention, it is more preferred that the in-plane retardation Ro represented by the following expression be in the range of 40 to 100 nm, and the thickness direction retardation Rth represented by the following expression be in the range of 100 to 300 nm, with respect to light having a wavelength of 590 nm in an environment of 23° C. and 55% RH.

$$Ro=(nx-ny)\times d \qquad \text{Expression (I)}$$

$$Rth=\{(nx+ny)/2-nz\}\times d \qquad \text{Expression (II)}$$

(where nx represents a refractive index in the direction x in which the refractive index reaches a maximum in the in-plane direction of the film; ny represents a refractive index in the direction y orthogonal to the direction x in the in-plane direction of the film; nz represents a refractive index in the thickness direction z of the film; and d (nm) represents a thickness of the retardation film).

These retardation values can be measured by using an automatic birefringence analyzer, KOBRA-21ADH (manufactured by Oji Scientific Instruments).

When the slow axis or the fast axis of the retardation film according to the present invention is present in the film plane, and the angle of the axis relative to the film-formation direction is defined as θ1, θ1 is preferably −1° or more and +1° or less, more preferably −0.5° or more and +0.5° or less. The θ1 can be defined as an orientation angle, and the measurement of θ1 can be carried out by using an automatic birefringence analyzer, KOBRA-21ADH (manufactured by Oji Scientific Instruments). When each θ1 satisfies the above relationship, it can contribute to providing high luminance and suppressing or preventing light leakage in a display image, and can contribute to realizing faithful color reproduction in a color liquid crystal display device.

The moisture permeability of the retardation film according to the present invention is preferably 10 to 1,200 g/m²·24 h at 40° C. and 90% RH. The moisture permeability can be measured according to the procedure described in JIS Z 0208.

The elongation at break of the retardation film according to the present invention is preferably 10 to 80%.

The visible light transmittance of the retardation film according to the present invention is preferably 90% or more, more preferably 93% or more.

The haze of the retardation film according to the present invention is preferably less than 1%, most preferably 0 to 0.1%.

3. Production Method of Retardation Film

Next, a method for producing a retardation film according to the present invention will be described. The retardation film according to the present invention can be advantageously used even if it is produced by solvent casting or melt casting.

The retardation film according to the present invention is produced by the steps of: dissolving a cellulose derivative and an additive in a solvent to prepare a dope; casting the dope on an endless metal support moving endlessly; drying the cast dope to form a web; peeling the web from the metal support; stretching the web or keeping the width thereof; drying the resulting web; and taking up a finished film.

The step of preparing a dope will be described. A higher concentration of a cellulose derivative in a dope is preferable because the drying load after the dope is cast on the metal support can be reduced; but, a too high concentration of the cellulose derivative increases the load in filtration, and worsens the filtration accuracy. A concentration thereof at which both conditions are satisfied is preferably 10 to 35 wt %, and more preferably 15 to 25 wt %.

The solvent used for the dope may a single solvent or a mixture of two or more solvents. It is preferred to use a mixture of a good solvent and a poor solvent of a cellulose derivative in terms of production efficiency, and the good solvent is preferably used in a larger amount in terms of the solubility of the cellulose derivative. With respect to a preferred mixing ratio of the good solvent and the poor solvent, the good solvent is in the range of 70 to 98 wt %, and the poor solvent is in the range of 2 to 30 wt %. With respect to the good solvent and the poor solvent, a single solvent that can dissolve a cellulose derivative to be used is defined as a good solvent, and a single solvent that can swell or cannot dissolve a cellulose derivative to be used is defined as a poor solvent. Therefore, a solvent may be a good solvent or a poor solvent depending on, for example, the average acetylation degree (degree of acetyl substitution) of cellulose ester. For example, when acetone is used as a solvent, it is a good solvent for cellulose diacetate (a degree of acetyl substitution of 2.2 to 2.4) and cellulose acetate propionate, and it is a poor solvent for cellulose triacetate (a degree of acetyl substitution of 2.7 to 2.9).

Examples of the good solvent used in the present invention include, but are not particularly limited to, organic halogen compounds such as methylene chloride, dioxolanes, acetone, methyl acetate, and methyl acetoacetate. Methylene chloride or methyl acetate is particularly preferred.

Examples of the poor solvent used in the present invention include, but are not particularly limited to, methanol, ethanol, n-butanol, cyclohexane, and cyclohexanone. A dope preferably contains water in an amount of 0.01 to 2 wt %. The solvent used for dissolving a cellulose derivative is recovered after it is removed from the film by drying in the film-formation step, and the recovered solvent is reused. The recovered solvent may contain trace amounts of additives added to the cellulose derivative, such as plasticizers, ultraviolet absorbers, polymers, and monomer components. The recovered solvent can be preferably reused even if these are contained, or may also be purified for reuse if necessary.

As a method for dissolving the cellulose derivative when the dope described above is prepared, a usual method can be used. When heating and pressurization are combined, the heating can be carried out at a temperature equal to or higher than the boiling point at normal pressure. When stirring and dissolution is carried out under heating at a temperature equal to or higher than the boiling point of the solvent at normal pressure and in a temperature range in which the solvent does not boil under pressure, the generation of agglomerated undissolved substances called gels and undissolved lumps is prevented, which is preferable. Also a method is preferably used in which a cellulose derivative is mixed with a poor solvent and moistened or swollen, and thereafter a good solvent is further added to thereby dissolve the cellulose derivative.

The pressurization may be carried out by a method forcing in an inert gas such as nitrogen gas, or a method developing the vapor pressure of the solvent by heating. The heating is carried out preferably from the outside, and for example, a jacket type apparatus is easily controlled in the temperature, which is preferable.

A higher heating temperature with a solvent being added is preferable from the viewpoint of the solubility of the cellulose derivative, but a too high heating temperature makes a necessary pressure high and worsens the productivity. The heating temperature is preferably 45 to 120° C., more preferably 60 to 110° C., and still more preferably 70° C. to 105° C. The pressure is adjusted so that the solvent does not boil at a set temperature.

Alternatively, a cooled dissolution method is preferably used, and can dissolve a cellulose derivative in a solvent such as methyl acetate.

The cellulose derivative solution is then filtered using a proper filter material such as filter paper. A lower absolute filtration accuracy of the filter material is preferable in order to remove undissolved substances, but a too low absolute filtration accuracy poses a problem of easily generating clogging of the filter material. Therefore, the filter medium has an absolute filtration accuracy of preferably 0.008 mm or lower, more preferably 0.001 to 0.008 mm, and still more preferably 0.003 to 0.006 mm.

The material of the filter medium is not especially limited, and usable are usual filter media, but plastic filter media made of plastic such as polypropylene or Teflon®, and metal filter media made of metal such as stainless steel are preferable because there occurs no falling or the like of fibers. It is preferable that impurities, particularly light spot-foreign substance, contained in the cellulose derivative as a raw material are removed or reduced by filtration.

Light spot-foreign substance refers to a spot (foreign matter) through which light can be seen when two polarizing plates are disposed in a crossed-Nicol state; a retardation film is disposed therebetween; the film is irradiated with light from one polarizing plate side; and the film is observed from the other polarizing plate side. The number of light spots each having a diameter of 0.01 mm or more is preferably 200 pieces/cm$^2$ or less, more preferably 100 pieces/cm$^2$ or less, further preferably 50 pieces/cm$^2$ or less, and further preferably 0 to 10 pieces/cm$^2$. Furthermore, it is also preferred that the number of light spots each having a diameter of 0.01 mm or less be smaller.

The filtration of the dope can be carried out by a usual method, but a method, in which the filtration is carried out under heating at a temperature equal to or higher than the boiling point of the solvent at normal pressure and in a temperature range in which the solvent does not boil under pressure, is preferable because a development in the difference in filtration pressure (called differential pressure) before and after the filtration is low. The temperature is preferably 45 to 120° C., more preferably 45 to 70° C., and still more preferably 45 to 55° C.

A lower filtration pressure is preferable. The filtration pressure is preferably 1.6 MPa or lower, more preferably 1.2 MPa or lower, and still more preferably 1.0 MPa or lower.

Casting of the dope will be described.

The metal support in the casting step is preferably one whose surface has been mirror-finished; and the metal support to be preferably used is a stainless steel belt, or a drum whose surface has been plate-finished with a casting. The width of casting can be made to be 1 to 4 m. The surface temperature of the metal support in the casting step is set to −50° C. to a temperature equal to or lower than the temperature at which the solvent does not boil nor bubble. A higher temperature can make the drying speed of the web fast, which is preferable, but a too high temperature causes the web to bubble and the flatness degrades in some cases. A preferable temperature of the support is 0 to 40° C., and a more preferable temperature is 5 to 30° C. Alternatively, a method is also preferable in which the web is gelled by being cooled, and is peeled off the drum in the state of containing a large amount of residual solvents. A method of controlling the temperature of the metal support is not especially limited, but examples include a method of blowing warm air or cold air, and a method bringing warm water into contact with the back side of the metal support. The method using warm water is preferable because the heat is efficiently transferred and the time until the temperature of the metal support becomes constant is made short. In the case of using warm air, there is a case of using the warm air of a temperature equal to or higher than a target temperature.

In order for the retardation film to exhibit good flatness, the amount of residual solvents when the web is peeled off the metal support is preferably 10 to 150 wt %, more preferably 20 to 40 wt % or 60 to 130 wt %, and especially preferably 20 to 30 wt % or 70 to 120 wt %.

In the present invention, the amount of residual solvents is defined by the following expression.

Amount of residual solvents (wt %)=$\{(M-N)/N\} \times 100$ where M is a weight of a sample sampled at any time point during or after the web or film production, and N is a weight after heating M at 115° C. for 1 hour.

In the drying step of the retardation film, the web is peeled from a metal support and dried to reduce the amount of a residual solvent preferably to 1 wt % or less, more preferably to 0.1 wt % or less, and most preferably to 0 to 0.01 wt %.

In the film drying step, a drying system is generally employed such as a roll drying system (a web is passed alternately through a large number of rolls arranged up and down, for drying), or a tenter system while the web is being conveyed.

In order to produce the retardation film according to the present invention, it is particularly preferred that the web be stretched in the width direction (transverse direction) by a tenter method in which the both ends of the web are clamped with clips or the like. The web is preferably peeled at a peeling tension of 300 N/m or less.

A means to dry the web is not particularly limited, and the drying can be generally carried out by means of hot wind, infrared rays, heating rolls, microwaves, or the like. The hot wind is preferred in terms of simplicity.

The drying temperature in the drying step of the web is preferably increased stepwise from 40 to 200° C.

The retardation film according to the present invention has a width of 1 to 4 m, preferably 1.4 to 4 m, and most preferably 1.6 to 3 m. Transportation will be difficult if the width exceeds 4 m.

Stretching Operation/Refractive Index Control

In the step of producing the retardation film according to the present invention, it is preferred to perform the refractive index control, that is, the control of retardation, by stretching operation.

For example, the film can be biaxially or uniaxially stretched successively or simultaneously in the longitudinal direction (film-formation direction) of the film and in the direction orthogonal thereto in-plane of the film, that is, in the width direction. Simultaneous biaxial stretching includes the case where the film is stretched in one direction and shrunk in the other direction by relieving tension.

The final stretching ratios in two axial directions orthogonal to each other is preferably 0.8 to 1.5 times in the casting direction and 1.1 to 2.5 times in the width direction, and the stretching is preferably carried out in the range of 0.9 to 1.0 times in the casting direction and 1.2 to 2.0 times in the width direction.

The stretching temperature is preferably 120° C. to 200° C., more preferably 140° C. to 180° C.

The residual solvent in the film during the stretching is preferably 20 to 0%, more preferably 15 to 0%.

The method of stretching the web is not particularly limited. Examples include a method wherein a circumferential speed difference is created between a plurality of rolls, and the roll circumferential speed difference is utilized to stretch the web in the machine direction; a method wherein both ends of the web are clamped by clips or pins and the spacing between the clips or pins is enlarged in the travelling direction to stretch the web in the machine direction; a method wherein the spacing between the clips or pins is enlarged in the transverse direction to stretch the web in the transverse direction; and a method wherein the spacing between the clips or pins is enlarged in the machine and transverse directions to stretch the web in both the machine and transverse directions. As a matter of course, these methods may be used in combination. In the case of a so-called tenter method, the clamped parts are preferably driven by a linear drive method because smooth stretching can be carried out and possibilities of rupture or the like can be reduced.

The width keeping or the stretching in the transverse direction in the film-formation step is preferably carried out by a tenter, and the tenter may be a pin tenter or a clip tenter. The web may be stretched in the conveyance direction and the width direction simultaneously or successively.

The retardation film according to the present invention can be further coated with a liquid crystal layer or a resin layer, or the coated film can be further stretched, thereby capable of obtaining a retardation value covering a wider range.

Polarizing Plate

A retardation film according to the present invention can be used for a polarizing plate of the present invention and a liquid crystal display device of the present invention including the polarizing plate. The retardation film according to the present invention is preferably a film which also has a function of a polarizing plate protective film. In this case, since it is not necessary to separately prepare an optical film having retardation aside from the polarizing plate protective film, it is possible to reduce the thickness of a liquid crystal display device and simplify a production process.

The polarizing plate of the present invention includes a polarizer and a retardation film of the present invention disposed on at least one side of the polarizer. The retardation film of the present invention may be directly disposed on the surface of the polarizer or may be disposed with intervening layer(s) or film(s) provided between the retardation film and the polarizer.

The polarizer which is a main component of the polarizing plate is an element which passes only a light component having a plane of polarization in a specific direction. A representative polarizer known at present is a polyvinyl alcohol polarizing film, which is prepared by dyeing a polyvinyl alcohol film with iodine or dyeing it with a dichromatic dye.

A polarizer currently used in the art is obtained by depositing an aqueous polyvinyl alcohol solution and uniaxially stretching the resulting film and then dyeing the stretched film, or dyeing the resulting film and then uniaxially stretching the stretched film, preferably followed by durability treatment with a boron compound. The film thickness of the polarizer is preferably 5 to 30 µm, most preferably 10 to 20 µm.

The polarizing plate according to the present invention can be produced by common methods. It is preferred that the polarizer side of the retardation film according to the present invention be subjected to an alkali saponification treatment and then laminated, by using a completely saponified aqueous polyvinyl alcohol solution, to at least one side of the polarizer that is prepared by immersing the polyvinyl alcohol polarizing film in an iodine solution followed by stretching of the film. A polarizing plate protective film may be laminated to the other surface. When the retardation film according to the present invention is incorporated into a liquid crystal display device, it is preferably provided in the liquid crystal cell side of the polarizer, and a conventional polarizing plate protective film may be used as a film for the outside of the polarizer.

Examples of the conventional polarizing plate protective film advantageously usable include commercially available cellulose ester films (such as Konica Minolta Tac KC8UX, KC5UX, KC8UCR3, KC8UCR4, KC8UCR5, KC8UY, KC6UY, KC4UY, KC4UA, KC4UE, KC4CZ, KC8UE, KC8UY-HA, KC8UX-RHA, KC8UXW-RHA-C, KC8UXW-RHA-NC, and KC4UXW-RHA-NC, all are manufactured by Konica Minolta Opto, Inc.).

The polarizing plate protective film used on the surface side of a display device has an antireflection layer, an antistatic layer, an antifouling layer, and a back coat layer in addition to an anti-glare layer or a clear hard-coat layer.

Liquid Crystal Display Device

The liquid crystal display device of the present invention includes the retardation film of the present invention. Specifically, the liquid crystal display device of the present invention includes a liquid crystal cell and a pair of polarizing plates which sandwich the liquid crystal cell, wherein at least one of the pair of polarizing plates is the polarizing plate of the present invention, and preferably, both of the polarizing plates are the polarizing plates of the present invention. The polarizing plate and liquid crystal cell of the present invention are preferably laminated together with an adhesive layer. The retardation film according to the present invention is preferably disposed on the surface on the side of the liquid crystal cell of the polarizer.

The liquid crystal cell is preferably a liquid crystal cell of any of various drive systems such as STN, TN, OCB, HAN, VA (MVA, PVA), IPS, and OCB, most preferably a VA (MVA, PVA) type liquid crystal cell.

The liquid crystal display device including the retardation film of the present invention is reduced in the coloring during black display due to light leakage and excellent in visibility such as front contrast even when it has a large screen of 30 inch or more.

EXAMPLES

Hereinafter, the present invention will be described specifically by way of Examples, but the present invention is not limited thereto.

1. Film Materials
1) Compound represented by general formula (1) of the present invention Synthesis Example 1

Synthesis of Exemplary Compound 1

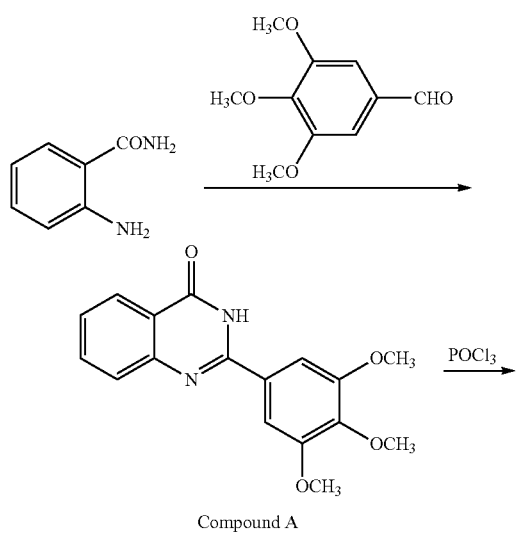

Compound A

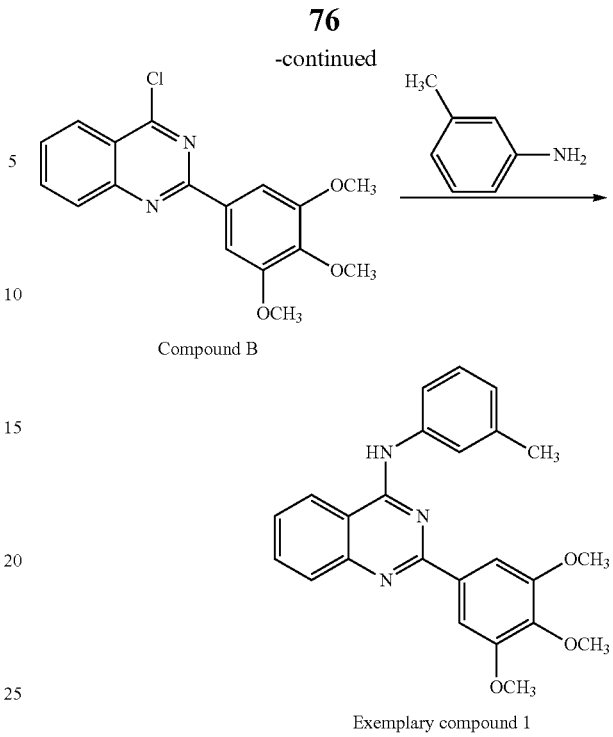

Compound B

Exemplary compound 1

At room temperature, 4.12 g of 3,4,5-trimethoxybenzaldehyde, 2.86 g of 2-aminobenzamide, 3.28 g of sodium hydrogen sulfite, and 30 ml of N,N-dimethylacetamide were mixed, and the mixture was then heated and maintained at 150° C. for 5 hours. Thereafter, the reaction mixture was cooled, and thereto was added water at room temperature. The mixture was stirred for 1 hour. The precipitated solid was filtered, washed with water, and dried to afford 6.00 g of Compound A.

At room temperature, 6.00 g of Compound A, 2.50 g of N,N-dimethylaniline, 2.94 g of phosphorus oxychloride, and 120 ml of toluene were mixed, and the mixture was then heated and maintained at 90° C. for 3 hours. Thereafter, the reaction mixture was cooled, and thereto was added water at room temperature. The mixture was stirred for 1 hour. Thereafter, the mixture was moved to a separating funnel, and an aqueous phase was removed to afford an organic phase. The organic phase was successively washed with dilute hydrochloric acid, a dilute aqueous sodium hydrogencarbonate solution, and water. Thereafter, toluene was removed under reduced pressure to afford 6.39 g of Compound B.

At room temperature, 6.39 g of Compound B, 2.28 g of m-toluidine, and 60 ml of tetrahydrofuran were mixed, and the mixture was then heated and refluxed under heating for 3 hours. Thereafter, the reaction mixture was cooled, and tetrahydrofuran was removed under reduced pressure to afford a solid, to which was added ethyl acetate to dissolve the solid to afford an organic phase. The organic phase was successively washed with dilute hydrochloric acid, a dilute aqueous sodium hydrogen carbonate solution, and water. Thereafter, ethyl acetate was removed under reduced pressure to afford a solid, which was recrystallized from methanol to afford 6.88 g of a solid.

$^1$H-NMR and mass spectra confirmed that the obtained solid was Exemplary Compound 1 as evidenced below.

$^1$H-NMR (400 MHz, Deuterated chloroform, δ (ppm), TMS standard): 2.42 (s, 3H), 3.92 (s, 3H), 4.00 (s, 6H), 6.99-7.01 (m, 1H), 7.29-7.32 (m, 1H), 7.42 (s, 1H), 7.49-7.53 (m, 1H), 7.68-7.74 (m, 2H), 7.77-7.81 (m, 1H), 7.85-7.87 (m, 1H), 7.89 (s, 2H), 7.97-7.99 (m, 1H)

MS (FAB) m/z: 402 ($M^{+1}$)

Synthesis Example 2

Synthesis of Exemplary Compound 87

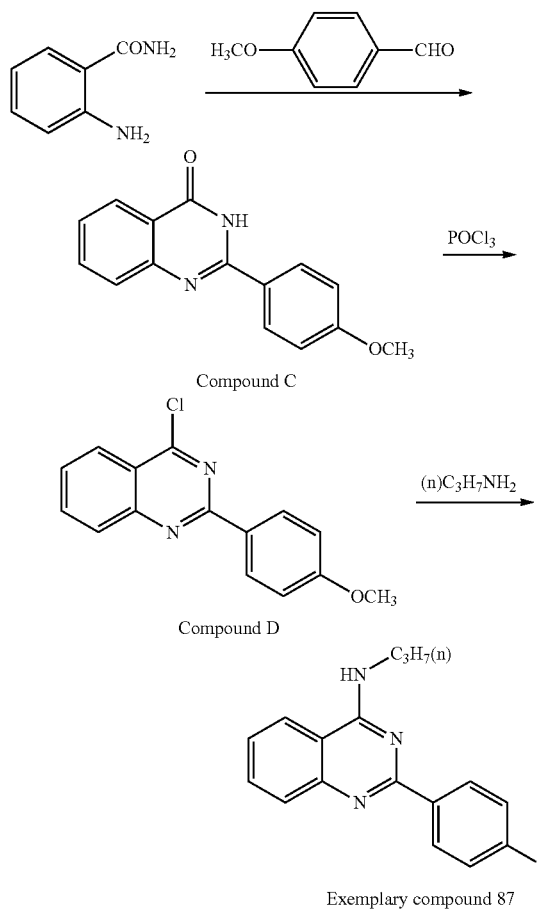

At room temperature, 15.0 g of p-anisic aldehyde, 15.0 g of 2-aminobenzamide, 11.5 g of sodium hydrogen sulfite, and 100 ml of N,N-dimethylacetamide were mixed, and the mixture was then heated and maintained at 150° C. for 5 hours. Thereafter, the reaction mixture was cooled, and thereto was added water at room temperature. The mixture was stirred for 1 hour. A precipitated solid was filtered, washed with water, and dried to afford 17.2 g of Compound C.

At room temperature, 15.0 g of Compound C, 10.8 g of N,N-dimethylaniline, 9.10 g of phosphorus oxychloride, and 300 ml of toluene were mixed, and the mixture was then heated and maintained at 90° C. for 3 hours. Thereafter, the reaction mixture was cooled, and thereto was added water at room temperature. The mixture was stirred for 1 hour at room temperature. Thereafter, the mixture was moved to a separating funnel, and an aqueous phase was removed to afford an organic phase. The organic phase was successively washed with dilute hydrochloric acid, a dilute aqueous sodium hydrogen carbonate solution, and water. Thereafter, toluene was removed under reduced pressure to afford 16.1 g of Compound D.

At room temperature, 12.0 g of Compound D, 5.68 g of n-propylamine, and 120 ml of tetrahydrofuran were mixed, and the mixture was then heated and maintained at 50° C. for 5 hours. Thereafter, the reaction mixture was cooled, and tetrahydrofuran was removed under reduced pressure to afford a solid, to which was added ethyl acetate to dissolve the solid to afford an organic phase. The organic phase was successively washed with dilute hydrochloric acid, a dilute aqueous sodium hydrogen carbonate solution, and water. Thereafter, ethyl acetate was removed under reduced pressure to afford a solid, which was recrystallized from acetonitrile to afford 6.48 g of a solid.

$^1$H-NMR and mass spectra confirmed that the obtained solid was Exemplary Compound 87 as evidenced below.

$^1$H-NMR (400 MHz, Deuterated chloroform, δ (ppm), TMS standard): 1.07-1.10 (t, 3H), 1.77-1.86 (m, 2H), 3.74-3.79 (m, 2H), 3.89 (s, 3H), 5.66 (m, 1H), 6.99-7.02 (m, 2H), 7.36-7.40 (m, 1H), 7.65-7.72 (m, 2H), 7.87-7.89 (m, 1H), 8.51-8.55 (m, 2H)

MS (FAB) m/z: 294 ($M^{+1}$)

Synthesis Example 3

Synthesis of Exemplary Compound 144

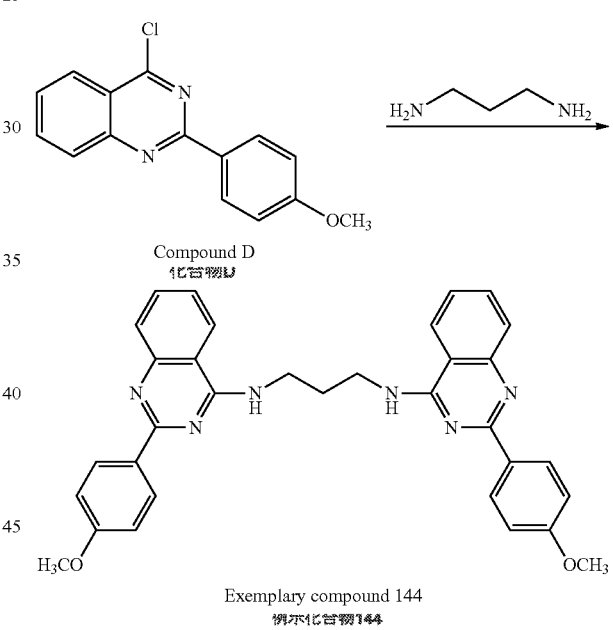

At room temperature, 12.0 g of Compound D obtained in the same manner as in Synthesis Example 2, 1.64 g of 1,3-propanediamine, 40 g of triethylamine, and 80 ml of tetrahydrofuran were mixed, and the mixture was then heated and maintained at 80° C. for 5 hours. Thereafter, the reaction mixture was cooled, and tetrahydrofuran and triethylamine were removed under reduced pressure to afford a solid, to which was added ethyl acetate to dissolve the solid to afford an organic phase. The organic phase was successively washed with dilute hydrochloric acid, a dilute aqueous sodium hydrogen carbonate solution, and water. Thereafter, ethyl acetate was removed under reduced pressure to afford a solid, which was recrystallized from acetonitrile to afford 8.76 g of a solid.

$^1$H-NMR and mass spectra confirmed that the obtained solid was Exemplary Compound 144 as evidenced below.

$^1$H-NMR (400 MHz, Deuterated chloroform, δ (ppm), TMS standard): 1.79-1.84 (m, 2H), 3.77-3.82 (m, 4H), 3.89

(s, 3H), 5.66 (m, 1H), 6.99-7.02 (m, 2H), 7.36-7.40 (m, 1H), 7.65-7.72 (m, 2H), 7.87-7.89 (m, 1H), 8.51-8.55 (m, 2H)
MS (FAB) m/z: 543 ($M^{+1}$)

Synthesis Example 4

Synthesis of Exemplary Compound 158

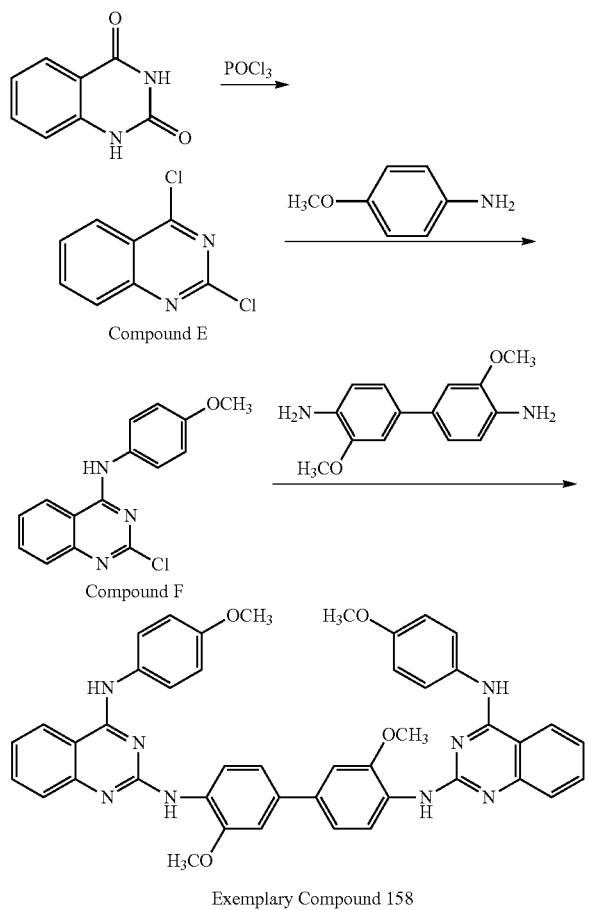

Exemplary Compound 158

At room temperature, 8.10 g of benzoylene urea, 2.63 g of N,N-dimethylaniline, and 35 g of phosphorus oxychloride were mixed, and the mixture was then heated and maintained at 120° C. for 5 hours. Thereafter, the reaction mixture was cooled, and excess phosphorus oxychloride was removed under reduced pressure. To the obtained residue was added toluene, which was removed under reduced pressure again to afford 9.94 g of Compound E.

At room temperature, 5.00 g of Compound E, 3.42 g of p-anisidine, 3.80 g of triethylamine, and 50 ml of acetonitrile were mixed, and the mixture was then heated and maintained at 60° C. for 12 hours. Thereafter, the reaction mixture was cooled, and acetonitrile was removed under reduced pressure to afford a solid, to which was added ethyl acetate to dissolve the solid to afford an organic phase. The organic phase was successively washed with dilute hydrochloric acid, a dilute aqueous sodium hydrogencarbonate solution, and water. Thereafter, ethyl acetate was removed under reduced pressure to afford 7.18 g of Compound F.

At room temperature, 7.18 g of Compound F, 3.07 g of o-dianisidine, and 60 ml of 3-methyl-1-butanol were mixed, and the mixture was then heated and refluxed under heating for 5 hours. Thereafter, the reaction mixture was cooled and mixed with 7.60 g of triethylamine and 60 ml of water, and the mixture was then heated again and maintained at 100° C. for 3 hours. Thereafter, the reaction mixture was cooled and stirred at room temperature for 1 hour. A precipitated solid was filtered and washed with water, and the resulting solid was then mixed with 100 ml of methanol. The mixture was then heated and refluxed under heating for 3 hours. Thereafter, the reaction mixture was cooled, and a precipitated solid was filtered and dried to afford 6.99 g of a solid.

$^1$H-NMR and mass spectra confirmed that the obtained solid was Exemplary Compound 158 as evidenced below.

$^1$H-NMR (400 MHz, Deuterated chloroform, δ (ppm), TMS standard): 3.88 (s, 12H), 6.57-6.59 (m, 2H), 7.01-7.03 (m, 4H), 7.08-7.13 (m, 4H), 7.33 (s, 2H), 7.41-7.45 (m, 2H), 7.54-7.56 (m, 4H), 7.68-7.76 (m, 4H), 7.95-7.97 (m, 2H)
MS (FAB) m/z: 741 ($M^{+1}$)

Synthesis Example 5

Synthesis of Exemplary Compound 186

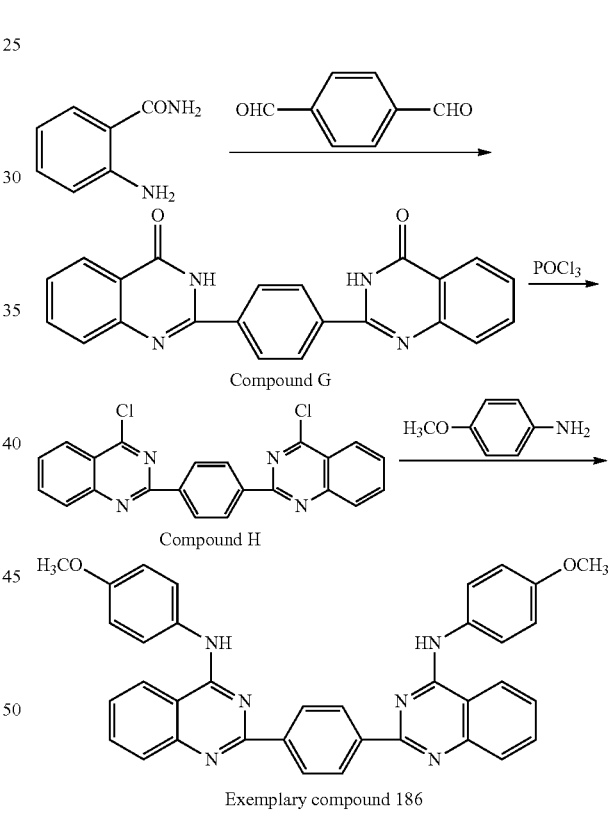

Exemplary compound 186

At room temperature, 9.35 g of terephthalaldehyde, 20.0 g of 2-aminobenzamide, 22.9 g of sodium hydrogen sulfite, and 100 ml of N,N-dimethylacetamide were mixed, and the mixture was then heated and maintained at 150° C. for 5 hours. Thereafter, the reaction mixture was cooled, and thereto was added water at room temperature. The mixture was stirred for 1 hour. A precipitated solid was filtered, washed with water, and dried to afford 18.6 g of Compound G.

At room temperature, 15.0 g of Compound G, 14.7 g of N,N-dimethylaniline, and 120 g of phosphorus oxychloride were mixed, and the mixture was then heated and maintained at 90° C. for 3 hours. Thereafter, the reaction mixture was cooled, and excess phosphorus oxychloride was removed under reduced pressure. To the obtained residue was added water, and the mixture was stirred at room temperature for 1 hour. A precipitated solid was filtered, washed with water, and dried to afford 14.7 g of Compound H.

At room temperature, 6.00 g of Compound H, 4.58 g of p-anisidine, and 60.0 g of triethylamine were mixed, and the mixture was then heated and refluxed under heating for 5 hours. Thereafter, the reaction mixture was cooled, and triethylamine was removed under reduced pressure to afford a solid, to which was added a mixed solvent of methanol and water. The mixture was then heated and refluxed under heating for 1 hour. Thereafter, the resulting mixture was cooled to room temperature, and a precipitated solid was filtered, washed with water, and dried to afford 6.86 g of a solid.

$^1$H-NMR and mass spectra confirmed that the obtained solid was Exemplary Compound 186 as evidenced below.

$^1$H-NMR (400 MHz, Deuterated chloroform, δ (ppm), TMS standard): 3.88 (s, 6H), 7.01-7.03 (m, 4H), 7.33 (s, 2H), 7.41-7.45 (m, 2H), 7.54-7.56 (m, 4H), 7.68-7.76 (m, 4H), 7.95-7.97 (m, 2H), 8.70 (s, 4H)

MS (FAB) m/z: 577 ($M^{+1}$)

Synthesis Example 6

Synthesis of Exemplary Compound 188

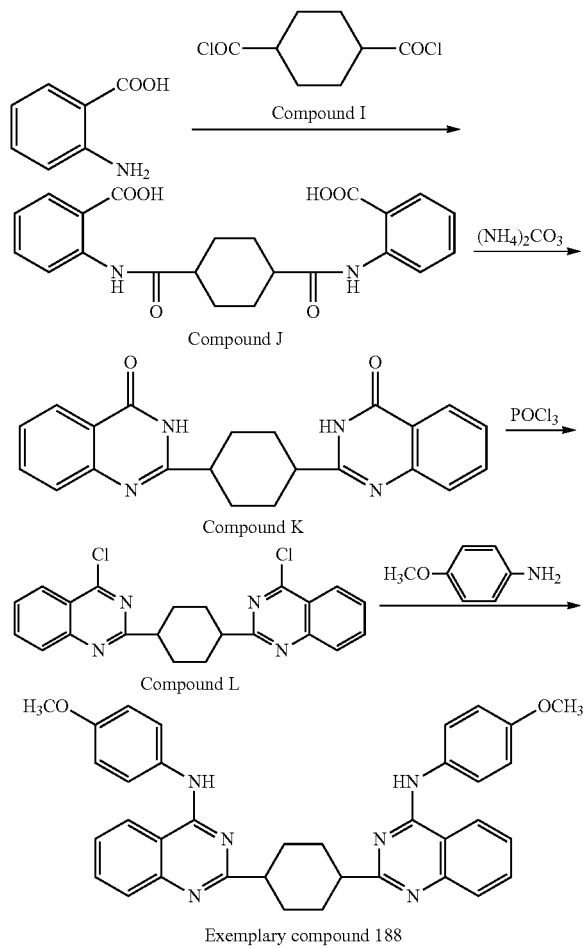

Exemplary compound 188

At room temperature, 4.78 g of anthranilic acid, 4.06 g of sodium carbonate, and 90 ml of water were mixed, followed by stirring for 1 hour, and then thereto was added a solution of 3.64 g of Compound I dissolved in 30 ml of acetone. The mixture was stirred for 2 hours at room temperature and then heated and refluxed under heating for 1 hour. The reaction mixture was then cooled, and thereto was added concentrated hydrochloric acid to adjust the pH to 1. Thereafter, a precipitated solid was filtered, washed with water, and dried to afford 7.00 g of Compound J.

At room temperature, 6.23 g of Compound J, 6.23 g of ammonium carbonate, and 60 ml of sulfolane were mixed, and then the mixture was heated and maintained at 150° C. for 5 hours. The reaction mixture was then cooled, and thereto were added 10 ml of concentrated hydrochloric acid and 50 ml of water. The mixture was stirred at room temperature for 1 hour. Thereafter, a precipitated solid was filtered, washed with water, and dried to afford 3.90 g of Compound K.

At room temperature, 3.90 g of Compound K, 3.82 g of N,N-dimethylaniline, and 30.0 g of phosphorus oxychloride were mixed, and then the mixture was heated and maintained at 90° C. for 3 hours. Thereafter, the reaction mixture was cooled, and excess phosphorus oxychloride was removed under reduced pressure. To the obtained residue was added water, and the mixture was stirred at room temperature for 1 hour. A precipitated solid was filtered, washed with water, and dried to afford 3.86 g of Compound L.

At room temperature, 3.86 g of Compound L, 2.96 g of p-anisidine, and 40.0 g of triethylamine were mixed, and the mixture was then heated and refluxed under heating for 5 hours. Thereafter, the reaction mixture was cooled, and triethylamine was removed under reduced pressure to afford a solid, to which was added a mixed solvent of methanol and water. The mixture was then heated and refluxed under heating for 1 hour. Thereafter, the resulting mixture was cooled to room temperature, and a precipitated solid was filtered, washed with water, and dried to afford 4.45 g of a solid.

$^1$H-NMR and mass spectra confirmed that the obtained solid was Exemplary Compound 188 as evidenced below.

$^1$H-NMR (400 MHz, Deuterated chloroform, δ (ppm), TMS standard): 1.61 (m, 4H), 1.86 (m, 4H), 2.72 (m, 2H), 3.88 (s, 6H), 7.01-7.03 (m, 4H), 7.33 (s, 2H), 7.41-7.45 (m, 2H), 7.54-7.56 (m, 4H), 7.68-7.76 (m, 4H), 7.95-7.97 (m, 2H)

MS (FAB) m/z: 583 ($M^{+1}$)

Synthesis Example 7

Synthesis of Exemplary Compound 189

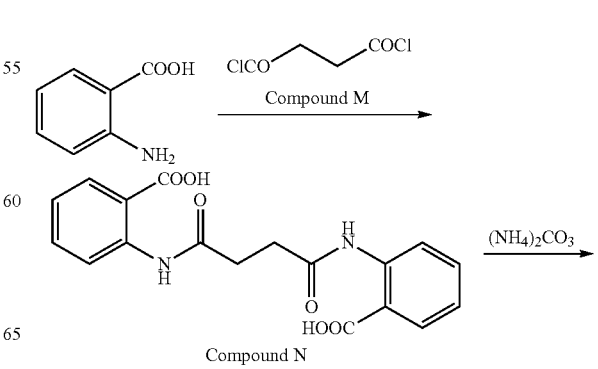

Compound N

-continued

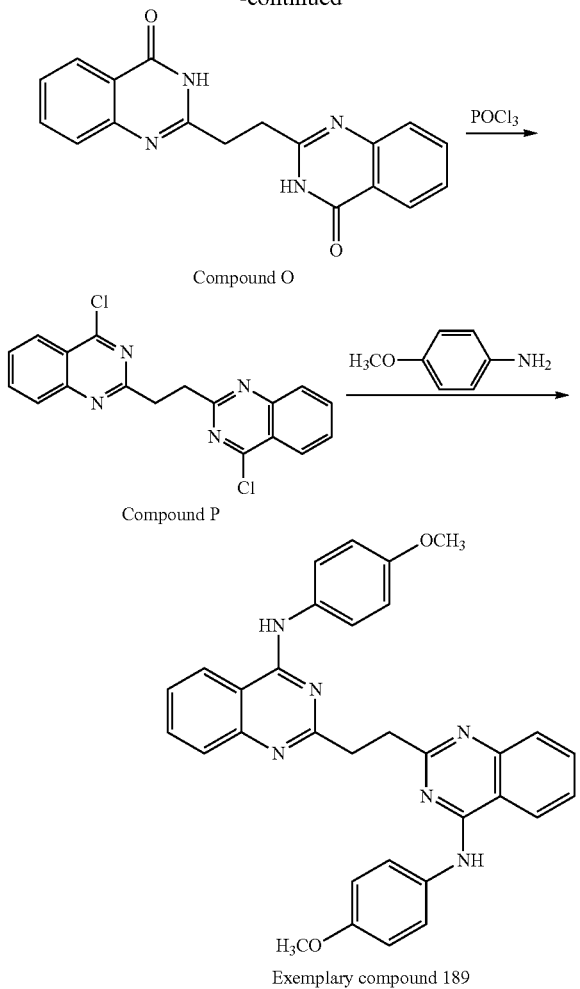

At room temperature, 5.74 g of anthranilic acid, 4.87 g of sodium carbonate, and 100 ml of water were mixed, followed by stirring for 1 hour, and then thereto was added a solution of 3.24 g of Compound M dissolved in 30 ml of acetone. The mixture was stirred at room temperature for 2 hours, heated, and refluxed under heating for 1 hour. The reaction mixture was then cooled, and thereto was added concentrated hydrochloric acid to adjust the pH to 1. Thereafter, a precipitated solid was filtered, washed with water, and dried to afford 6.92 g of Compound N.

At room temperature, 5.89 g of Compound N, 5.89 g of ammonium carbonate, and 60 ml of sulfolane were mixed, followed by heating the mixture, which was maintained at 150° C. for 5 hours. The reaction mixture was then cooled, and thereto were added 10 ml of concentrated hydrochloric acid and 50 ml of water. The mixture was stirred at room temperature for 1 hour. Thereafter, a precipitated solid was filtered, washed with water, and dried to afford 4.48 g of Compound O.

At room temperature, 4.48 g of Compound O, 3.22 g of N,N-dimethylaniline, 2.72 g of phosphorus oxychloride, and 100 ml of toluene were mixed, followed by heating the mixture, which was maintained at 90° C. for 3 hours. Thereafter, the reaction mixture was cooled, and thereto was added water at room temperature. The mixture was stirred for 1 hour at room temperature. Thereafter, the mixture was moved to a separating funnel, and an aqueous phase was removed to afford an organic phase. The organic phase was successively washed with dilute hydrochloric acid, a dilute aqueous sodium hydrogencarbonate solution, and water. Thereafter, toluene was removed under reduced pressure to afford 5.00 g of Compound P.

At room temperature, 5.00 g of Compound P, 4.33 g of p-anisidine, and 50 ml of tetrahydrofuran were mixed, followed by heating the mixture, which was refluxed under heating for 3 hours. Thereafter, the reaction mixture was cooled, and tetrahydrofuran was removed under reduced pressure to afford a solid, to which was added ethyl acetate to dissolve the solid to afford an organic phase. The organic phase was successively washed with dilute hydrochloric acid, a dilute aqueous sodium hydrogencarbonate solution, and water. Thereafter, ethyl acetate was removed under reduced pressure to afford a solid, which was recrystallized from acetonitrile to afford 6.10 g of a solid.

$^1$H-NMR and mass spectra confirmed that the obtained solid was Exemplary Compound 189 as evidenced below.

$^1$H-NMR (400 MHz, Deuterated chloroform, δ (ppm), TMS standard): 2.88 (t, 4H), 3.88 (s, 6H), 7.01-7.03 (m, 4H), 7.33 (s, 2H), 7.41-7.45 (m, 2H), 7.54-7.56 (m, 4H), 7.68-7.76 (m, 4H), 7.95-7.97 (m, 2H)

MS (FAB) m/z: 529 ($M^{+1}$)

Synthesis Example 8

Synthesis of Exemplary Compound 190

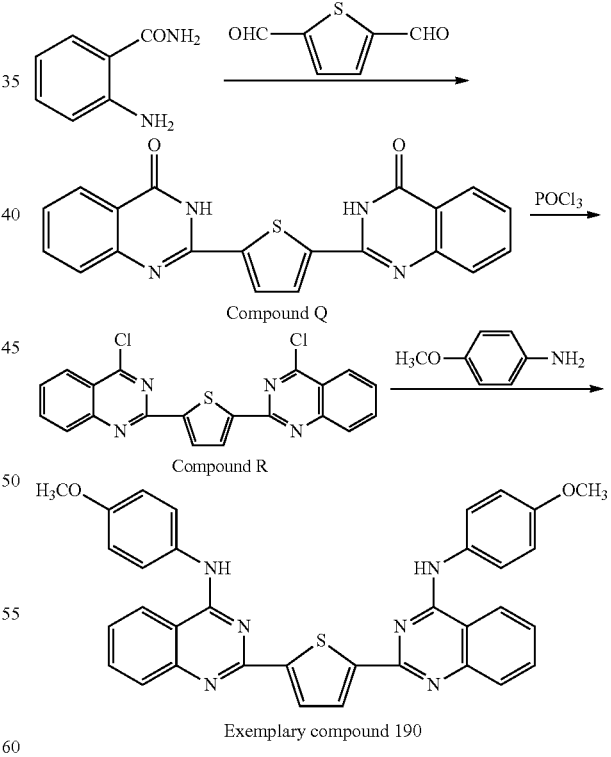

At room temperature, 9.77 g of 2,5-thiophenedicarboxyaldehyde, 20.0 g of 2-aminobenzamide, 22.9 g of sodium hydrogen sulfite, and 100 ml of N,N-dimethylacetamide were mixed, and the mixture was then heated and maintained at 150° C. for 5 hours. Thereafter, the reaction mixture was cooled, and thereto was added water at room temperature.

The mixture was stirred for 1 hour. A precipitated solid was filtered, washed with water, and dried to afford 20.5 g of Compound Q.

At room temperature, 15.2 g of Compound Q, 14.7 g of N,N-dimethylaniline, and 120 g of phosphorus oxychloride were mixed, and the mixture was then heated and maintained at 90° C. for 3 hours. Thereafter, the reaction mixture was cooled, and excess phosphorus oxychloride was removed under reduced pressure. To the obtained residue was added water, and the mixture was stirred at room temperature for 1 hour. A precipitated solid was filtered, washed with water, and dried to afford 15.0 g of Compound R.

At room temperature, 6.08 g of Compound R, 4.58 g of p-anisidine, and 60.0 g of triethylamine were mixed, and the mixture was then heated and refluxed under heating for 5 hours. Thereafter, the reaction mixture was cooled, and triethylamine was removed under reduced pressure to afford a solid, to which was added a mixed solvent of methanol and water. The mixture was then heated and refluxed under heating for 1 hour. Thereafter, the resulting mixture was cooled to room temperature, and a precipitated solid was filtered, washed with water, and dried to afford 7.01 g of a solid.

$^1$H-NMR and mass spectra confirmed that the obtained solid was Exemplary Compound 190 as evidenced below.

$^1$H-NMR (400 MHz, Deuterated chloroform, δ (ppm), TMS standard): 3.88 (s, 6H), 7.01-7.03 (m, 4H), 7.33 (s, 2H), 7.41-7.45 (m, 2H), 7.54-7.56 (m, 4H), 7.68-7.76 (m, 6H), 7.95-7.97 (m, 2H) MS (FAB) m/z: 583 ($M^{+1}$)

Synthesis Example 9

Synthesis of Exemplary Compound 196

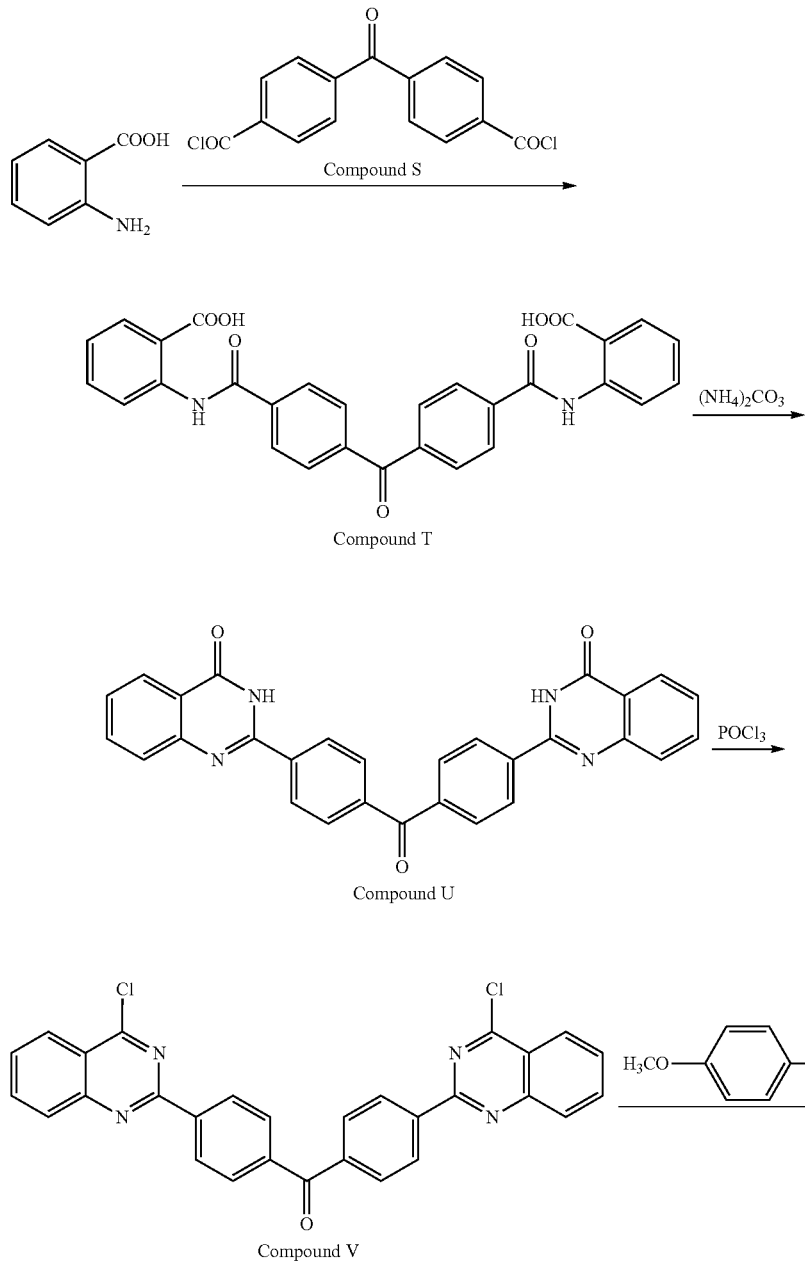

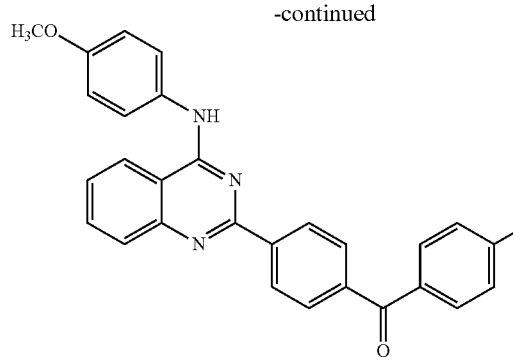

Exemplary compound 196

At room temperature, 4.78 g of anthranilic acid, 4.06 g of sodium carbonate, and 100 ml of water were mixed, followed by stirring for 1 hour, and then thereto was added a solution of 5.35 g of Compound S dissolved in 50 ml of acetone. The mixture was stirred for 2 hours at room temperature and then heated and refluxed under heating for 1 hour. The reaction mixture was then cooled, and thereto was added concentrated hydrochloric acid to adjust the pH to 1. Thereafter, a precipitated solid was filtered, washed with water, and dried to afford 8.86 g of Compound T.

At room temperature, 7.75 g of Compound T, 7.75 g of ammonium carbonate, and 80 ml of sulfolane were mixed, and the mixture was then heated and maintained at 150° C. for 5 hours. The reaction mixture was then cooled, and thereto were added 15 ml of concentrated hydrochloric acid and 65 ml of water. The mixture was stirred at room temperature for 1 hour. Thereafter, a precipitated solid was filtered, washed with water, and dried to afford 5.38 g of Compound U.

At room temperature, 5.38 g of Compound U, 5.27 g of N,N-dimethylaniline, and 40.0 g of phosphorus oxychloride were mixed, and the mixture was then heated and maintained at 90° C. for 3 hours. Thereafter, the reaction mixture was cooled, and excess phosphorus oxychloride was removed under reduced pressure. To the obtained residue was added water, and the mixture was stirred at room temperature for 1 hour. A precipitated solid was filtered, washed with water, and dried to afford 5.34 g of Compound V.

At room temperature, 5.34 g of Compound V, 3.24 g of p-anisidine, and 60.0 g of triethylamine were mixed, and the mixture was then heated and refluxed under heating for 5 hours. Thereafter, the reaction mixture was cooled, and triethylamine was removed under reduced pressure to afford a solid, to which was added a mixed solvent of methanol and water. The mixture was then heated and refluxed under heating for 1 hour. Thereafter, the resulting mixture was cooled to room temperature, and a precipitated solid was filtered, washed with water, and dried to afford 5.59 g of a solid.

$^1$H-NMR and mass spectra confirmed that the obtained solid was Exemplary Compound 196 as evidenced below.

$^1$H-NMR (400 MHz, Deuterated chloroform, δ (ppm), TMS standard): 3.88 (s, 6H), 7.01-7.03 (m, 4H), 7.33 (s, 2H), 7.41-7.45 (m, 2H), 7.54-7.56 (m, 4H), 7.68-7.76 (m, 4H), 7.83-7.85 (m, 4H), 7.88-7.90 (m, 4H), 7.95-7.97 (m, 2H)

MS (FAB) m/z: 681 (M$^{+1}$)

Synthesis Example 10

Synthesis of Exemplary Compound 201

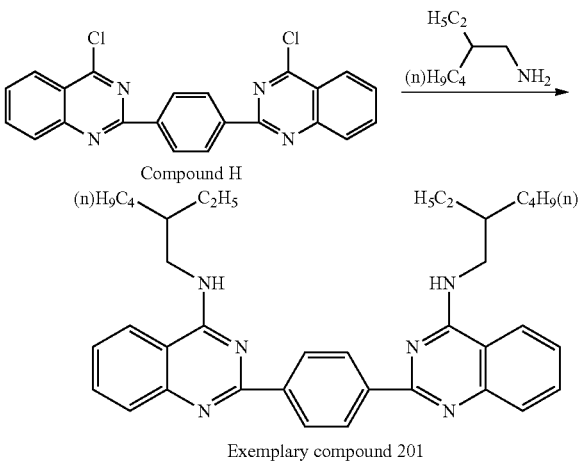

Exemplary compound 201

At room temperature, 6.00 g of Compound H obtained in the same manner as in Synthesis Example 5, 4.80 g of 2-ethylhexylamine, 6.00 g of triethylamine, and 50 ml of tetrahydrofuran were mixed, and the mixture was then heated and refluxed under heating for 5 hours. Thereafter, the reaction mixture was cooled, and tetrahydrofuran was removed under reduced pressure to afford a solid, to which was added ethyl acetate to dissolve the solid to afford an organic phase. The organic phase was successively washed with dilute hydrochloric acid, a dilute aqueous sodium hydrogencarbonate solution, and water. Thereafter, ethyl acetate was removed under reduced pressure to afford a solid, which was recrystallized from toluene to afford 6.74 g of a solid.

$^1$H-NMR and mass spectra confirmed that the obtained solid was Exemplary Compound 201 as evidenced below.

$^1$H-NMR (400 MHz, Deuterated chloroform, δ (ppm), TMS standard): 0.91-0.95 (t, 6H), 1.00-1.04 (t, 6H), 1.36-1.52 (m, 16H), 1.82 (m, 2H), 3.80-3.81 (m, 4H), 5.71 (m, 2H), 7.41-7.45 (m, 2H), 7.68-7.76 (m, 4H), 7.95-7.97 (m, 2H), 8.70 (s, 4H)

MS (FAB) m/z: 589 (M$^{+1}$)

Synthesis Example 11

Synthesis of Exemplary Compound 205

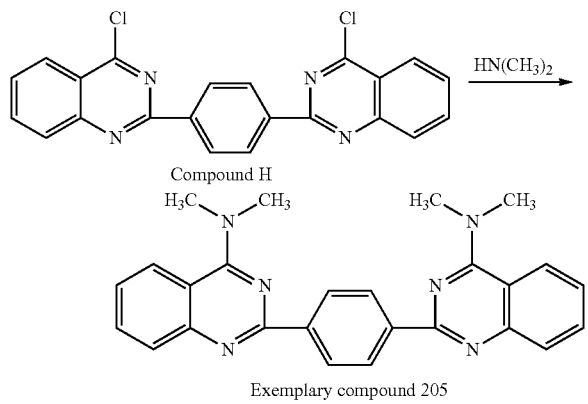

At room temperature, 6.00 g of Compound H obtained in the same manner as in Synthesis Example 5, 13.4 g of N,N-dimethylamine (50% aqueous solution), 6.00 g of triethylamine, and 40 ml of tetrahydrofuran were mixed, and the mixture was then heated and maintained at 70° C. for 5 hours. Thereafter, the reaction mixture was cooled, and thereto was added water at room temperature. The mixture was heated and maintained at 50° C. for 1 hour. Thereafter, the resulting mixture was cooled to room temperature, and a precipitated solid was filtered, washed with water, and dried to afford 5.19 g of a solid.

$^1$H-NMR and mass spectra confirmed that the obtained solid was Exemplary Compound 205 as evidenced below.

$^1$H-NMR (400 MHz, Deuterated chloroform, δ (ppm), TMS standard): 3.15 (s, 12H), 7.41-7.45 (m, 2H), 7.68-7.76 (m, 4H), 7.95-7.97 (m, 2H), 8.70 (s, 4H)

MS (FAB) m/z: 421 (M$^{+1}$)

Synthesis Example 12

Synthesis of Exemplary Compound 210

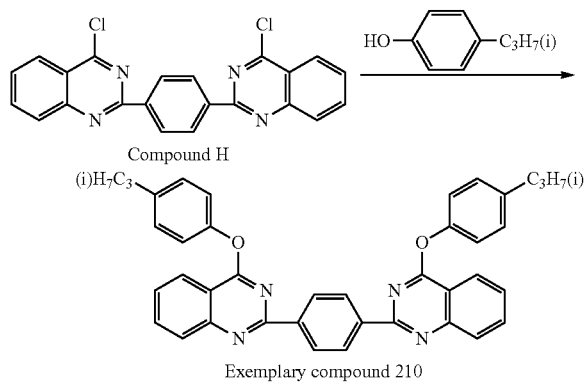

At room temperature, 6.00 g of Compound H obtained in the same manner as in Synthesis Example 5, 5.07 g of p-isopropyl phenol, 4.17 g of potassium hydroxide, and 100 ml of ethanol were mixed, and the mixture was then heated and refluxed under heating for 10 hours. Thereafter, the reaction mixture was cooled, and thereto was added water at room temperature. The mixture was then heated and refluxed under heating for 1 hour. Thereafter, the resulting mixture was cooled to room temperature, and a precipitated solid was filtered, washed with water, and dried to afford 6.19 g of a solid.

$^1$H-NMR and mass spectra confirmed that the obtained solid was Exemplary Compound 210 as evidenced below.

$^1$H-NMR (400 MHz, Deuterated chloroform, δ (ppm), TMS standard): 1.20 (d, 12H), 2.87 (m, 2H), 7.13 (m, 4H), 7.33 (m, 4H), 7.41-7.45 (m, 2H), 7.68-7.76 (m, 4H), 7.95-7.97 (m, 2H), 8.70 (s, 4H)

MS (FAB) m/z: 603 (M$^{+1}$)

Synthesis Example 13

Synthesis of Exemplary Compound 212

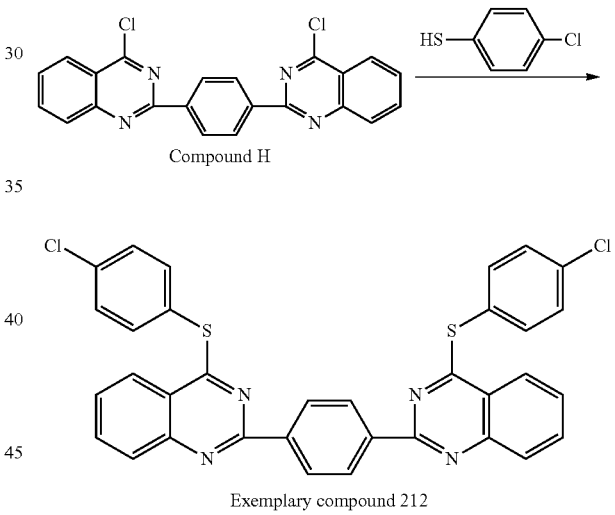

At room temperature, 6.00 g of Compound H obtained in the same manner as in Synthesis Example 5, 5.38 g of 4-chlorobenzenethiol, and 60.0 g of triethylamine were mixed, and the mixture was then heated and refluxed under heating for 5 hours. Thereafter, the reaction mixture was cooled, and triethylamine was removed under reduced pressure to afford a solid, to which was added a mixed solvent of methanol and water. The mixture was then heated and refluxed under heating for 1 hour. Thereafter, the resulting mixture was cooled to room temperature, and a precipitated solid was filtered, washed with water, and dried to afford 6.94 g of a solid.

$^1$H-NMR and mass spectra confirmed that the obtained solid was Exemplary Compound 212 as evidenced below.

$^1$H-NMR (400 MHz, Deuterated chloroform, δ (ppm), TMS standard): 7.33 (m, 4H), 7.41-7.45 (m, 2H), 7.68-7.76 (m, 8H), 7.95-7.97 (m, 2H), 8.70 (s, 4H)

MS (FAB) m/z: 620 (M$^{+1}$)

Other exemplary compounds can be synthesized in the same manner as in Synthesis Examples 1 to 13.

2) Comparative Compounds

[Formula 49]

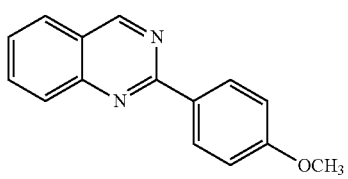

Comparative Compound 1

(described in Synthesis 1993 (9), 867-869)

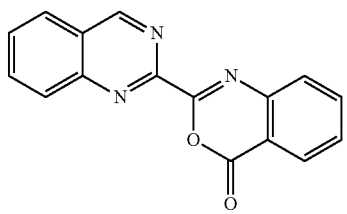

Comparative Compound 2

(described in Japanese Patent Application Laid-Open No. 2008-274246)

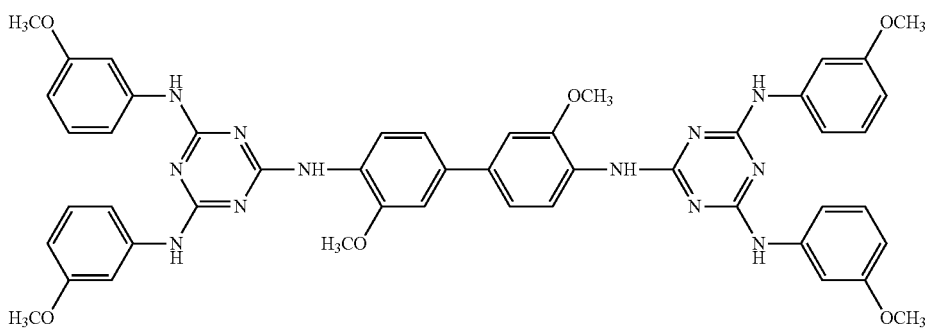

Comparative Compound 3

(described in Japanese Patent Application Laid-Open No. 2006-96875)

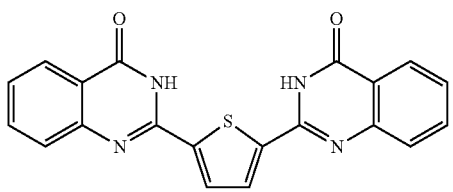

Comparative Compound 4

(described in Japanese Patent Application Laid-Open No. 2009-242641)

3) Cellulose Derivatives

Cellulose derivative A: Cellulose diacetate having a degree of acetyl substitution of 2.42 (a total degree of acyl substitution of 2.42, denoted as DAC in Table 1)

Cellulose derivative B: Cellulose triacetate having a degree of acetyl substitution of 2.88 (a total degree of acyl substitution of 2.88, denoted as TAC in Table 1)

Cellulose derivative C: Cellulose acetate propionate having a degree of acetyl substitution of 1.56 and a degree of propionyl substitution of 0.90 (a total degree of acyl substitution of 2.46, denoted as CAP1 in Table 1)

Cellulose derivative D: Cellulose acetate propionate having a degree of acetyl substitution of 0.21 and a degree of propionyl substitution of 1.62 (a total degree of acyl substitution of 1.83, denoted as CAP2 in Table 1)

Cellulose derivative E: Cellulose acetate propionate having a degree of acetyl substitution of 1.50 and a degree of propionyl substitution of 0.70 (a total degree of acyl substitution of 2.20, denoted as CAP3 in Table 1)

Cellulose derivative F: Cellulose acetate propionate having a degree of acetyl substitution of 1.07 and a degree of propionyl substitution of 0.75 (a total degree of acyl substitution of 1.82, denoted as CAP4 in Table 1)

2. Preparation of Retardation Film

Example 1

The following components were mixed with stirring for 50 minutes with a dissolver and then dispersed with a Manton Gaulin to prepare fine particle dispersion liquid 1.

(Composition of Fine Particle Dispersion Liquid 1)

Fine particles (Aerosil R972V made by Nippon Aerosil Co., Ltd.): 11 parts by weight Ethanol: 89 parts by weight Then, fine particle dispersion liquid 1 was slowly added to a dissolution tank containing methylene chloride with sufficient stirring. The fine particle dispersion liquid was further subjected dispersing by an Attritor so that the particle diameter of the secondary particles had a predetermined size. The dispersion was filtered by a Fine Met NF made by Nippon Seisen Co., Ltd. to thereby prepare fine particle-added liquid 1.

(Composition of Fine Particle-Added Liquid 1)
Methylene chloride: 99 parts by weight
Fine particle dispersion liquid 1:5 parts by weight A dope liquid having the following composition was prepared. First, methylene chloride and ethanol were added to a pressurized dissolution tank. Into the pressurized dissolution tank containing the solvents, were charged cellulose derivative A, Exemplary Compound 1, Monopet SB, and fine particle-added liquid 1 with stirring. The mixture was heated under stirring to thereby completely dissolve the mixture. The obtained solution was filtered using Azumi filter paper No. 244 manufactured by Azumi Filter Paper Co., Ltd. to thereby prepare a dope liquid.

(Composition of Dope Liquid)
Methylene chloride: 340 parts by weight
Ethanol: 64 parts by weight
Cellulose derivative A: Cellulose diacetate having a degree of acetyl substitution of 2.42 (a total degree of acyl substitution of 2.42, denoted as DAC in Table 1): 100 parts by weight
Exemplary Compound 1 (compound according to the present invention): 8 parts by weight
Monopet SB (manufactured by Dai-Ichi Kogyo Seiyaku Co., Ltd.): 5 parts by weight
Fine particle-added solution 1:1 part by weight Then, the obtained dope liquid was cast evenly over a stainless steel belt support in a 1,500 mm width at 33° C. using an endless belt casting apparatus. The temperature of the stainless steel belt was controlled at 30° C.

The solvents were evaporated on the stainless steel belt support until the residual solvent amount in the cast dope film amounted to 75%, thus obtaining a web. The obtained web was peeled off the stainless steel belt support at a peeling tension of 130 N/m.

The web obtained by peeling was stretched by 35% (1.35 times) in the width direction under heating at 145° C. by using a tenter. The residual solvent at the start of the stretching was 15%.

Then, the obtained film was conveyed on a number of rolls through a drying zone to complete the drying of the film. The drying temperature was set at 130° C. and the conveyance tension was set at 100 N/m. Retardation film 101 having a dried film thickness of 20 μm was obtained as described above.

Examples 2 to 27 and Comparative Examples 1 to 7

Retardation films 102 to 134 were prepared in the same manner as in Example 1 except that, in the preparation of retardation film 101, the type of cellulose derivatives, the compound represented by general formula (1) according to the present invention, and optionally other additives were selected as shown in Table 1.

The production conditions of the films are shown in Table 1.

TABLE 1

| Retardation film No. | Cellulose derivative | | Compounds represented by general formulas (1) to (4) according to the present invention | | Other additives | | Remarks |
|---|---|---|---|---|---|---|---|
| | Type | Addition amount (parts by weight) | Type | Addition amount (parts by weight) | Type | Addition amount (parts by weight) | |
| 101 | DAC | 100 | Exemplary Compound 1 | 8 | None | — | Example 1 |
| 102 | DAC | 100 | Exemplary Compound 3 | 8 | None | — | Example 2 |
| 103 | DAC | 100 | Exemplary Compound 4 | 8 | None | — | Example 3 |
| 104 | DAC | 100 | Exemplary Compound 6 | 9 | None | — | Example 4 |
| 105 | DAC | 100 | Exemplary Compound 47 | 10 | None | — | Example 5 |
| 106 | DAC | 100 | Exemplary Compound 52 | 8 | None | — | Example 6 |
| 107 | DAC | 100 | Exemplary Compound 87 | 8 | None | — | Example 7 |
| 108 | DAC | 100 | Exemplary Compound 95 | 8 | None | — | Example 8 |
| 109 | DAC | 100 | Exemplary Compound 97 | 8 | None | — | Example 9 |
| 110 | DAC | 100 | Exemplary Compound 117 | 8 | None | — | Example 10 |
| 111 | DAC | 100 | Exemplary Compound 137 | 7 | None | — | Example 11 |
| 112 | DAC | 100 | Exemplary Compound 144 | 6 | None | — | Example 12 |
| 113 | DAC | 100 | Exemplary Compound 153 | 6 | None | — | Example 13 |
| 114 | DAC | 100 | Exemplary Compound 157 | 5 | None | — | Example 14 |
| 115 | DAC | 100 | Exemplary Compound 176 | 6 | None | — | Example 15 |
| 116 | DAC | 100 | Exemplary Compound 186 | 4 | None | — | Example 16 |
| 117 | DAC | 100 | Exemplary Compound 188 | 4 | None | — | Example 17 |

TABLE 1-continued

| Retardation film No. | Cellulose derivative | | Compounds represented by general formulas (1) to (4) according to the present invention | | Other additives | | Remarks |
|---|---|---|---|---|---|---|---|
| | Type | Addition amount (parts by weight) | Type | Addition amount (parts by weight) | Type | Addition amount (parts by weight) | |
| 118 | DAC | 100 | Exemplary Compound 189 | 5 | None | — | Example 18 |
| 119 | DAC | 100 | Exemplary Compound 190 | 4 | None | — | Example 19 |
| 120 | DAC | 100 | Exemplary Compound 196 | 4 | None | — | Example 20 |
| 121 | DAC | 100 | Exemplary Compound 201 | 4 | None | — | Example 21 |
| 122 | DAC | 100 | Exemplary Compound 205 | 5 | None | — | Example 22 |
| 123 | DAC | 100 | Exemplary Compound 210 | 6 | None | — | Example 23 |
| 124 | DAC | 100 | Exemplary Compound 212 | 6 | None | — | Example 24 |
| 125 | TAC | 100 | Exemplary Compound 201 | 8 | None | — | Example 25 |
| 126 | CAP1 | 100 | Exemplary Compound 201 | 4 | None | — | Example 26 |
| 127 | CAP2 | 70 | Exemplary Compound 201 | 4 | *1 | 30 | Example 27 |
| 128 | DAC | 100 | Comparative compound 1 | 8 | None | — | Comparative Example 1 |
| 129 | DAC | 100 | Comparative compound 2 | 8 | None | — | Comparative Example 2 |
| 130 | DAC | 100 | Comparative compound 3 | 8 | None | — | Comparative Example 3 |
| 131 | DAC | 100 | Comparative compound 4 | 8 | None | — | Comparative Example 4 |
| 132 | DAC | 100 | None | — | None | — | Comparative Example 5 |
| 133 | CAP3 | 100 | None | — | None | — | Comparative Example 6 |
| 134 | CAP4 | 94 | None | — | *2 | 6 | Comparative Example 7 |

*1: Poly(methyl methacrylate) (weight-average molecular weight 2,500)
*2: Copolymer of hydroxystyrene/styrene = 70/30 (weight-average molecular weight 2,000)

Each retardation film prepared as described above was subjected to the following evaluations. The results are shown in Table 2.

(Retardation)

In-plane retardation Ro and thickness direction retardation Rth of the central portion in the width direction of the obtained retardation film were measured by the following methods.

1) The obtained retardation film was humidity-conditioned at 23° C. and 55% RH for 2 hours.

2) Light having a wavelength of 590 nm was made incident on the retardation film after humidity conditioning in parallel with the normal direction of the surface of the film, and the retardation Ro at this time was measured with KOBRA21ADH manufactured by Oji Scientific Instruments Co., Ltd.

3) light having a wavelength of 590 nm was made incident on the retardation film at angle of θ (angle of incidence (θ)) to the normal direction of the surface of the film with the in-plane slow axis of the retardation film as an axis of tilt (axis of rotation), and the retardation value R (θ) at this time was measured with KOBRA21ADH. The measurement of the retardation value R (θ) was made at six points at intervals of 10° in the range of 0 of from 0° to 50°. The in-plane slow axis of the retardation film was confirmed by KOBRA21ADH.

4) The nx, ny, and nz were calculated from the measured Ro and R (θ) and the average refractive index and film thickness as described above with KOBRA21ADH, and Rth at a wavelength of 590 nm was calculated based on the following expressions. The measurement of retardation was made under a condition of 23° C. and 55% RH.

$$Ro = (nx - ny) \times d \qquad \text{Expression (I)}$$

$$Rth = ((nx + ny)/2 - nz) \times d \qquad \text{Expression (II)}$$

where d represents a thickness (nm) of the film; nx represents a maximum refractive index in the plane of the film (also referred to as a refractive index in the slow axis direction); ny represents a refractive index in the direction orthogonal to the slow axis in the plane of the film; and nz represents a refractive index in the thickness direction of the film.

(Magnitude of Changes in Retardation in Response to Humidity Changes)

The magnitude of changes in retardation ΔRo in response to humidity changes, as defined by the following Expression (III), was evaluated. The same automatic birefringence analyzer as that used for the measurement of retardation was used as a measurement device.

$$\Delta Ro = \{[Ro(23°\text{C.}, 10\% RH) - Ro(23°\text{C.}, 80\% RH)]/Ro(23°\text{C.}, 55\% RH)\} \times 100(\%) \qquad \text{Expression (III)}$$

where Ro(23° C., 10% RH), Ro(23° C., 80% RH), and Ro(23° C., 55% RH) represent in-plane retardation Ro measured at a wavelength of 590 nm after humidity-conditioning of the retardation film for 36 hours at 23° C., 10% RH, 23° C., 80% RH, and 23° C., 55% RH, respectively.

The magnitude of changes in retardation (ΔRo) in response to humidity changes was ranked based the following criteria.
A: 0% or more and less than 5%
B: 5% or more and less than 10%
C: 10% or more and less than 15%
D: 15% or more Rank B or higher is satisfactory for practical purposes, but rank A is particularly preferred.

(Brittleness)

The brittleness of the retardation film was evaluated by the slitting suitability to be described below. Specifically, the upper blade whose cutting edge is worn to an angle of 60° and the lower blade whose cutting edge has an angle of 90° were attached to a desk hydraulic press machine so that the spacing in the horizontal direction is 30 μm. Thereafter, each retardation film was placed between the tip of the upper blade and the tip of the lower blade, and 100 samples each having a size of 90 cm in width and 100 cm in length were successively cut at a lowering speed of the upper blade of 6 m/min. The fracture surface of each sample obtained by cutting was observed at a magnification of 50 times using an optical microscope. The fraction defective was calculated by counting the number of samples in which any defect, such as a burr, cleavage, inability of cutting, and generation of scraps, is generated and applying the number to the following expression.

Fraction defective (%)=(number of samples in which a defect is generated/total number of cut samples (100 pieces))×100

Slitting suitability was evaluated in accordance with the following criteria.
A: Fraction defective is less than 2%
B: Fraction defective is 2% or more and less than 5%
C: Fraction defective is 5% or more and less than 10%
D: Fraction defective is 10% or more Rank B or higher is satisfactory for practical purposes, but rank A is particularly preferred.

(Bleedout Resistance)

The durability of the retardation film was evaluated by the bleedout resistance to be described below. Specifically, the retardation film was allowed to stand for 1,000 hours in a high-temperature and high-humidity atmosphere of 80° C. and 90% RH, and the presence or absence of the bleedout (crystal precipitation) on the surface of the retardation film was visually observed. The bleedout resistance was evaluated in accordance with the following criteria.
A: Occurrence of bleedout is not observed on the surface at all.
B: On the surface, partial bleedout is slightly observed.
C: On the surface, bleedout is slightly observed over the entire surface.
D: On the surface, clear bleedout is observed over the entire surface.

Rank B or higher is satisfactory for practical purposes, but rank A is particularly preferred.

(Alkaline Solution Resistance (Saponification Liquid Coloring))

The retardation film was cut into a size of 5 cm×24 cm to prepare a sample film. The sample film was immersed in 40 g of 1.5 mol/L aqueous potassium hydroxide solution at 70° C. for 30 hours. Then, the absorption spectrum of the aqueous potassium hydroxide solution in which the sample film was immersed for 30 hours was measured using spectrophotometer U-3310 from Hitachi High-Technologies Corporation, and tristimulus values X, Y, and Z were calculated. Yellowness YI was calculated from the tristimulus values X, Y, and Z based on JIS-K7103, and saponification liquid coloring was ranked on the following criteria.
A: Yellowness YI is less than 1.0.
B: Yellowness YI is 1.0 or more and less than 3.0.
C: Yellowness YI is 3.0 or more and less than 5.0.
D: Yellowness YI is 5.0 or more.

C rank or higher is satisfactory for practical purposes, but rank B or higher is preferred, with rank A being particularly preferred.

TABLE 2

| Retardation film No. | Retardation value Ro (nm) | Rth (nm) | Magnitude of changes in retardation in response to humidity changes | Brittleness | Bleedout resistance | Alkaline solution resistance | Remarks |
|---|---|---|---|---|---|---|---|
| 101 | 55 | 124 | A | B | B | B | Example 1 |
| 102 | 50 | 120 | A | B | B | B | Example 2 |
| 103 | 52 | 123 | A | B | B | B | Example 3 |
| 104 | 43 | 111 | B | B | B | B | Example 4 |
| 105 | 41 | 112 | B | B | B | C | Example 5 |
| 106 | 55 | 125 | B | B | B | C | Example 6 |
| 107 | 54 | 124 | B | A | A | B | Example 7 |
| 108 | 54 | 126 | A | B | B | A | Example 8 |
| 109 | 52 | 125 | B | A | B | B | Example 9 |
| 110 | 48 | 119 | B | A | B | A | Example 10 |
| 111 | 60 | 130 | A | B | B | A | Example 11 |
| 112 | 50 | 121 | A | B | B | A | Example 12 |
| 113 | 52 | 123 | A | B | B | A | Example 13 |
| 114 | 57 | 122 | A | B | A | A | Example 14 |
| 115 | 44 | 115 | A | B | B | A | Example 15 |
| 116 | 59 | 124 | A | A | A | A | Example 16 |
| 117 | 54 | 121 | A | A | A | A | Example 17 |
| 118 | 45 | 113 | A | A | A | A | Example 18 |
| 119 | 53 | 124 | A | A | A | A | Example 19 |
| 120 | 54 | 126 | A | A | A | A | Example 20 |
| 121 | 55 | 125 | A | A | A | A | Example 21 |
| 122 | 50 | 123 | A | A | A | B | Example 22 |
| 123 | 46 | 115 | A | A | A | A | Example 23 |

TABLE 2-continued

| Retardation film No. | Retardation value Ro (nm) | Rth (nm) | Magnitude of changes in retardation in response to humidity changes | Brittleness | Bleedout resistance | Alkaline solution resistance | Remarks |
|---|---|---|---|---|---|---|---|
| 124 | 48 | 117 | A | A | A | A | Example 24 |
| 125 | 41 | 110 | A | A | B | A | Example 25 |
| 126 | 58 | 127 | A | A | A | A | Example 26 |
| 127 | 50 | 120 | A | A | A | A | Example 27 |
| 128 | 30 | 63 | D | D | D | D | Comparative Example 1 |
| 129 | 43 | 90 | D | C | C | D | Comparative Example 2 |
| 130 | 41 | 95 | D | D | D | D | Comparative Example 3 |
| 131 | 38 | 78 | D | D | D | D | Comparative Example 4 |
| 132 | 25 | 55 | D | D | A | D | Comparative Example 5 |
| 133 | 21 | 43 | D | D | A | C | Comparative Example 6 |
| 134 | 28 | 60 | D | D | C | D | Comparative Example 7 |

As apparent from Table 2, it is found that retardation films 101 to 127 of Examples 1 to 27 are practically excellent retardation films. These films are excellent in the development of retardation and have good mechanical strength (brittleness) and durability (resistance of retardation to humidity changes, bleedout resistance, alkaline solution resistance) compared with retardation films 128 to 134 of Comparative Examples 1 to 7.

Examples 28 to 31

Retardation films 201 to 204 were prepared in the same manner as in the preparation of retardation film 121 of Example 21 except that, in the preparation of retardation film 121 of Example 21, the addition amount of Exemplary Compound 201 was changed as shown in Table 3, and the flow rate of the dope solution during casting was changed so that the film thickness as shown in Table 3 can be obtained, and the same evaluations as in Example 21 were carried out.

The evaluation results of Examples 28 to 31 are shown in Table 3 together with the evaluation results of Example 21.

TABLE 3

| No. | Retardation film Addition amount of Exemplary Compound 201 (parts by weight) | Film thickness (μm) | Retardation value Ro (nm) | Rth (nm) | * Magnitude of change | Brittleness | Bleedout resistance | Alkaline solution resistance | Remarks |
|---|---|---|---|---|---|---|---|---|---|
| 201 | 5.3 | 15 | 52 | 121 | A | B | A | A | Example 28 |
| 121 | 4.0 | 20 | 55 | 125 | A | A | A | A | Example 21 |
| 202 | 2.7 | 30 | 57 | 126 | A | A | A | A | Example 29 |
| 203 | 2.3 | 35 | 56 | 126 | A | A | A | A | Example 30 |
| 204 | 2.0 | 40 | 55 | 125 | A | A | A | B | Example 31 |

* Magnitude of change: Magnitude of changes in retardation in response to humidity change As apparent from Table 3, it is found that retardation films 201 to 204 of Examples 28 to 31 are excellent in the development of retardation and excellent in mechanical strength (brittleness) and durability (resistance of retardation to humidity change, bleedout resistance, alkaline solution resistance). In particular, it is found that retardation films 121, 202, and 203 having a film thickness in the range of 20 to 35 μm are excellent in all of the foregoing properties.

3. Preparation of Polarizing Plate

Example 32

A polyvinyl alcohol film having a thickness of 120 μm was uniaxially stretched at 110° C. at a stretching ratio of 5 times. The obtained film was immersed in an aqueous solution consisting of 0.075 parts by weight of iodine, 5 parts by weight of potassium iodide, and 100 parts by weight of water for 60 seconds, and then immersed in an aqueous solution consisting of 6 parts by weight of potassium iodide, 7.5 parts by weight of boric acid, and 100 parts by weight of water at 68° C. The obtained film was washed with water and dried to provide a polarizer having a thickness of 20 μm.

A polarizing plate was then fabricated by laminating a polarizer to retardation film 101 and laminating Konica Minolta Tac KC4UY (cellulose ester film manufactured by Konica Minolta Opto, Inc.) to the back side of retardation film 101 according to the following Steps 1 to 5.

Step 1: Retardation film 101 was immersed in a 2 mol/L aqueous sodium hydroxide solution at 60° C. for 90 seconds, and washed with water and dried, thus saponifying retardation film 101 on the side to be laminated with a polarizer.

Step 2: The polarizer was immersed for 1 to 2 seconds in a tank containing polyvinyl alcohol adhesive having a solid content of 2 wt %.

Step 3: An excess adhesive adhering to the polarizer in Step 2 was lightly wiped off, and the resulting polarizer was placed on the retardation film treated in Step 1.

Step 4: Konica Minolta Tac KC4UY was stacked on the polarizer obtained in Step 3 on the side opposite to the retardation film to provide a laminate. The laminate was pressed at a pressure of 20 to 30 N/cm$^2$ and a transportation speed of about 2 m/min.

Step 5: The sample prepared in Step 4 in which the polarizer, retardation film, and Konica Minolta Tac KC4UY are bonded together was dried in a drier at 80° C. for 2 minutes to prepare polarizing plate 101.

Examples 33 to 62 and Comparative Examples 8 to 14

Polarizing plates 102 to 134 and 202 to 204 were prepared in the same manner as in Example 32 except that retardation film 101 was changed as shown in Table 4.

The durability of the obtained polarizing plates was evaluated by the following methods. The results are shown in Table 4.

(Reworkability (Yield of Polarizing Plate))

The prepared polarizing plates were each cut into a square having a size of 20 cm×20 cm and bonded to a glass substrate using an acrylic adhesive. Then, the bonded polarizing plate was peeled off the glass from a corner of the plate with a strength of 5 N. This work was done for 100 samples of each type of polarizing plate. The number of polarizing plates which were not completely peeled off due to a crack occurring in the polarizing plate was counted. Reworkability was ranked based on the following criteria.

A: 0 to 5 pieces
B: 6 to 10 pieces
C: 11 to 15 pieces
D: 16 pieces or more

Rank C or higher is satisfactory for practical purposes, but rank B or higher is preferred, with rank A being particularly preferred.

(Light Resistance)

Parallel transmittance (H0) and orthogonal transmittance (H90) of the polarizing plate sample before forced degradation treatment were measured, and polarization degree P0 was calculated using the expression given below. Thereafter, the polarizing plate sample was subjected to forced degradation treatment under the conditions of 500 hours in a sunshine weather meter without an UV cut off filter. Thereafter, the parallel transmittance (H0') and orthogonal transmittance (H90') of the polarizing plate sample after the forced degradation treatment were measured, and polarization degree P500 was calculated according to the following expression. The amount of change in polarization degree was calculated using the following expression.

Polarization degree P0=√[(H0−H90)/(H0+H90)]×100
Polarization degree P500=√[(H0'−H90')/(H0'+H90')]×100
Amount of change in polarization degree=P0−P500

P0: Polarization degree before forced degradation treatment

P500: Polarization degree after 500-hour forced degradation treatment

The amounts of change in polarization degree calculated as described above were evaluated based on the following criteria to evaluate light resistance.

A: Amount of change in polarization degree is less than 2%.

B: Amount of change in polarization degree is 2% or more and less than 10%.

C: Amount of change in polarization degree is 10% or more and less than 25%.

D: Amount of change in polarization degree is 25% or more.

Rank B or higher is satisfactory for practical purposes, but rank A is particularly preferred.

(Moist Heat Resistance)

Two polarizing plate samples each having a size of 500 mm×500 mm were cut from the obtained polarizing plate and were each heat-treated at 80° C. and at 90% RH for 100 hours. Two polarizing plate samples obtained after heat treatment were laminated so that the absorption axis is orthogonal to each other. Then, light was radiated from the side of one of the polarizing plate samples, and the length of a blank part produced by the irradiation in the edge portion on the side of the other polarizing plate sample was measured, and the ratio of the length of the blank part to the length (500 mm) of one side of the polarizing plate sample was calculated. The "blank part" used as the evaluation object was the longest one among a plurality of blank parts produced respectively around the center of four edge portions of the polarizing plate sample. The edge blank is produced when the edge portion of the polarizing plate which does not allow light to pass through it in the orthogonal state creates a state where it allows light to pass through it, and the blank at the edge causes a failure in which an image is not displayed in the edge portion of the polarizing plate. Moist heat resistance of the polarizing plate was evaluated based on the following criteria.

A: Edge blank is less than 5% (satisfactory as a polarizing plate).

B: Edge blank is 5% or more and less than 10% (satisfactory as a polarizing plate).

C: Edge blank is 10% or more and less than 20% (usable as a polarizing plate only with difficulty).

D: Edge blank is 20% or more (problematic as a polarizing plate).

Rank B or higher is satisfactory for practical purposes, but rank A is particularly preferred.

TABLE 4

| Polarizing plate No. | Reworkability | Light resistance | Moist heat resistance | Remarks |
|---|---|---|---|---|
| 101 | B | A | B | Example 32 |
| 102 | B | B | B | Example 33 |
| 103 | B | A | B | Example 34 |
| 104 | B | B | B | Example 35 |
| 105 | C | B | B | Example 36 |
| 106 | B | B | B | Example 37 |
| 107 | A | B | B | Example 38 |
| 108 | B | B | B | Example 39 |
| 109 | B | B | A | Example 40 |
| 110 | B | A | B | Example 41 |
| 111 | B | A | B | Example 42 |
| 112 | A | A | B | Example 43 |
| 113 | A | B | A | Example 44 |
| 114 | A | B | A | Example 45 |
| 115 | B | A | A | Example 46 |
| 116 | A | A | A | Example 47 |
| 117 | A | A | A | Example 48 |
| 118 | A | A | A | Example 49 |
| 119 | A | B | A | Example 50 |
| 120 | A | A | A | Example 51 |
| 121 | A | A | A | Example 52 |
| 122 | A | A | B | Example 53 |
| 123 | A | A | B | Example 54 |

TABLE 4-continued

| Polarizing plate No. | Reworkability | Light resistance | Moist heat resistance | Remarks |
|---|---|---|---|---|
| 124 | A | B | A | Example 55 |
| 125 | A | A | A | Example 56 |
| 126 | A | A | A | Example 57 |
| 127 | A | A | A | Example 58 |
| 128 | D | D | D | Comparative Example 8 |
| 129 | D | C | D | Comparative Example 9 |
| 130 | D | D | D | Comparative Example 10 |
| 131 | D | C | D | Comparative Example 11 |
| 132 | D | C | D | Comparative Example 12 |
| 133 | D | C | D | Comparative Example 13 |
| 134 | D | D | D | Comparative Example 14 |
| 201 | B | A | A | Example 59 |
| 202 | A | A | A | Example 60 |
| 203 | A | A | A | Example 61 |
| 204 | A | A | A | Example 62 |

As apparent from Table 4, it is found that polarizing plates 101 to 127 and 201 to 204 of Examples 32 to 62 are excellent in mechanical strength (reworkability) and durability (light resistance, moist heat resistance) compared with polarizing plates 128 to 134 of Comparative Examples 8 to 14.

4. Fabrication of Liquid Crystal Display Device

Example 63

A liquid crystal panel for view angle measurement was prepared as follows, and was evaluated for characteristics as a liquid crystal display device.

The polarizing plates previously laminated on both sides of a 40-inch display KLV-40J3000 manufactured by SONY Corporation were peeled off, and polarizing plate 101 prepared in Example 32 was laminated to both sides of the glass surface of the liquid crystal cell.

Lamination of the polarizing plate was performed so that the surface of the retardation film of the present invention faces the liquid crystal cell. Lamination of the polarizing plate was performed also such that the absorption axis of the prepared polarizing plate and the absorption axis of the previously laminated polarizing plate run in the same direction. In this way liquid crystal display device 101 was fabricated.

Examples 64 to 93 and Comparative Examples 15 to 21

Liquid crystal display devices 102 to 134 and 202 to 204 were fabricated in the same manner as in Example 63 except that retardation film 101 was changed as shown in Table 5.

The liquid crystal display devices fabricated as described above were subjected to evaluations as described below. The results are shown in Table 5.

(View Angle)

The transmitted light amount when the display device is displayed in black and the transmitted light amount when the display device is displayed in white were respectively measured with EZ-contrast 160D manufactured by ELDIM Corporation while changing the angle of inclination θ to the normal direction of the display screen. Contrast was calculated by substituting the values of transmitted light amount of black display and the transmitted light amount of white display measured at each angle of inclination θ into the following expression.

Contrast=(Transmitted light amount of white display)/(Transmitted light amount of black display)

A liquid crystal display device that exhibited a contrast of 10 or more at an angle of inclination θ of 60° or more for both right and left directions was rated as "B."

A: View angle is very wide.
B: View angle is wide.
C: View angle is slightly narrow.
D: View angle is narrow.

Rank B or higher is satisfactory for practical purposes, but rank A is particularly preferred.

(Front Contrast Unevenness)

The backlight of the liquid crystal display device was continuously lighted for 1 week in an environment of 23° C. and 55% RH. Thereafter, the luminance in a direction parallel to the normal direction of the display screen when the liquid crystal display device is displayed black and the luminance in a direction parallel to the normal direction of the display screen when the liquid crystal display device is displayed white were measured using EZ-Contrast 160D manufactured by ELDIM Corporation. The front contrast was calculated by applying the obtained luminance to the following expression.

Front contrast=Luminance of white display measured from the normal direction of display screen/Luminance of black display measured from the normal direction of display screen The front contrasts of optional five points in the display screen were measured. Then, the average value of the obtained front contrasts for five points was determined. Further, among the obtained front contrasts of five points, the maximum value or the minimum value of front contrasts was determined in which the difference (absolute value) from the average value is the maximum. These values were applied to the following expression, and % variation in front contrasts was determined.

% variation in front contrast=|(Maximum value or minimum value of front contrast)−(Average value of front contrast)|/(Average value of front contrast)×100

Front contrast unevenness was evaluated according to the following criteria.

A: Variation in front contrast is less than 5%, and unevenness is small.
B: Variation in front contrast is 5% or more and less than 10%, and there is a slight unevenness.
C: Variation in front contrast is 10% or more, and unevenness is large.

Rank B or higher is satisfactory for practical purposes, but rank A is particularly preferred.

(View Angle Degradation)

The view angle of the liquid crystal display device after being allowed to stand in an environment of 23° C. and 55% RH for 5 hours was measured using EZ-Contrast 160D manufactured by ELDIM Corporation. Then, this liquid crystal display device was allowed to stand in an environment of 23° C. and 20% RH for 5 hours, and then the view angle was measured. Further, this liquid crystal display device was allowed to stand in an environment of 23° C. and 80% RH for 5 hours, and then the view angle was measured. Finally, this liquid crystal display device was allowed to stand in an environment of 23° C. and 55% RH for 5 hours, and then the view angle was measured. Then, the first view angle measured in an environment of 23° C. and 55% RH was compared with the final view angle measured in an environment of 23° C. and 55% RH, and the amount of change in view angle was measured. The change in view angle was evaluated based on the following criteria.

A: View angle change is not observed.
B: View angle change is slightly observed.
C: View angle change is observed.

Rank B or higher is satisfactory for practical purposes, but rank A is particularly preferred.

TABLE 5

| Liquid crystal display device No. | View angle | Front contrast unevenness | View angle degradation | Remarks |
|---|---|---|---|---|
| 101 | A | B | A | Example 63 |
| 102 | A | B | B | Example 64 |
| 103 | A | B | B | Example 65 |
| 104 | B | B | B | Example 66 |
| 105 | B | B | B | Example 67 |
| 106 | A | B | B | Example 68 |
| 107 | A | B | B | Example 69 |
| 108 | A | B | B | Example 70 |
| 109 | A | B | B | Example 71 |
| 110 | B | A | B | Example 72 |
| 111 | A | B | A | Example 73 |
| 112 | A | A | B | Example 74 |
| 113 | A | A | B | Example 75 |
| 114 | A | B | A | Example 76 |
| 115 | B | A | A | Example 77 |
| 116 | A | A | A | Example 78 |
| 117 | A | A | A | Example 79 |
| 118 | B | A | A | Example 80 |
| 119 | A | A | A | Example 81 |
| 120 | A | A | A | Example 82 |
| 121 | A | A | A | Example 83 |
| 122 | A | A | A | Example 84 |
| 123 | B | A | A | Example 85 |
| 124 | B | A | A | Example 86 |
| 125 | B | A | A | Example 87 |
| 126 | A | A | A | Example 88 |
| 127 | A | A | A | Example 89 |
| 128 | D | C | C | Comparative Example 15 |
| 129 | C | C | C | Comparative Example 16 |
| 130 | C | C | C | Comparative Example 17 |
| 131 | C | C | C | Comparative Example 18 |
| 132 | D | C | C | Comparative Example 19 |
| 133 | D | C | C | Comparative Example 20 |
| 134 | D | C | C | Comparative Example 21 |
| 201 | A | A | A | Example 90 |
| 202 | A | A | A | Example 91 |
| 203 | A | A | A | Example 92 |
| 204 | A | A | A | Example 93 |

As apparent from Table 5, it is found that the liquid crystal display devices 101 to 127 and 201 to 204 of Examples 63 to 93 using polarizing plates 101 to 127 and 201 to 204 of the present invention are extremely stable liquid crystal display devices excellent in durability. These liquid crystal display devices have a wide view angle, do not have front contrast unevenness, and have no view angle change under the conditions in which humidity changes, as compared with liquid crystal display devices 128 to 134 of Comparative Example 15 to 21 using polarizing plates 128 to 134.

The present application claims priority of Japanese Patent Application No. 2011-052455, filed on Mar. 10, 2011, the entire contents of which including the specification and the drawings are hereby incorporated by reference.

The invention claimed is:

1. A retardation film comprising a cellulose derivative and at least one compound represented by general formula (2) or (3):

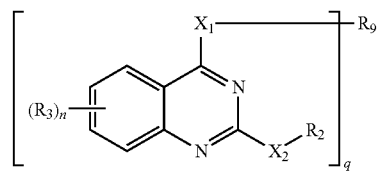

General formula (2)

wherein
$R_2$ represents an alkyl group, a cycloalkyl group, an aryl group or a heterocyclic group;
$X_1$ represents a single bond, $-NR_4-$, $-O-$ or $-S-$;
$X_2$ represents a single bond, $-NR_5-$, $-NR_5-(C=O)-$, $-O-$ or $-S-$;
$R_4$ and $R_5$ each independently represent a hydrogen atom, an alkyl group, a cycloalkyl group, an aryl group or a heterocyclic group;
$R_3$ represents a substituent;
n represents an integer of 0 to 4; and when n is 2 or more, a plurality of $R_3$s may be the same or different and adjacent $R_3$s may be joined together to form a ring;
$R_9$ represents a q-valent alkyl group, a q-valent cycloalkyl group, a q-valent aryl group or a q-valent heterocyclic group, or
a q-valent linking group formed by combining two or more members selected from the group consisting of an alkyl group, a cycloalkyl group, an aryl group and a heterocyclic group, or
a q-valent linking group formed by combining an alkyl group, a cycloalkyl group, an aryl group or a heterocyclic group with a divalent group represented by $-NR_{10}-$, $-O-$, $-S-$, $-C(=O)-$, $-S(=O)_2-$, $-CH=CH-$ or $-C\equiv C-$;
$R_{10}$ represents a hydrogen atom, an alkyl group, a cycloalkyl group, an aryl group or a heterocyclic group; and
q represents 2 or 3;

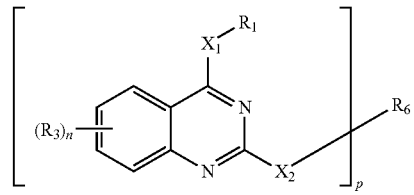

General formula (3)

wherein
$R_1$ represents an alkyl group, a cycloalkyl group, an aryl group or a heterocyclic group;
$X_1$ represents a single bond, $-NR_4-$, $-O-$ or $-S-$;
$X_2$ represents a single bond, $-NR_5-$, $-NR_5-(C=O)-$, $-O-$ or $-S-$;
$R_4$ and $R_5$ each independently represent a hydrogen atom, an alkyl group, a cycloalkyl group, an aryl group or a heterocyclic group;
$R_3$ represents a substituent;
n represents an integer of 0 to 4; and when n is 2 or more, a plurality of $R_3$s may be the same or different and adjacent $R_3$s may be joined together to form a ring;
$R_6$ represents a p-valent alkyl group, a p-valent cycloalkyl group, a p-valent aryl group or a p-valent heterocyclic group, or a p-valent linking group formed by combining two or more members selected from the group consisting of an alkyl group, a cycloalkyl group, an aryl group and a heterocyclic group, or a p-valent linking group formed by combining an alkyl group, a cycloalkyl group, an aryl group or a heterocyclic group with a divalent group represented by —NR$_7$—, —O—, —S—, —C(=O)—, —S(=O)$_2$—, —CH=CH— or —C≡C—;

R$_7$ represents a hydrogen atom, an alkyl group, a cycloalkyl group, an aryl group or a heterocyclic group; and p represents 2 or 3.

2. The retardation film according to claim 1, wherein the compound represented by general formula (3) is a compound represented by general formula (4):

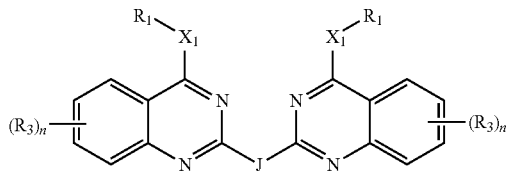

General formula (4)

wherein

R$_1$ represents an alkyl group, a cycloalkyl group, an aryl group or a heterocyclic group;

X$_1$ represents a single bond, —NR$_4$—, —O— or —S—;

R$_4$ represents a hydrogen atom, an alkyl group, a cycloalkyl group, an aryl group or a heterocyclic group;

R$_3$ represents a substituent;

n represents an integer of 0 to 4; and when n is 2 or more, a plurality of R$_3$s may be the same or different and adjacent R$_3$s may be joined together to form a ring; and J represents a divalent alkyl group, a divalent cycloalkyl group, a divalent aryl group or a divalent heterocyclic group, or a divalent linking group formed by combining two or more members selected from the group consisting of an alkyl group, a cycloalkyl group, an aryl group and a heterocyclic group.

3. The retardation film according to claim 1, wherein the cellulose derivative is a cellulose ester.

4. The retardation film according to claim 3, wherein a total degree of acyl substitution of the cellulose ester is 1.5 or more and 2.6 or less.

5. The retardation film according to claim 1, wherein an in-plane retardation Ro represented by the following expression is in the range of 40 to 100 nm, and a thickness direction retardation Rth represented by the following expression is in the range of 100 to 300 nm, with respect to light having a wavelength of 590 nm, in an environment of 23° C. and 55% RH:

$$Ro = (nx - ny) \times d \quad \text{Expression (I)}$$

$$Rth = \{(nx + ny)/2 - nz\} \times d \quad \text{Expression (II)}$$

wherein nx represents a refractive index in direction x in which a refractive index reaches a maximum in an in-plane direction of the film; ny represents a refractive index in direction y orthogonal to direction x in the in-plane direction of the film; nz represents a refractive index in thickness direction z of the film; and d (nm) represents a thickness of the retardation film.

6. The retardation film according to claim 1, wherein the retardation film has a thickness of 20 to 35 μm.

7. A polarizing plate comprising:

a polarizer; and the retardation film according to claim 1 disposed on at least one surface of the polarizer.

8. A liquid crystal display device comprising the retardation film according to claim 1.

9. A liquid crystal display device comprising:

a liquid crystal cell; and the polarizing plate according to claim 7 disposed on at least one surface of the liquid crystal cell.

10. The liquid crystal display device according to claim 9, wherein the liquid crystal cell is a VA-type liquid crystal cell.

11. A retardation film containing a compound represented by general formula (2) or (3):

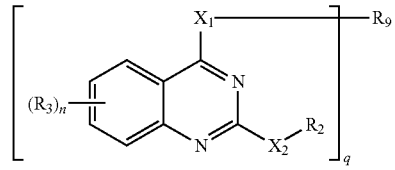

General Formula (2)

wherein

R$_2$ represents an alkyl group, a cycloalkyl group, an aryl group or a heterocyclic group;

X$_1$ represents a single bond, —NR$_4$—, —O— or —S—;

X$_2$ represents a single bond, —NR$_5$—, —NR$_5$—(C=O)—, —O— or —S—;

R$_4$ and R$_5$ each independently represent a hydrogen atom, an alkyl group, a cycloalkyl group, an aryl group or a heterocyclic group;

R$_3$ represents a substituent;

n represents an integer of 0 to 4; and when n is 2 or more, a plurality of R$_3$s may be the same or different and adjacent R$_3$s may be joined together to form a ring;

R$_9$ represents a q-valent alkyl group, a q-valent cycloalkyl group, a q-valent aryl group or a q-valent heterocyclic group, or a q-valent linking group formed by combining two or more members selected from the group consisting of an alkyl group, a cycloalkyl group, an aryl group and a heterocyclic group, or a q-valent linking group formed by combining an alkyl group, a cycloalkyl group, an aryl group or a heterocyclic group with a divalent group represented by —NR$_{10}$—, —O—, —S—, —C(=O)—, —S(=O)$_2$—, —CH=CH— or —C≡C—;

R$_{10}$ represents a hydrogen atom, an alkyl group, a cycloalkyl group, an aryl group or a heterocyclic group; and q represents 2 or 3;

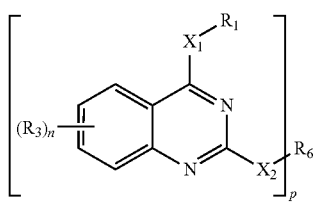

General formula (3)

wherein
R₁ represents an alkyl group, a cycloalkyl group, an aryl group or a heterocyclic group;
X₁ represents a single bond, —NR₄—, —O— or —S—;
X₂ represents a single bond, —NR₅—, —NR₅—(C=O)—, —O— or —S—;
R₄ and R₅ each independently represent a hydrogen atom, an alkyl group, a cycloalkyl group, an aryl group or a heterocyclic group;
R₃ represents a substituent;
n represents an integer of 0 to 4; and when n is 2 or more, a plurality of R₃s may be the same or different and adjacent R₃s may be joined together to form a ring;
R₆ represents a p-valent alkyl group, a p-valent cycloalkyl group, a p-valent aryl group or a p-valent heterocyclic group, or
a p-valent linking group formed by combining two or more members selected from the group consisting of an alkyl group, a cycloalkyl group, an aryl group and a heterocyclic group, or
a p-valent linking group formed by combining an alkyl group, a cycloalkyl group, an aryl group or a heterocyclic group with a divalent group represented by —NR₇—, —O—, —S—, —C(=O)—, —S(=O)₂—, —CH=CH— or —C≡C—;
R₇ represents a hydrogen atom, an alkyl group, a cycloalkyl group, an aryl group or a heterocyclic group; and
p represents 2 or 3.

\* \* \* \* \*